(12) United States Patent
Lee et al.

(10) Patent No.: US 11,797,260 B2
(45) Date of Patent: Oct. 24, 2023

(54) DISPLAY APPARATUS

(71) Applicant: LG Display Co., Ltd., Seoul (KR)

(72) Inventors: MinJin Lee, Paju-si (KR); Taehyung Kim, Paju-si (KR); YoungYoon You, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 182 days.

(21) Appl. No.: 17/112,099

(22) Filed: Dec. 4, 2020

(65) Prior Publication Data
US 2021/0200503 A1   Jul. 1, 2021

(30) Foreign Application Priority Data

Dec. 31, 2019  (KR) .................. 10-2019-0180131

(51) Int. Cl.
| | |
|---|---|
| *G06F 3/16* | (2006.01) |
| *G06F 1/16* | (2006.01) |
| *H04R 5/02* | (2006.01) |
| *G10K 9/22* | (2006.01) |
| *G10K 9/122* | (2006.01) |

(52) U.S. Cl.
CPC .............. *G06F 3/16* (2013.01); *G06F 1/1605* (2013.01); *G10K 9/122* (2013.01); *G10K 9/22* (2013.01)

(58) Field of Classification Search
CPC . G06F 1/16; G06F 1/1605; G06F 3/01; G06F 3/14; G06F 3/16; H04R 1/02; H04R 1/20; H04R 1/28; H04R 1/40; H04R 17/00; H04R 9/02; H04R 9/04; H04R 9/06; H04R 3/00; H04R 3/04; H04R 3/12; H04R 23/00; H04R 5/02; H04R 7/04; H04R 7/16; H04R 25/00; H01L 51/52; H01L 41/00; H01L 41/18; H01L 41/047; H01L 41/04; H01L 41/09; H01L 27/32; H05K 5/00; H05K 5/02; H05K 7/20

See application file for complete search history.

(56) References Cited

U.S. PATENT DOCUMENTS

| | | | | |
|---|---|---|---|---|
| 10,440,848 | B2 * | 10/2019 | Olien | ........................ B32B 3/18 |
| 2003/0003879 | A1 * | 1/2003 | Saiki | ..................... H04R 9/046 |
| | | | | 379/433.02 |
| 2005/0269904 | A1 * | 12/2005 | Oka | ................... H03H 9/02157 |
| | | | | 310/324 |

(Continued)

FOREIGN PATENT DOCUMENTS

| | | |
|---|---|---|
| JP | H05-075955 A | 3/1993 |
| JP | H07-327297 A | 12/1995 |

(Continued)

OTHER PUBLICATIONS

Office Action issued by the Japanese Patent Office corresponding to JP Application No. 2020-202905, dated Dec. 16, 2021.

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

A display apparatus includes a display module including a display panel configured to display an image, a supporting member on a rear surface of the display module, and a first vibration generating module including two or more vibration generating devices on the rear surface of the display module to output sounds of different sound bands.

56 Claims, 23 Drawing Sheets

(56) References Cited

U.S. PATENT DOCUMENTS

| | | | | |
|---|---|---|---|---|
| 2008/0055277 A1* | 3/2008 | Takenaka | ............... | G06F 3/016 345/177 |
| 2013/0128130 A1* | 5/2013 | Yamauchi | ............. | H04N 5/642 348/836 |
| 2014/0160040 A1* | 6/2014 | Kang | ................. | H04R 17/005 345/173 |
| 2015/0010187 A1* | 1/2015 | Lee | .................. | H04R 1/028 345/177 |
| 2015/0016660 A1* | 1/2015 | Matsumura | ............ | H04R 9/06 381/415 |
| 2015/0277180 A1* | 10/2015 | Seo | .................. | G02F 1/133602 349/58 |
| 2015/0341714 A1* | 11/2015 | Ahn | .................. | H04R 7/045 381/333 |
| 2015/0362652 A1* | 12/2015 | Hayashi | ............. | G02B 6/0088 348/790 |
| 2018/0053813 A1* | 2/2018 | Choi | ................. | H01L 51/5246 |
| 2018/0167724 A1* | 6/2018 | Jung | ................ | H04R 1/345 |
| 2018/0317011 A1* | 11/2018 | Choi | ................. | H04R 9/025 |
| 2019/0324596 A1* | 10/2019 | Lee | .................. | H04R 17/005 |
| 2020/0059544 A1* | 2/2020 | Hwang | ............. | H04R 9/06 |
| 2020/0293084 A1* | 9/2020 | Ahn | .................. | H04R 7/045 |
| 2020/0404213 A1* | 12/2020 | Won | .................. | H04R 11/02 |
| 2020/0404413 A1* | 12/2020 | Kim | ................ | G02F 1/133308 |

FOREIGN PATENT DOCUMENTS

| | | |
|---|---|---|
| JP | H08-098113 A | 4/1996 |
| JP | 2005-070661 A | 3/2005 |
| JP | 2008-193486 A | 8/2008 |
| JP | 2010-081142 A | 4/2010 |
| JP | 2012-134956 A | 7/2012 |
| JP | 2007-189707 A | 7/2015 |
| JP | 2015-180053 A | 10/2015 |
| JP | 2016-021738 A | 2/2016 |
| JP | 2017-201410 A | 11/2017 |
| JP | 2018-093469 A | 6/2018 |
| JP | 2018-170792 A | 11/2018 |
| JP | 2019-110588 A | 7/2019 |

* cited by examiner

DISPLAY APPARATUS

CROSS-REFERENCE TO RELATED APPLICATIONS

This application claims the benefit of and priority to the Korean Patent Application No. 10-2019-0180131 filed on Dec. 31, 2019, the entirety of which is hereby incorporated by reference as if fully set forth herein.

BACKGROUND

Technical Field

The present disclosure relates to a display apparatus, and more particularly, to a display apparatus which includes a display panel for outputting a sound.

Discussion of the Related Art

Display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel for displaying an image and a sound device for outputting a sound associated with the image.

However, in display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and an immersion experience of a viewer is reduced.

SUMMARY

Accordingly, embodiments of the present disclosure are directed to a display apparatus that substantially obviates one or more problems due to limitations and disadvantages of the related art.

The inventors have recognized problems of the display apparatuses described above and have performed various experiments so that, when a user in front of a display panel is watching an image, a traveling direction of a sound is a forward direction of the display panel. Thus, sound quality or a sound pressure level may be enhanced. Thus, through the various experiments, the inventors have invented a display apparatus having a new structure, which may generate a sound traveling in a forward region of the display panel, thereby enhancing sound quality or a sound pressure level.

An aspect of the present disclosure is to provide a display apparatus for improving sound quality and increasing an immersion experience of a viewer.

Another aspect of the present disclosure is to provide a display apparatus which generates a sound traveling in a forward direction of a display module.

Another aspect of the present disclosure is to provide a display apparatus which generates a sound traveling in a forward direction and a lateral direction of a display module, thereby enhancing a sound pressure level.

Additional advantages and features of the disclosure will be set forth in part in the description that follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other of the inventive concepts, as embodied and broadly described herein, a display apparatus comprises a display module including a display panel configured to display an image, a supporting member on a rear surface of the display module, and a first vibration generating module including two or more vibration generating devices on the rear surface of the display module to output sounds of different sound bands.

In another aspect, a display apparatus comprises a display module including a display panel configured to display an image, a supporting member configured on a rear surface of the display module, and two or more vibration generating devices configured on the rear surface of the display module to have different sound bands in a direction from a center of the display module to a periphery of the display module with respect to a widthwise direction of the display module.

According to the embodiments of the present disclosure, a display apparatus for outputting a sound in a forward direction and a lateral direction of a display module may be provided.

According to the embodiments of the present disclosure, a vibration generating module for outputting sounds of different sound bands may be provided, thereby providing a display apparatus for outputting sounds of low-pitched, middle-pitched, and high-pitched sound bands and enhancing a sound pressure level.

According to the embodiments of the present disclosure, a vibration generating module including a vibration generating device for outputting sounds of different sound bands may be modularized, thereby enhancing the degree of freedom in placing a vibration generating module.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1:
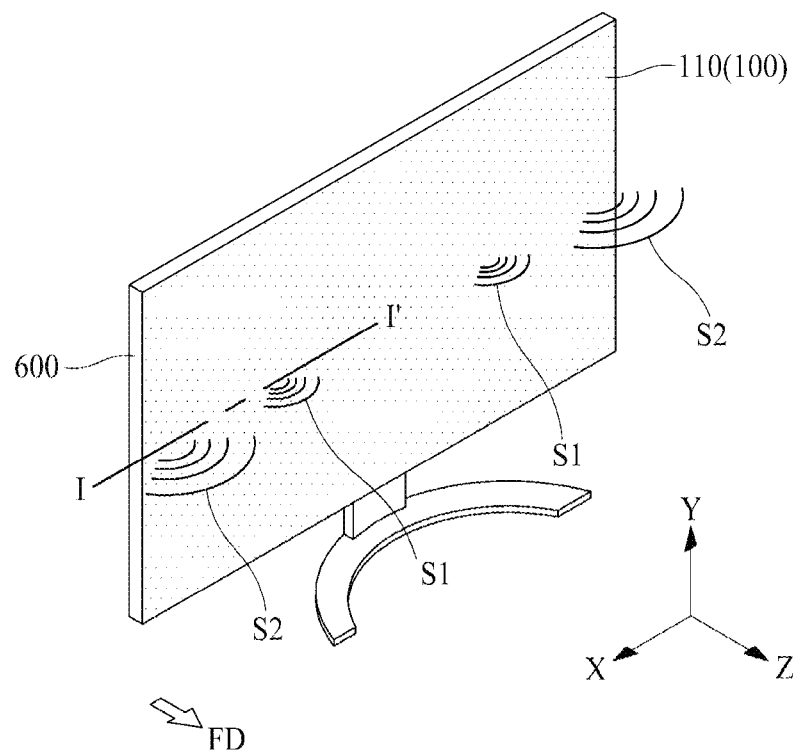
FIG. 1 illustrates a display apparatus according to an embodiment of the present disclosure.

Reference will now be made in detail to the exemplary embodiments of the present disclosure, examples of which may be illustrated in the accompanying drawings.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

Throughout the drawings and the detailed description, unless otherwise described, the same drawing reference numerals should be understood to refer to the same elements, features, and structures. The relative size and depiction of these elements may be exaggerated for clarity, illustration, and convenience. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted. Also, for convenience of description, a scale of each of elements illustrated in the accompanying drawings differs from a real scale, and thus, is not limited to a scale illustrated in the drawings.

A display apparatus according to an embodiment of the present disclosure may include a vibration generating device. When a vibration device including a voice coil is configured with a vibration generating device, there is a problem where it is difficult to secure a sound of a high-pitched sound band. In order to solve such a problem, the display apparatus according to an embodiment of the present disclosure may further include a piezoelectric vibration device including a piezoelectric material or a piezoelectric element having a piezoelectric effect (or an inverse piezoelectric characteristic) where an output of a high-pitched sound band is strong. In a case where the piezoelectric vibration device is further provided, a separate element for implementing a sound signal in the piezoelectric vibration device may be needed, the cost of the display apparatus may increase, and a sound pressure level may be reduced because an amplified output is limited due to a low impedance of the piezoelectric vibration device. In a case where the vibration device including the voice coil and the piezoelectric vibration device are provided together, a sound pressure characteristic of each of the vibration device including the voice coil and the piezoelectric vibration device may be changed, and due to this, there may be a problem where it is unable to secure a stable sound pressure level. Therefore, the inventors have performed various experiments for implementing a vibration generating device for enhancing a sound pressure level. Through the various experiments, the inventors have invented a display apparatus having a new structure. This will be described below.

FIG. 1 illustrates a display apparatus according to an embodiment of the present disclosure.

With reference to FIG. 1, the display apparatus according to an embodiment of the present disclosure may output a first sound S1 and a second sound S2 based on a vibration of a display module 100 configured to display an image. For example, the image may include an electronic image or a digital image. For example, in the display apparatus, the display module 100 may be vibrated by a vibration generating device (or a sound generating device) to generate the first sound S1 and the second sound S2. The first sound S1 and the second sound S2 generated based on the vibration of the display module 100 may be outputted in a forward direction FD of a screen of the display apparatus. Therefore, the display apparatus according to an embodiment of the present disclosure may output the first sound S1 and the second sound S2 in the forward direction FD of the screen of the display apparatus using the display module 100 as a vibration plate for generating a sound, and thus, may transfer the sounds, thereby improving sound quality and increasing an immersion experience of a viewer watching an image.

Figure 2:
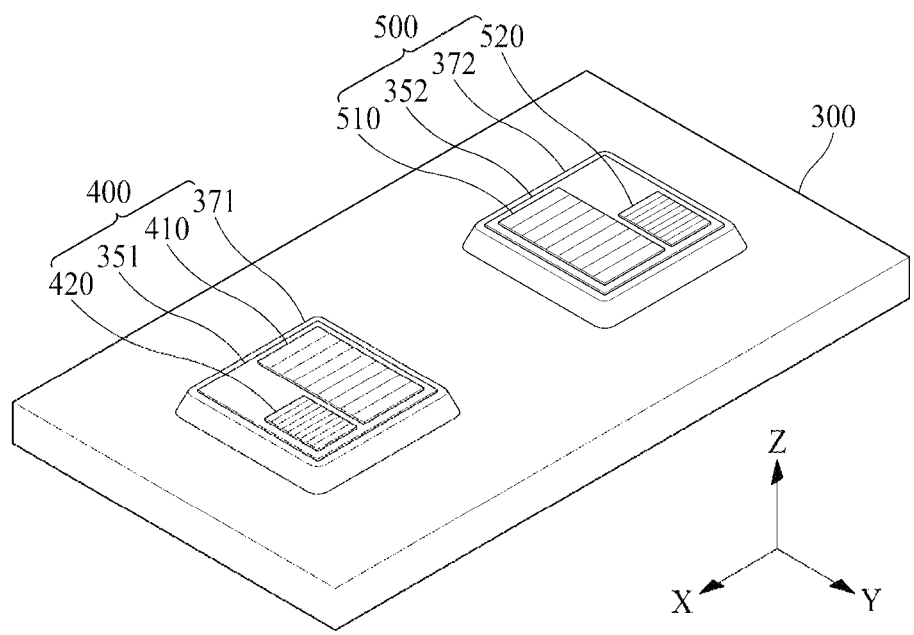
FIG. 2 illustrates a vibration generating module according to an embodiment of the present disclosure.
Figure 3:
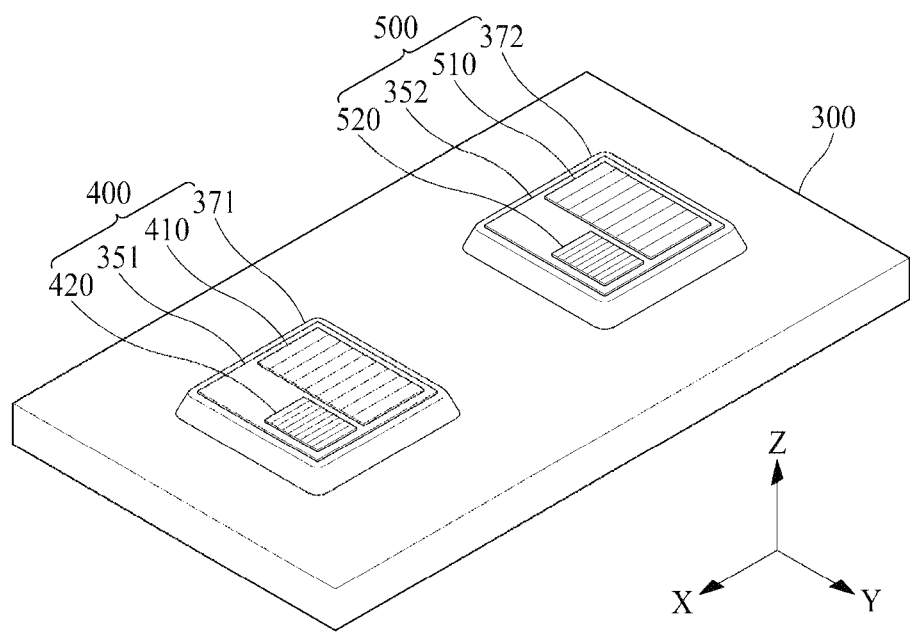
FIG. 3 illustrates a vibration generating module according to another embodiment of the present disclosure.
Figure 4:
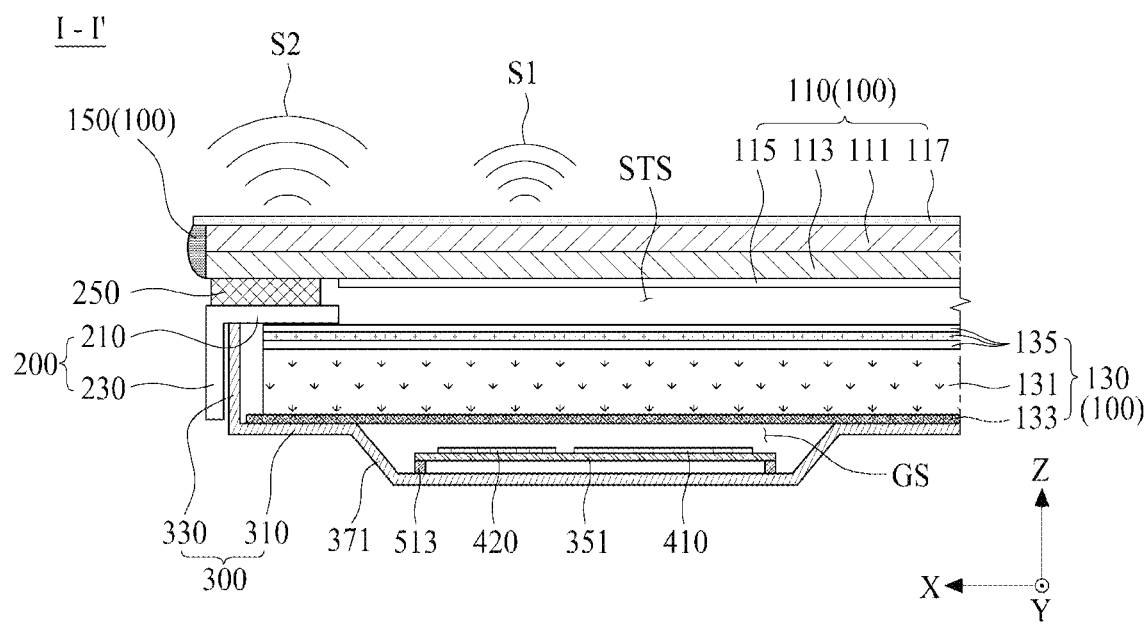
FIG. 4 is a cross-sectional view taken along line I-I' illustrated in FIG. 1.

FIG. 2 illustrates a vibration generating module according to an embodiment of the present disclosure. FIG. 3 illustrates a vibration generating module according to another embodiment of the present disclosure. FIG. 4 is a cross-sectional view taken along line I-I' illustrated in FIG. 1.

With reference to FIGS. 2 to 4, a display apparatus according to an embodiment of the present disclosure may include a display module 100, a panel supporting part 200, a supporting member 300, and first and second vibration generating modules 400 and 500.

The display module 100 may be a liquid crystal display module, but embodiments of the present disclosure are not limited thereto. For example, the display module 100 may be a display module such as a light emitting display module, an electrophoretic display module, a micro light emitting diode display module, an electro-wetting display module, or a quantum dot light emitting display module.

The supporting member 300 may support the panel supporting part 200 and may cover (or overlay) a rear surface of the display module 100. Also, the supporting member 300 may support the first and second vibration generating modules 400 and 500. The supporting member 300 according to an embodiment of the present disclosure may act as a vibration plate and may include a metal material or a metal alloy material, but embodiments of the present disclosure are not limited thereto. For example, the supporting member 300 may include a material among an iron (Fe) material, an aluminum (Al) material, a magnesium (Mg) alloy material, a Mg-lithium (Mg—Li) alloy material, and an Al alloy material, but embodiments of the present disclosure are not limited thereto.

The supporting member 300 according to an embodiment of the present disclosure may include a rear portion 310 which supports the rear surface of the display module 100 and a side portion 330 which is connected to a periphery region (or an edge region) of the rear portion 310 and supports the panel supporting part 200.

The rear portion 310 of the supporting member 300 according to an embodiment of the present disclosure may be disposed to cover the rear surface of the display module 100 and may support the display module 100. The rear portion 310 of the supporting member 300 may support a backlight 130 of the display module 100 and may support the first and second vibration generating modules 400 and 500. For example, the rear portion 310 may contact a rear surface of a reflective sheet 133, and thus, may transfer a sound vibration, generated based on a vibration of each of the first and second vibration generating modules 400 and 500, to the reflective sheet 133 of the backlight 130.

The side portion 330 of the supporting member 300 may be bent from a periphery of the rear portion 310 and may support the panel supporting part 200. The side portion 330 may provide an accommodating space for the backlight 130 and may surround side surfaces of the backlight 130 accommodated (or supported) into the accommodating space. The side portion 330 may transfer a sound vibration, generated in the rear portion 310 by each of the first and second vibration generating modules 400 and 500, to the panel supporting part 200.

The display apparatus according to an embodiment of the present disclosure may further include a system rear cover 600 disposed on a rear surface of the supporting member 300.

The system rear cover 600 may accommodate the display module 100 with the first and second vibration generating modules 400 and 500 disposed therein and may surround a side surface of the display module 100. For example, the system rear cover 600 may be referred to as a set cover, a rear set cover, an outermost set cover, a product cover, or an outermost product cover, but embodiments of the present disclosure are not limited thereto.

With reference to FIG. 4, the display panel 110 according to an embodiment of the present disclosure may include a first substrate 111, a second substrate 113, a second polarization member 115, and a first polarization member 117.

The first substrate 111 may be an upper substrate or a thin film transistor (TFT) array substrate and may include a pixel array (or a display part or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate 111 may further include a pad part provided at a first edge (or a first non-display part) thereof and a gate driving circuit provided at a second edge (or a second non-display part) thereof.

The pad part may transfer a signal, supplied from the outside, to the pixel array and/or the gate driving circuit. For example, the pad part may include a plurality of data pads connected to a plurality of data lines through a plurality of data link lines and a plurality of gate input pads connected to the gate driving circuit through a gate control signal line. For example, a first edge of the first substrate 111 including the pad part may protrude to a side surface corresponding to a first edge of the lower substrate 113, and the pad part may be exposed in a rearward direction toward the supporting member 300. For example, a size of the first substrate 111 may be greater than that of the lower substrate 113, but embodiments of the present disclosure are not limited thereto.

The gate driving circuit according to an embodiment of the present disclosure may be embedded (or integrated) into a second edge of the first substrate 111 and may be connected to the plurality of gate lines. For example, the gate driving circuit may be implemented with a shift register including a transistor, which is formed through the same process as the TFT provided in the pixel area. According to another embodiment of the present disclosure, the gate driving circuit may be implemented as an integrated circuit (IC) and may be provided in a panel driving circuit, without being embedded into the first substrate 111.

The second substrate 113 may be a lower substrate or a color filter array substrate and may include a pixel pattern, including an opening area overlapping the pixel area formed in the first substrate 111, and a color filter layer formed in the opening area. The second substrate 113 according to an embodiment of the present disclosure may have a size which is less than that of the first substrate 111, but embodiments of the present disclosure are not limited thereto. For example, the second substrate 113 may overlap a portion, other than the first edge, of the first substrate 111. The second substrate 113 may be bonded to a portion, other than the first edge, of the first substrate 111 with a liquid crystal layer therebetween using a sealant.

The liquid crystal layer may be interposed between the first substrate 111 and the second substrate 113 and may include a liquid crystal including liquid crystal molecules where an alignment direction thereof is changed based on an electric field generated by the common voltage and a data voltage applied to a pixel electrode for each pixel.

The second polarization member 115 may be a lower polarization member and may be attached on a lower surface of the second substrate 113 and may polarize light which is incident from the backlight 130 and travels to the liquid crystal layer.

The first polarization member 117 may be an upper polarization member and may be attached on an upper surface of the first substrate 111 and may polarize light which passes through the first substrate 111 and is output to the outside.

The display panel 110 according to an embodiment of the present disclosure may drive the liquid crystal layer based on an electric field which is generated in each pixel by the data voltage and the common voltage applied to each pixel, and thus, may display an image based on light passing through the liquid crystal layer.

In the display panel 110 according to an embodiment of the present disclosure, the first substrate 111 implemented as the TFT array substrate may configure an image display surface, and thus, a whole front surface of the display panel 110 may be exposed at the outside without being covered by a separate mechanism.

According to another embodiment of the present disclosure, in the display panel 110, the first substrate 111 may be implemented as the color filter array substrate, and the second substrate 113 may be implemented as the TFT array substrate. For example, the display panel 110 according to another embodiment of the present disclosure may have a type where an upper portion and a lower portion of the display panel 110 according to an embodiment of the present disclosure are reversed therebetween. For example, a pad part of the display panel 110 according to another embodiment of the present disclosure may be covered by a separate mechanism or structure.

The display apparatus 100 according to an embodiment of the present disclosure may further include a buffer member 150. The buffer member 150 may be formed to surround side surfaces of the display panel 110. The buffer member 150 may be formed to cover each side surface and each corner of the display panel 110. The buffer member 150 may protect the side surfaces of the display panel 110 from an external impact, or may prevent light leakage through the side surfaces of the display panel 110. The buffer member 150 according to an embodiment of the present disclosure may include a silicon-based sealant or ultraviolet (UV)-curable sealant (or resin). Considering a process tack time, the buffer member 150 may include the UV-curable sealant. Also, the buffer member 150 according to an embodiment of the present disclosure may have a color (for example, blue, red, bluish green, or black, but embodiments of the present disclosure are not limited thereto. For example, the buffer member 150 may include a colored resin or a light blocking resin for preventing leakage of light through a side surface.

A portion of an upper surface of the buffer member 150 according to an embodiment of the present disclosure may be covered by the first polarization member 117. For example, the first polarization member 117 may include an extension portion which extends long from a side surface corresponding to an outer surface of the first substrate 111 to cover a portion of a front surface of the buffer member 150 and is attached on the portion of the front surface of the buffer member 150. An attachment surface (or a boundary portion between the buffer member 150 and the first substrate 111) between the buffer member 150 and the first substrate 111 may be concealed by the extension portion of the upper polarization member 117, and thus, may not be exposed in a forward direction FD of the display apparatus. When the buffer member 150 is not provided, the front surface of the display panel 110 may not be covered by a separate mechanism and may be exposed in the forward direction FD of the display apparatus, and due to this, the side light leakage of the display panel 110 may occur. Therefore, in a display apparatus having a structure where the whole front surface of the display panel 110 is exposed in the forward direction FD so as to remove or minimize a bezel width of the display apparatus, the buffer member 150 may be configured to prevent the side light leakage of the display panel 110 and to protect the side surfaces of the display panel 110. But embodiments of the present disclosure are not limited thereto, and the buffer member 150 may be omitted.

The backlight 130 may be disposed on the rear surface of the display panel 110 and may irradiate light onto the rear surface of the display panel 110. The backlight 130 according to an embodiment of the present disclosure may include a light guide plate 131, a light source part, a reflective sheet 133, and an optical sheet part 135.

The light guide plate 131 may include a light input surface which is disposed on the supporting member 300 to overlap the display panel 110 and is provided at one side thereof. The light guide plate 131 may include a light-transmitting plastic or glass material. The light guide plate 131 may transfer (output) light, which is incident through the light input surface from the light source part, to the display panel 110. For example, the light guide plate 131 may be referred to as a light guide member or a flat or plane light source, but embodiments of the present disclosure are not limited thereto.

The light source part may irradiate light onto the light input surface provided in the light guide plate 131. The light source part may be disposed at the supporting member 300 to overlap a first edge of the display panel 110. The light source part according to an embodiment of the present disclosure may include a plurality of light emitting diodes which are mounted on a light-source printed circuit board (PCB) and irradiate lights onto the light input surface of the light guide plate 131.

The reflective sheet 133 may be disposed at the supporting member 300 to cover a rear surface of the light guide plate 131. The reflective sheet 133 may reflect light, which is incident from the light guide plate 131, to the light guide plate 131 to minimize the loss of the light.

The optical sheet part 135 may be disposed on a front surface of the light guide plate 131 and may enhance a luminance characteristic of light output from the light guide plate 131. The optical sheet part 135 according to an embodiment of the present disclosure may include a diffusive sheet, a first prism sheet, and a second prism sheet. For example, the optical sheet part 135 may be configured as one layer including the diffusive sheet, the first prism sheet, and the second prism sheet. But embodiments of the present disclosure are not limited thereto. For example, the optical sheet part 135 may be configured by a stacked combination of one or more sheets among a diffusive sheet, a prism sheet, a dual brightness enhancement film, and a lenticular sheet, or may be configured with one composite sheet having a light diffusing function and a light collecting function.

The panel supporting part (or panel guide) 200 may support a rear periphery region of the display panel 110. The panel supporting part 200 may be supported by or accommodated into the supporting member 300 to overlap the rear periphery region of the display panel 110. The panel supporting part 200 may be disposed under the rear periphery region of the display panel 110 not to protrude to the outside of each side surface of the display panel 110.

The panel supporting part 200 according to an embodiment of the present disclosure may include a supporting portion (or panel supporting portion) 210 and a side portion (or a guide sidewall) 230. For example, the panel supporting part 200 may have a cross-sectional structure having a ]-shape or a ⌈-shape on the based on a coupling or connection structure of the supporting portion 210 and the side portion 230, but embodiments of the present disclosure are not limited thereto.

The supporting portion 210 may be coupled or connected to the rear periphery region of the display panel 110 and may be supported by the supporting member 300. For example, the supporting portion 210 may have a tetragonal band (or belt) shape including an opening portion overlapping a center region, other than the rear periphery region, of the display panel 110, but embodiments of the present disclosure are not limited thereto. The supporting portion 210 may have a size equal to or less than that of the display panel 110 not to protrude to the outside of each side surface of the display panel 110. For example, the opening portion of the supporting portion 210 may have a size which is equal to or greater than that of the pixel array (or the display portion) in the display panel 110.

The supporting portion 210 may directly contact an uppermost surface of the backlight 130 (for example, an uppermost surface of the optical sheet part 135), or may be spaced apart from the uppermost surface of the optical sheet part 135 by a certain distance.

The side portion 230 may be connected to the supporting portion 210 and may surround side surfaces of the supporting member 300. For example, the side portion 230 may be bent from the supporting portion 210 to the side surfaces of the supporting member 300 and may surround the side surfaces of the supporting member 300 or may be surrounded by the side surfaces of the supporting member 300.

The panel supporting part 200 according to an embodiment of the present disclosure may include a plastic material, a metal material, or a mixed material of a plastic material and a metal material, but embodiments of the present disclosure are not limited thereto. For example, the panel supporting part 200 may act as a vibration transfer member which transfers a sound vibration, generated by each of the first and second vibration generating modules 400 and 500, to the periphery region of the display panel 110. Therefore, the panel supporting part 200 may transfer the sound vibration, generated by each of the first and second vibration generating modules 400 and 500, to the display panel 110 without being lost in a state of maintaining stiffness of the display panel 110. For example, the panel supporting part 200 may include a metal material for transferring the sound vibration, generated by each of the first and second vibration generating modules 400 and 500, to the display panel 110 without being lost in a state of maintaining stiffness of the display panel 110, but embodiments of the present disclosure are not limited thereto.

The panel supporting part 200 according to an embodiment of the present disclosure may be coupled or connected to the rear periphery region of the display panel 110 by a first connection member 250.

The first connection member 250 may be disposed between the rear periphery region of the display panel 110 and the supporting portion 210 of the panel supporting part 200 and may dispose or connect the display panel 110 on the panel supporting part 200. The first connection member 250 of the present disclosure may include an acryl-based adhesive member or a urethane-based adhesive member, but embodiments of the present disclosure are not limited thereto. For example, the first connection member 250 may include the acryl-based adhesive member which is relatively better in adhesive force and hardness than the urethane-based adhesive member so that the vibration of the panel supporting part 200 can be well transferred to the display panel 110. For example, the first connection member 250 may include a double-sided foam adhesive pad having an acryl-based adhesive layer, or an acryl-based adhesive resin curing layer.

A front surface of the first connection member 250 according to an embodiment of the present disclosure may be coupled or connected to the second substrate 113 or the second polarization member 115 of the display panel 110. The first connection member 250 may be directly coupled or connected to a rear periphery region of the second substrate 113 to enhance an adhesive force between the first connection member 250 and the display panel 110. For example, the first connection member 250 may be attached on the rear periphery region of the second substrate 113 and may surround a side surface of the second polarization member 115, thereby preventing light leakage of the side surface from occurring in the second polarization member 115.

The first connection member 250 may provide a sound transfer space STS between the display panel 110 and the panel supporting part 200 to have a certain thickness (or height). The first connection member 250 according to an embodiment of the present disclosure may be provided at a four-side-closed shape or a closed loop shape in the supporting portion 210 of the panel supporting part 200. For example, the first connection member 250 may provide the closed sound transfer space STS between a rearmost surface of the display panel 110 and an uppermost surface of the backlight 130 which face each other with the opening portion of the panel supporting part 200 therebetween, thereby preventing or minimizing the leakage (or loss) of a sound pressure transferred to the sound transfer space STS. The sound transfer space STS may also act as a sound generating space where a sound pressure is generated based on a vibration of the backlight 130 or a panel vibration space which enables a vibration of the display panel 110 to be smoothly performed.

A rear surface (or a backside surface) of the display module 100 may include a first region and a second region. For example, the first vibration generating module 400 may be disposed at the supporting member 300 corresponding to the first region of the rear surface of the display module 100. For example, the first vibration generating module 400 may include a first vibration generating device 410 and a second vibration generating device 420. For example, the second vibration generating module 500 may be disposed at the supporting member 300 corresponding to the second region of the rear surface of the display module 100. For example, the second vibration generating module 500 may include a third vibration generating device 510 and a fourth vibration generating device 520. The first and second vibration generating modules 400 and 500 may be disposed to be symmetrical or asymmetrical with respect to a first direction X (or a widthwise direction) of the display module 100. For example, the first and second vibration generating modules 400 and 500 may be disposed to be symmetrical or asymmetrical with a center of the display module 100 with respect to the first direction X (or the widthwise direction) of the display module 100.

With reference to FIGS. 1 to 4, the first and second vibration generating modules 400 and 500 may be disposed at the supporting member 300. The first and second vibration generating modules 400 and 500 may be disposed at the supporting member 300 and may be configured to vibrate a region of the display module 100.

The first vibration generating module 400 may be configured at a first forming portion 371 provided at the supporting member 300. The first forming portion 371 may support the first vibration generating module 400. The first vibration generating module 400 may further include a first plate 351. For example, the first plate 351 may be configured on the first forming portion 371. The first plate 351 may be a vibration plate of the first vibration generating module 400. For example, the first plate 351 may include a material among a Fe material, an Al material, a Mg alloy material, a Mg—Li alloy material, an Al alloy material, and stainless steel, but embodiments of the present disclosure are not limited thereto. The first plate 351 may be a heat dissipation member which dissipates heat caused by a vibration of the first vibration generating module 400. An adhesive member 513 may be disposed between the supporting member 300 and the first plate 351. The first vibration generating module 400 may be attached on the supporting member 300 by the adhesive member 513. For example, the adhesive member 513 may include a single-sided tape, a single-sided adhesive pad, a single-sided adhesive gap pad, a single-sided adhesive foam pad, a double-sided tape, a double-sided adhesive pad, a double-sided adhesive gap pad, a double-sided adhesive foam pad, or a bond, but embodiments of the present disclosure are not limited thereto.

The first vibration generating device 410 and the second vibration generating device 420 may be disposed on the first plate 351. Each of the first vibration generating device 410 and the second vibration generating device 420 may configured to include a piezoelectric material or a piezoelectric device having a piezoelectric effect (or an inverse piezoelectric characteristic). For example, the first vibration generating device 410 and the second vibration generating device 420 may each include a piezoelectric composite including a piezoelectric composite layer. This will be described below with reference to FIGS. 14 to 18.

The first vibration generating module 400 may be configured to vibrate the first region (for example, a left rear region) of a rear region of the display module 100 to output a sound in a forward direction FD of the display panel 110. For example, when the first vibration generating module 400 vibrates according to a signal, the vibration of the first vibration generating module 400 may vibrate a left region of the supporting member 300 to generate a sound pressure in a gap space GS (or a sound outputting space) between the first vibration generating module 400 and the supporting member 300, thereby vibrating the first region of the display module 100 to generate a first sound S1 and a second sound S2. For example, when the first vibration generating module 400 vibrates according to a current or a voltage, the sound pressure may be generated in the gap space GS based on the vibration of the first region caused by the vibration of the first vibration generating module 400, a sound pressure may be generated in the sound transfer space STS based on a vibration of the backlight 130 caused by the sound pressure, and the first sound S1 and the second sound S2 generated based on the vibration of the display panel 110 caused by the sound pressure generated in the sound transfer space STS may be outputted in the forward direction FD of the display panel 110. Accordingly, a sound wave generated based on the vibration of the first vibration generating module 400 may be directly transferred (or propagated) to the display module 100, thereby enhancing the sound pressure characteristic and sound quality of the first sound S1 and the second sound S2. The first sound S1 may be outputted by the first vibration generating device 410 and may be a sound of a low-pitched sound band. The second sound S2 may be outputted by the second vibration generating device 420 and may be a sound of a middle-pitched sound band or a middle-high-pitched sound band. For example, the low-pitched sound band may be 200 Hz or less, the middle-pitched sound band may be 200 Hz to 3 kHz, and a high-pitched sound band may be 3 kHz or more. But embodiments of the present disclosure are not limited thereto. For example, the first vibration generating module 400 may output a sound in a frequency range of 80 Hz to 40 kHz or 150 Hz to 40 kHz.

The second vibration generating module 500 may be configured at a second forming portion 372 provided at the supporting member 300. The second forming portion 372 may support the second vibration generating module 500. The second vibration generating module 500 may further include a second plate 352. For example, the second plate 352 may be disposed on the second forming portion 372. The second plate 352 may be a vibration plate of the second vibration generating module 500. For example, the second plate 352 may include a material among an Fe material, an Al material, a Mg alloy material, a Mg—Li alloy material, an Al alloy material, and stainless steel, but embodiments of the present disclosure are not limited thereto. The second plate 352 may be a heat dissipation member which dissipates heat caused by a vibration of the second vibration generating module 500. An adhesive member 513 may be disposed between the supporting member 300 and the second plate 352. The supporting member 300 may be attached on the second vibration generating module 500 by the adhesive member 513. For example, the adhesive member 513 may include a single-sided tape, a single-sided adhesive pad, a single-sided adhesive gap pad, a single-sided adhesive foam pad, a double-sided tape, a double-sided adhesive pad, a double-sided adhesive gap pad, a double-sided adhesive foam pad, or a bond, but embodiments of the present disclosure are not limited thereto.

To decrease or minimize an increase in thickness (or height) of the display apparatus caused by a thickness (or a height) of the vibration generating module 700 and to slim the display apparatus, the first forming portion 371 and the second forming portion 372 may be configured to be concave or convex from the supporting member 300. But embodiments of the present disclosure are not limited thereto. For example, the first forming portion 371 and the second forming portion 372 may each be formed in a tetragonal shape or a circular shape, but embodiments of the present disclosure are not limited thereto. The first forming portion 371 and the second forming portion 372 may be formed concavely to have a tetragonal shape from a front surface of the supporting member 300 facing the rear surface of the display module 100. The first forming portion 371 and the second forming portion 372 may protrude from the supporting member 300 in a rearward direction opposite to a forward direction toward the rear surface of the display module 100, and thus, may be concavely formed in the first plate 610. Each of the first forming portion 371 and the second forming portion 372 may be referred to as a groove portion, a concave portion, a protrusion portion, an engraved portion, an accommodating portion, or a stiffness reinforcement portion, but embodiments of the present disclosure are not limited thereto.

The first forming portion 371 and the second forming portion 372 may be formed through press forming or press molding, but embodiments of the present disclosure are not limited thereto. For example, the first forming portion 371 and the second forming portion 372 may be formed by patterning the supporting member 300 or performing a chemical etching process, an NC process (for example, a process using a numerical control machine tool), a drilling process, or a laser process on the supporting member 300, but embodiments of the present disclosure are not limited thereto.

As another example, the first forming portion 371 and the second forming portion 372 may be configured to surround the first vibration generating module 400 and the second vibration generating module 500. For example, the first forming portion 371 and the second forming portion 372 may each be a partition. A partition may be an air gap or a space for generating a sound or transferring a sound. A partition may be an air gap or a space, where a sound is generated when the display panel 110 is vibrated by the first vibration generating module 400 and the second vibration generating module 500. For example, a partition may separate a sound or a channel and may prevent or decrease an unclear sound caused by interference of a sound. A partition may be referred to as an enclosure or a baffle, but embodiments of the present disclosure are not limited thereto. When each of the first forming portion 371 and the second forming portion 372 is a partition, a vibration generating module provided as one body with the partition may be implemented. For example, the partition may be integrated in the vibration generating module.

The second vibration generating module 500 may be configured on the second plate 352. For example, the third vibration generating device 510 and the fourth vibration generating device 520 may be configured on the second plate 352. Each of the third vibration generating device 510 and the fourth vibration generating device 520 may configured to include a piezoelectric material or a piezoelectric device having a piezoelectric effect (or an inverse piezoelectric characteristic). For example, the third vibration generating device 510 and the fourth vibration generating device 520 may each include a piezoelectric composite including a piezoelectric composite layer. This will be described below with reference to FIGS. 14 to 19. Each of the first and second vibration generating modules 400 and 500 may be referred to as a film type transducer, a vibration generating module, a sound generating device, a film actuator, a film type piezoelectric composite actuator, a film speaker, a film piezoelectric speaker, or a film type piezoelectric composite speaker, but embodiments of the present disclosure are not limited thereto.

The second vibration generating module 500 may be configured to vibrate the second region (for example, a right rear region) of the rear region of the display module 100 to output a sound in the forward direction FD of the display panel 110. The second vibration generating module 500 may include the third vibration generating device 510 and the fourth vibration generating 520. For example, when the second vibration generating module 500 vibrates according to a sound signal, the vibration of the second vibration generating module 500 may vibrate a right region of the supporting member 300 to generate a sound pressure in a gap space GS (or a sound outputting space) between the second vibration generating module 500 and the supporting member 300, thereby vibrating the second region of the display module 100 to generate a first sound S1 and a second sound S2. For example, when the second vibration generating module 500 vibrates according to a current or a voltage, the sound pressure may be generated in the gap space GS based on the vibration of the second region caused by the vibration of the second vibration generating module 500, a sound pressure may be generated in the sound transfer space STS based on a vibration of the backlight 130 caused by the sound pressure, and the first sound S1 and the second sound S2 generated based on the vibration of the display panel 110 caused by the sound pressure generated in the sound transfer space STS may be outputted in the forward direction FD of the display panel 110. Accordingly, a sound wave generated based on the vibration of the second vibration generating module 500 may be directly transferred (or propagated) to the display module 100, thereby enhancing the sound pressure characteristic and sound quality of the first sound S1 and the second sound S2. The first sound S1 may be outputted by the third vibration generating device 510 and may be a sound of a low-pitched sound band. The second sound S2 may be outputted by the fourth vibration generating device 520 and may be a sound of a middle-pitched sound band or a middle-high-pitched sound band. For example, the low-pitched sound band may be 200 Hz or less, the middle-pitched sound band may be 200 Hz to 3 kHz, and a high-pitched sound band may be 3 kHz or more. But embodiments of the present disclosure are not limited thereto. For example, the second vibration generating module 500 may output a sound in a frequency range of 80 Hz to 40 kHz or 150 Hz to 40 kHz.

With reference to FIG. 2, a first vibration generating module 400 and a second vibration generating module 500 may be disposed at a supporting member 300. The first and second vibration generating modules 400 and 500 may be disposed to be asymmetrical. For example, the first and second vibration generating modules 400 and 500 may be disposed to be asymmetrical with respect to a first direction X (or a widthwise direction) of a display module 100. For example, the first and second vibration generating modules 400 and 500 may be disposed to be asymmetrical with a center of the display module 100 with respect to the first direction X (or the widthwise direction) of the display module 100. For example, first and second vibration generating devices 410 and 420 may be disposed to be asymmetrical with third and fourth vibration generating devices 510 and 520 with respect to the first direction X (or the widthwise direction) of the display module 100. For example, the second vibration generating device 420 and the fourth vibration generating device 520 may be disposed at a periphery of the supporting member 300 rather than the first vibration generating device 410 and the third vibration generating device 510. For example, the second vibration generating device 420 and the fourth vibration generating device 520 may be disposed to output a sound of the middle-pitched sound band or the middle-high-pitched sound band in a direction closer to the periphery of the supporting member 300. For example, the first vibration generating device 410 and the third vibration generating device 510 may be disposed at a center of the supporting member 300 rather than the second vibration generating device 420 and the fourth vibration generating device 520. For example, the first vibration generating device 410 and the third vibration generating device 510 may be disposed to output a sound of the low-pitched sound band in a direction closer to the center of the supporting member 300.

With reference to FIG. 3, a first vibration generating module 400 and a second vibration generating module 500 may be disposed at a supporting member 300. The first and second vibration generating modules 400 and 500 may be disposed to be symmetrical. For example, the first and second vibration generating modules 400 and 500 may be disposed to be symmetrical with a center of the display module 100 with respect to a first direction X (or a widthwise direction) of a display module 100. For example, the first and second vibration generating modules 400 and 500 may be disposed to be asymmetrical with the center of the display module 100 with respect to the first direction X (or the widthwise direction) of the display module 100. A second vibration generating device 420 and a fourth vibration generating device 520 may be disposed to be symmetrical with a first vibration generating device 410 and a third vibration generating device 510 with respect to the center of the display module 100. For example, the first vibration generating device 410 and the third vibration generating device 510 may output a first sound S1, and the second vibration generating device 420 and the fourth vibration generating device 520 may output a second sound S2. The first sound S1 may be a sound of the low-pitched sound band, and the second sound S2 may be a sound of the middle-pitched sound band or the middle-high-pitched sound band.

Therefore, in a vibration generating module according to an embodiment of the present disclosure, at least two vibration generating devices configured to output sounds of different sound bands may be structuralized by a forming portion 371 and 372 of a supporting member 300, thereby providing a display apparatus configured output sounds of different sound bands.

Figure 5:
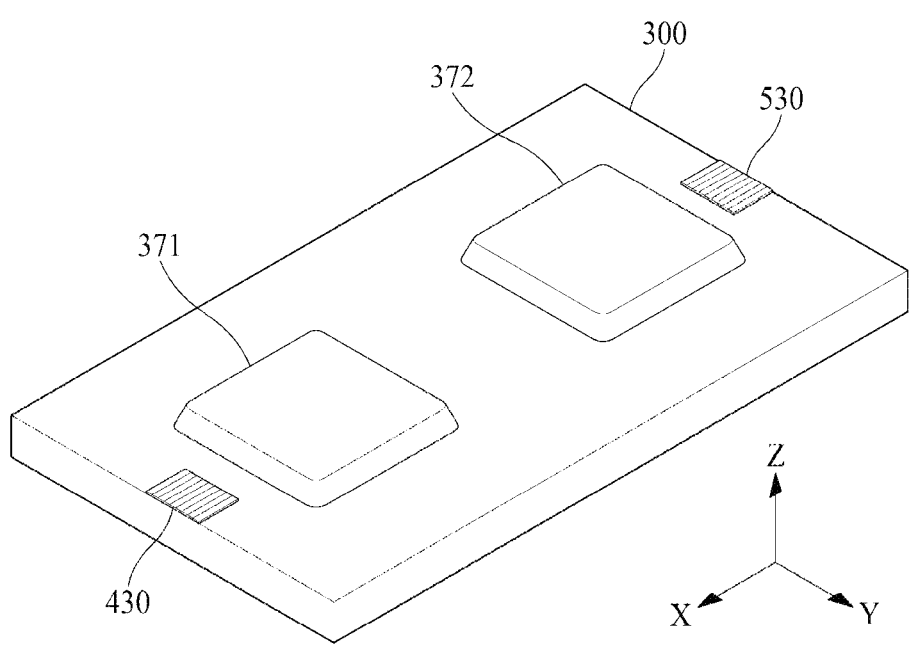
FIG. 5 illustrates a rear surface of a supporting member according to an embodiment of the present disclosure.

FIG. 5 illustrates a rear surface of a supporting member according to an embodiment of the present disclosure.

With reference to FIG. 5, a rear surface of a supporting member 300 according to an embodiment of the present disclosure may include a first forming portion 371 and a second forming portion 372. A vibration generating module described above with reference to FIGS. 2 and 3 may be configured in the first forming portion 371 and the second forming portion 372.

Fifth and sixth vibration generating devices 430 and 530 may be further disposed along a periphery region of the supporting member 300. For example, a rear region of the supporting member 300 may correspond to or overlap a periphery region of a display module 100. For example, the fifth vibration generating device 430 may be disposed at a periphery region of a rear surface of the supporting member 300 corresponding to a first rear region of the display module 100. For example, the sixth vibration generating device 530 may be disposed at a periphery region of the rear surface of the supporting member 300 corresponding to a second rear region of the display module 100. The fifth and sixth vibration generating devices 430 and 530, as described above with reference to FIGS. 2 and 4, may be configured on a plate.

The fifth vibration generating device 430 may vibrate a first periphery region (or a left periphery region) among a periphery region of the display module 100 to output a sound to a side surface of the display panel 110. The sixth vibration generating device 530 may vibrate a second periphery region (or a right periphery region) among the periphery region of the display module 100 to output a sound to the side surface of the display panel 110. For example, a sound generated by each of the fifth and sixth vibration generating devices 430 and 530 may be a sound of a high-pitched sound band. The high-pitched sound band may be 3 kHz or more, but embodiments of the present disclosure are not limited thereto. Therefore, a sound wave generated according to the vibration of each of the fifth and sixth vibration generating devices 430 and 530 may be directly transferred (or propagated) to the display module 100, thereby enhancing the sound pressure characteristic and sound quality of a sound.

Figure 6:
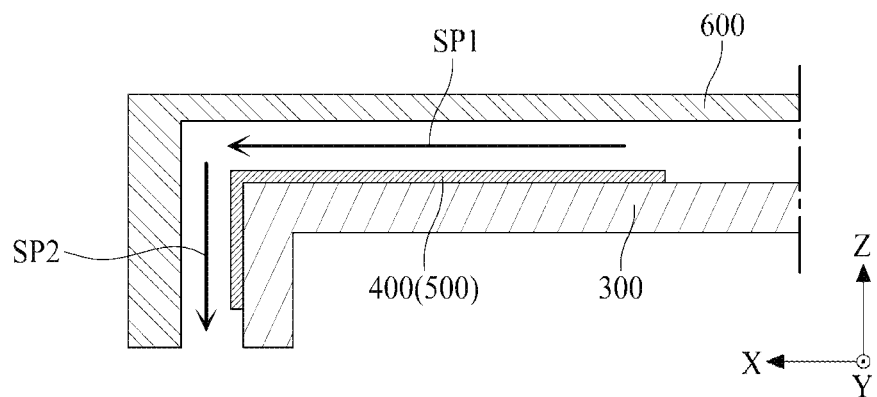
FIG. 6 illustrates a display apparatus according to an embodiment of the present disclosure.

FIG. 6 illustrates a display apparatus according to an embodiment of the present disclosure.

With reference to FIGS. 4 and 6, the first and second vibration generating modules 400 and 500 may be configured at a rear region and a side region of a display module 100. The first and second vibration generating modules 400 and 500 may vibrate the rear region of the display module 100 and may output a sound to a side surface (or sidewall) of a display panel 110. For example, when the first and second vibration generating modules 400 and 500 vibrates according to a signal, a first sound path SP1 may be formed in a space between a system rear cover 600 and a supporting member 300, and the first sound path SP1 may be radiated (or outputted) toward a side surface (or sidewall) of the system rear cover 600. The first sound path SP1 formed between the system rear cover 600 and the supporting member 300 may be radiated (or outputted) toward the side surface (or sidewall) of the system rear cover 600 and may be outputted in a forward direction of the display panel 110 through a second sound path SP2. For example, a sound generated according to the vibration of each of the first and second vibration generating modules 400 and 500 may be outputted as a sound of each of low-pitched, middle-pitched, and high-pitched sound bands using a vibration generating device disposed at the rear region of the display module 100. For example, a sound generated according to the vibration of each of the first and second vibration generating modules 400 and 500 may be outputted as a sound of the high-pitched sound band using the vibration generating device disposed at a side region of the display module 100. Accordingly, a sound or a sound wave generated according to the vibration of each of the first and second vibration generating modules 400 and 500 may be outputted in the forward direction of the display panel 110 or may be radiated (or outputted) in a lateral direction of the display panel 110 and may be directly transferred (or propagated) to the display module 100, thereby enhancing the sound pressure characteristic and sound quality of a sound.

Therefore, in a display apparatus according to an embodiment of the present disclosure, a vibration generating device embedded into the display apparatus may be provided to output sounds of a low-pitched sound band, a middle-pitched sound band, and a high-pitched sound band.

Figure 7:
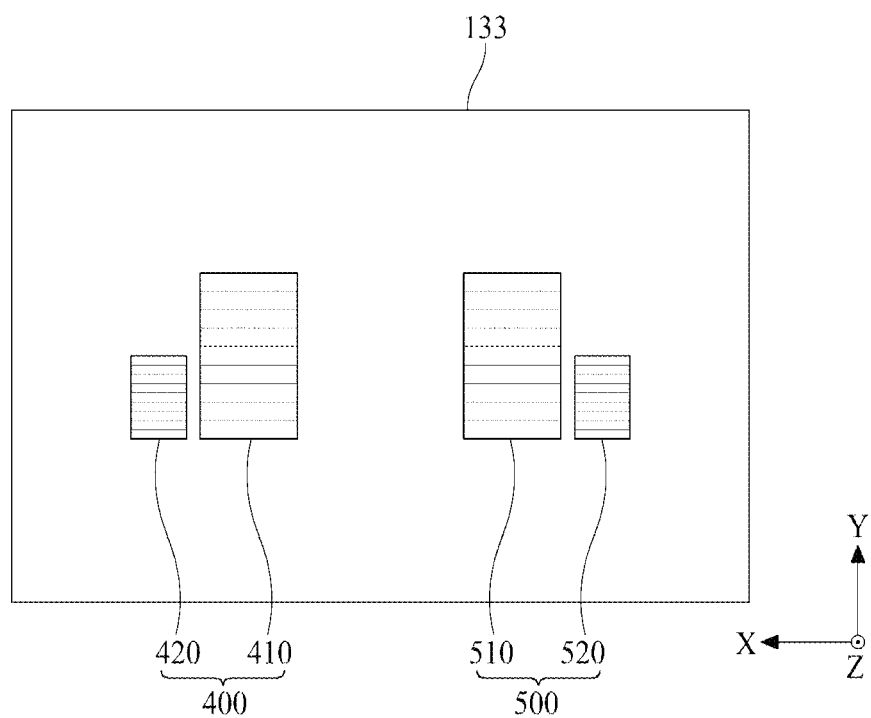
FIG. 7 illustrates a vibration generating module according to another embodiment of the present disclosure.
Figure 8:
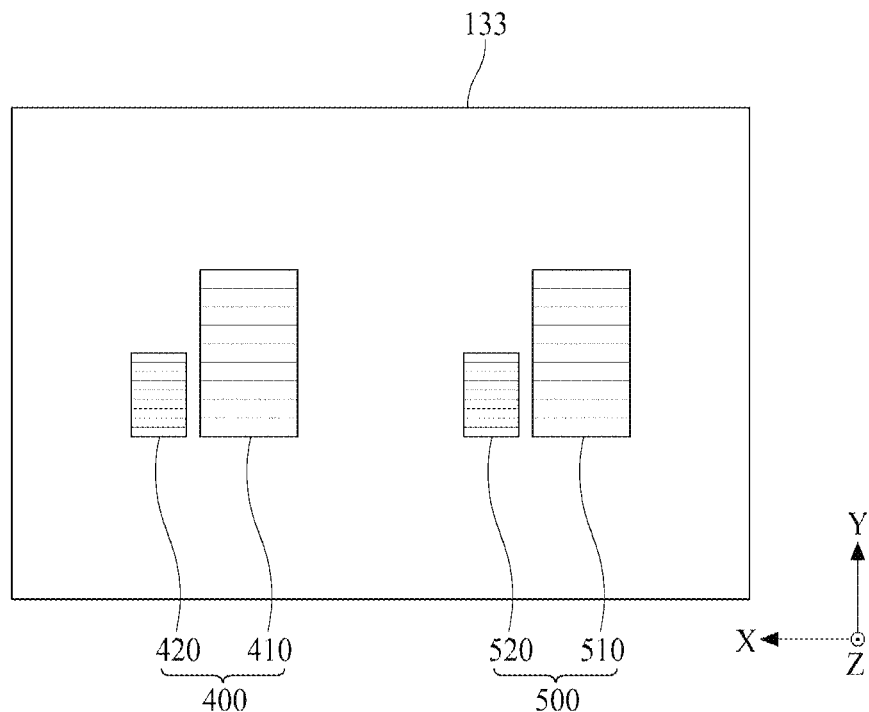
FIG. 8 illustrates a vibration generating module according to another embodiment of the present disclosure.
Figure 9:
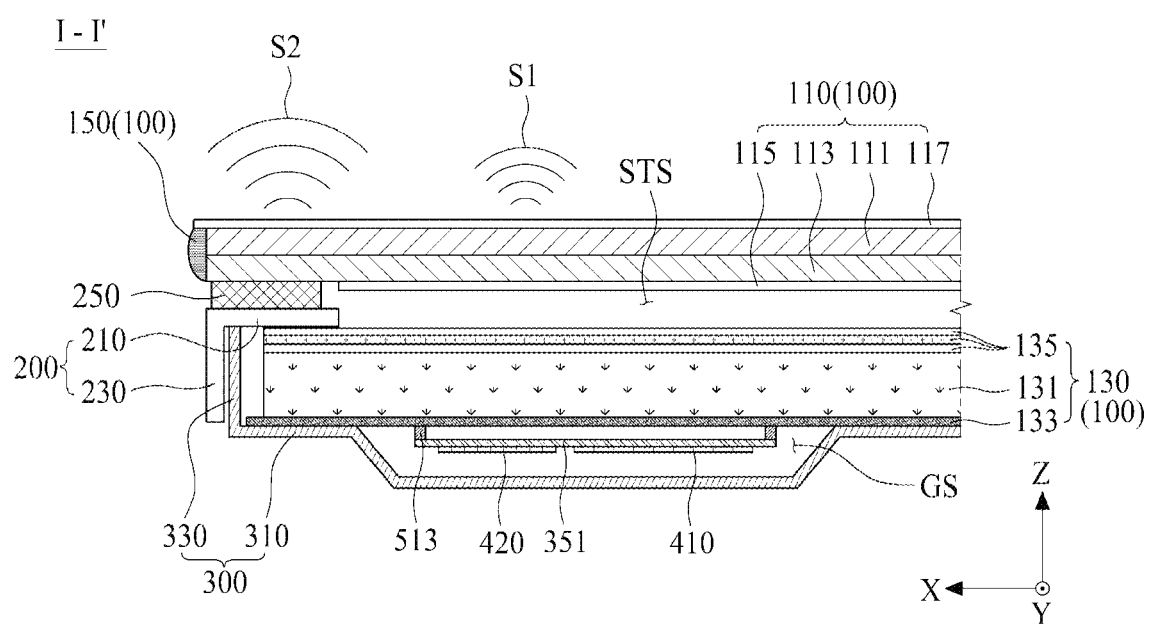
FIG. 9 is another cross-sectional view taken along line I-I' illustrated in FIG. 1.

FIG. 7 illustrates a vibration generating module according to another embodiment of the present disclosure. FIG. 8 illustrates a vibration generating module according to another embodiment of the present disclosure. FIG. 9 is another cross-sectional view taken along line I-I' illustrated in FIG. 1.

With reference to FIGS. 7 and 8, first and second vibration generating modules 400 and 500 according to another embodiment of the present disclosure may be configured on a reflective sheet 133. For example, the first vibration generating module 400 may be configured on a rear surface of the reflective sheet 133 corresponding to a rear surface of a display module. For example, the second vibration generating module 500 may be disposed on the rear surface of the reflective sheet 133 corresponding to the rear surface of the display module. Descriptions of the first and second vibration generating modules 400 and 500 are the same as or similar to descriptions given above with reference to FIGS. 2 to 4, and thus, detailed descriptions are omitted.

With reference to FIG. 7, a first vibration generating module 400 and a second vibration generating module 500 may be disposed on a reflective sheet 133. The first vibration generating module 400 and the second vibration generating module 500 may be disposed to be symmetrical.

With reference to FIG. 8, a first vibration generating module 400 and a second vibration generating module 500 may be disposed on a reflective sheet 133. The first vibration generating module 400 and the second vibration generating module 500 may be disposed to be asymmetrical.

With reference to FIG. 9, a first vibration generating module 400 and a second vibration generating module 500 may be configured between a reflective sheet 133 and a supporting member 300. In the first vibration generating module 400 and the second vibration generating module 500, the reflective sheet 133, a light guide plate 131, and an optical sheet part 135 may be implemented as a vibration plate.

The first vibration generating module 400 may be disposed on a rear surface of the reflective sheet 133 corresponding to a first rear region of a rear region of the display module 100. The first vibration generating module 400 may vibrate the first rear region (for example, a left rear region) among the rear region of the display module 100 to output a sound in a forward direction FD of the display panel 110. For example, when the first vibration generating module 400 vibrates according to a signal, the vibration of the first vibration generating module 400 may vibrate a left region of the supporting member 300 to generate a sound pressure in a gap space GS (or a sound outputting space) between the first vibration generating module 400 and the supporting member 300, and thus, may vibrate the first region of the display module 100 to generate a first sound S1 and a second sound S2. For example, when the first vibration generating module 400 vibrates according to the signal, the sound pressure may be generated in the gap space GS according to the vibration of the first region caused by the vibration of the first vibration generating module 400, a sound pressure may be generated in a sound transfer space STS according to a vibration of the backlight 130 caused by the sound pressure generated in the gap space GS, and the first sound S1 and the second sound S2 generated based on the vibration of the display panel 110 caused by the sound pressure generated in the sound transfer space STS may be outputted in the forward direction FD of the display panel 110. Accordingly, a sound wave generated according to the vibration of the first vibration generating module 400 may be directly transferred (or propagated) to the display module 100, thereby enhancing the sound pressure characteristic and sound quality of the first sound S1 and the second sound S2. The first sound S1 may be outputted by a first vibration generating device 410 and may be a sound of a low-pitched sound band. The second sound S2 may be outputted by a second vibration generating device 420 and may be a sound of a middle-pitched sound band or a middle-high-pitched sound band. For example, the low-pitched sound band may be 200 Hz or less, the middle-pitched sound band may be 200 Hz to 3 kHz, and a high-pitched sound band may be 3 kHz or more.

But embodiments of the present disclosure are not limited thereto. Descriptions thereof are the same as descriptions of the second vibration generating module 500, and thus, detailed descriptions of the second vibration generating module 500 are omitted. For example, the second vibration generating module 500 may be disposed on a rear surface of the reflective sheet 133 corresponding to a second rear region among the rear region of the display module 100.

An adhesive member 513 may be configured between the reflective sheet 133 and a first plate 351. The reflective sheet 133 may be attached on the first vibration generating module 400 by the reflective sheet 133. For example, the adhesive member 513 may include a single-sided tape, a single-sided adhesive pad, a single-sided adhesive gap pad, a single-sided adhesive foam pad, a double-sided tape, a double-sided adhesive pad, a double-sided adhesive gap pad, a double-sided adhesive foam pad, or a bond, but embodiments of the present disclosure are not limited thereto.

As another example, in the first vibration generating module 400, the first plate 351 may be omitted. In this case, the first vibration generating module 400 may be attached on the rear surface of the reflective sheet 133 by an adhesive member, and the adhesive member may be disposed to have the same size as that of the first vibration generating module 400. The adhesive member may include the same material as that of the adhesive member 513 described above, but embodiments of the present disclosure are not limited thereto.

Figure 10:
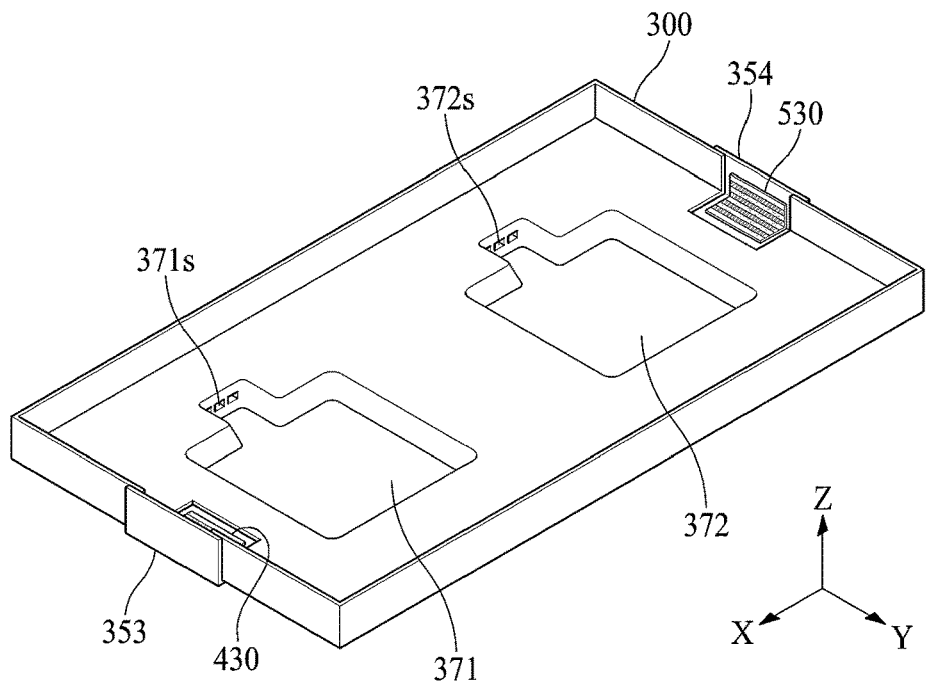
FIG. 10 illustrates a rear surface of a supporting member according to another embodiment of the present disclosure.

FIG. 10 illustrates a rear surface of a supporting member according to another embodiment of the present disclosure.

With reference to FIG. 10, a rear surface of a supporting member 300 according to an embodiment of the present disclosure may include a first forming portion 371 and a second forming portion 372. A vibration generating module described above with reference to FIGS. 2, 3, 7, and 8 may be disposed at the first forming portion 371 and the second forming portion 372.

Fifth and sixth vibration generating devices 430 and 530 may be further configured along a periphery of a supporting member 300. For example, a rear region of the supporting member 300 may correspond to or overlap a periphery of a display module 100. For example, the fifth vibration generating device 430 may be disposed at a periphery region of a rear surface of the supporting member 300 corresponding to a first rear region of the display module 100. For example, the sixth vibration generating device 530 may be disposed at a periphery region of the rear surface of the supporting member 300 corresponding to a second rear region of the display module 100.

The fifth vibration generating device 430 may be disposed on a third plate 353, and the sixth vibration generating device 530 may be disposed on a fourth plate 354. The third plate 353 and the fourth plate 354 may be omitted. For example, the fifth and sixth vibration generating devices 430 and 530 may be disposed along one side (or one sidewall) and the other side (or the other sidewall) of the supporting member 300.

The fifth vibration generating device 430 may vibrate a first periphery region (or a left periphery region) among a periphery region of the display module 100 to output a sound to a side surface (or a sidewall) of the display panel 110. The sixth vibration generating device 530 may vibrate a second periphery region (or a right periphery region) among the periphery region of the display module 100 to output a sound to the side surface of the display panel 110. For example, a sound of each of the fifth and sixth vibration generating devices 430 and 530 may be a sound of a high-pitched sound band. The high-pitched sound band may be 3 kHz or more, but embodiments of the present disclosure are not limited thereto. Therefore, a sound wave generated based on the vibration of each of the fifth and sixth vibration generating devices 430 and 530 may be directly transferred (or propagated) to the display module 100, thereby enhancing the sound pressure characteristic and sound quality of a sound.

A first hole 371s may be configured at one side of the first forming portion 371. A second hole 372s may be configured at one side of the second forming portion 372. For example, the first hole 371s and the second hole 372s may be a plurality of holes which communicate with a space between a periphery of the supporting member 300 and the first and second vibration generating devices 400 and 500. The first hole 371s and the second hole 372s may be formed through a patterning process or a punching process performed on the supporting member 300, but embodiments of the present disclosure are not limited thereto. For example, the first hole 371s and the second hole 372s may enhance a reflective characteristic of a sound between the supporting member 300 and the first and second vibration generating devices 400 and 500, thereby enhancing a sound of the high-pitched sound band.

Figure 11:
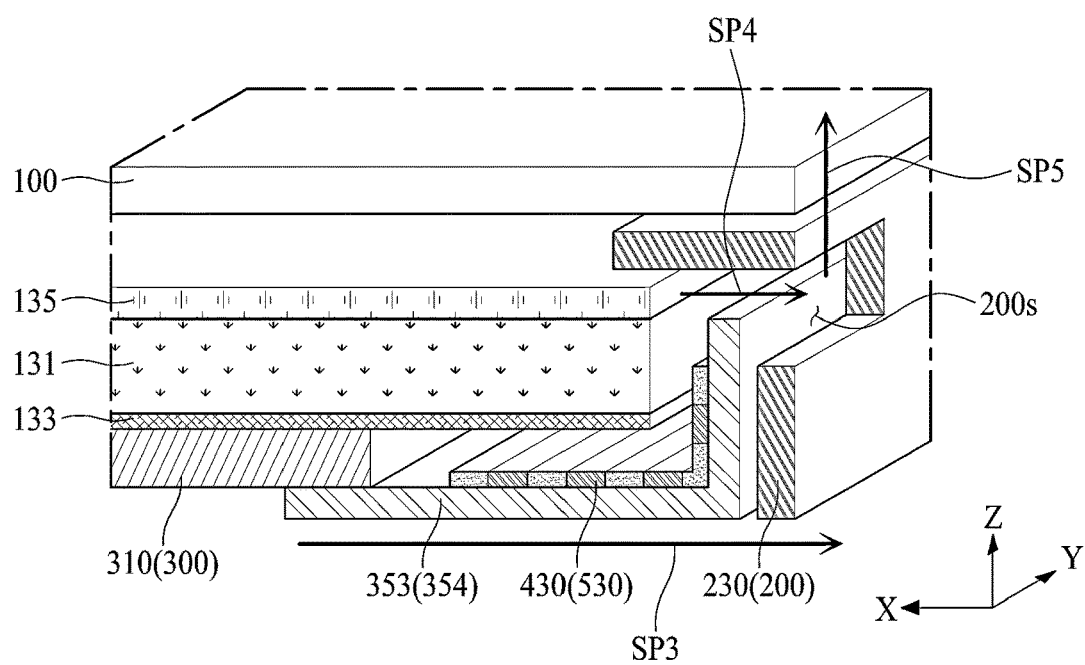
FIG. 11 illustrates a display apparatus according to an embodiment of the present disclosure.

FIG. 11 illustrates a display apparatus according to an embodiment of the present disclosure.

With reference to FIGS. 9 and 11, first and second vibration generating modules 400 and 500 may be configured in a rear region and a side region of a display module 100. The first and second vibration generating modules 400 and 500 may vibrate the rear region of the display module 100 and may output a sound in a lateral direction of a display panel 110. For example, when the first and second vibration generating modules 400 and 500 vibrate based on a signal, a third sound path SP1 may be generated (or formed) in a rearward direction of the supporting member 300 due to the vibration of the first and second vibration generating modules 400 and 500. For example, a sound pressure may be generated (or formed) in a gap space GS (or a sound outputting space) between the first and second vibration generating modules 400 and 500 and the supporting member 300, and thus, the third sound path SP3 of the display module 100 may be generated in a rear surface of the supporting member 300.

For example, a panel supporting part 200 may further include a groove 200s. The groove 200s may be a slit or a hole, but embodiments of the present disclosure are not limited thereto. The groove 200s of the panel supporting part 200 may allow a sound to be outputted in a lateral direction or a forward direction, based on a vibration of each of the first and second vibration generating modules 400 and 500 disposed on a side surface of the display module 100. A fourth sound path SP4 may be generated (or formed) toward a side surface of the display module 100 through the groove 200s of the panel supporting part 200. The fourth sound path SP4 may be radiated (or outputted) at a side surface of the panel supporting part 200, and thus, a fifth sound path SP5 may be generated or formed, whereby a sound may be outputted in the forward direction of the display panel 110 through the fifth sound path SP5. For example, the fourth sound path SP4 may be radiated (or outputted) at a side portion 230 of the panel supporting part 200. A sound generated according to the vibration of each of the first and second vibration generating modules 400 and 500 may be outputted as a sound of each of low-pitched, middle-pitched, and high-pitched sound bands using a vibration generating device disposed at the rear region of the display module 100. For example, a sound generated according to the vibration of each of the first and second vibration generating modules 400 and 500 may be outputted as a sound of the high-pitched sound band using a vibration generating device disposed at a side region of the display module 100. Accordingly, a sound or a sound wave generated according to the vibration of each of the first and second vibration generating modules 400 and 500 may be outputted in the forward direction of the display panel 110 or may be radiated in a lateral direction of the display panel 110 and may be directly transferred (or propagated) to the display module 100, thereby enhancing the sound pressure characteristic and sound quality of a sound.

Therefore, in a display apparatus according to an embodiment of the present disclosure, a vibration generating device embedded into the display apparatus may be provided to output sounds of a low-pitched sound band, a middle-pitched sound band, and a high-pitched sound band.

Figure 12:
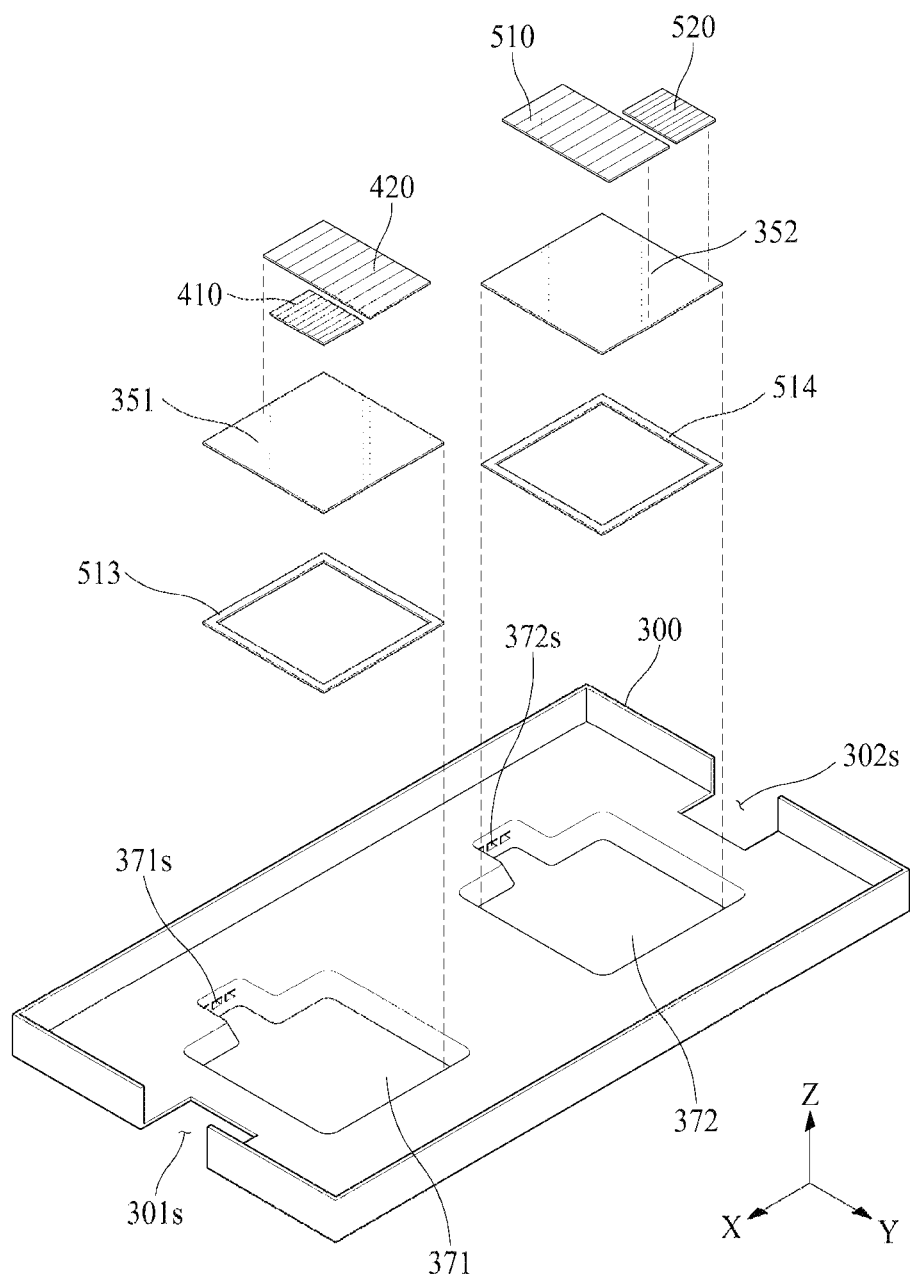
FIG. 12 is an exploded view of a display apparatus according to an embodiment of the present disclosure.

FIG. 12 is an exploded view of a display apparatus according to an embodiment of the present disclosure.

With reference to FIG. 12, a first forming portion 371 and a second forming portion 372 may be configured in a rear surface of a supporting member 300. A first plate 351 may be disposed on the first forming portion 371. For example, the first forming portion 371 may accommodate the first plate 351. A first adhesive member 513 may be disposed between the first forming portion 371 and the first plate 351. A first vibration generating device 410 and a second vibration generating device 420 may be disposed on the first plate 351. For example, the first vibration generating device 410 and the second vibration generating device 420 may be accommodated into the first forming portion 371. A first hole 371s may be further configured at one side of the first forming portion 371. A first groove 301s may be further configured in a periphery of one side of the supporting member 300. The first groove 301s may be a slit or a hole, but embodiments of the present disclosure are not limited thereto. For example, the periphery of the one side of the supporting member 300 may correspond to or overlap a periphery of a first rear region of the display module 100. A fifth vibration generating device 430 may be disposed at the first groove 301s. For example, the fifth vibration generating device 430 may be disposed at a periphery of the supporting member 300 corresponding to the periphery of the first rear region of the display module 100.

A second plate 352 may be disposed on the second forming portion 372. For example, the second forming portion 372 may accommodate the second plate 352. A third vibration generating device 510 and a fourth vibration generating device 520 may be disposed on the second plate 352. For example, the third vibration generating device 510 and the fourth vibration generating device 520 may be accommodated into the second forming portion 372. A second adhesive member 514 may be disposed between the second forming portion 372 and the second plate 352. A second hole 372s may be further configured at one side of the second forming portion 372. A second groove 302s may be further configured in a periphery of the other side of the supporting member 300. The second groove 302s may be a slit or a hole, but embodiments of the present disclosure are not limited thereto. For example, the periphery of the one side of the supporting member 300 may correspond to or overlap a periphery of a second rear region of the display module 100. A sixth vibration generating device 530 may be disposed at the second groove 302s. For example, the sixth vibration generating device 530 may be disposed at a periphery of the supporting member 300 corresponding to the periphery of the second rear region of the display module 100.

Therefore, a vibration generating module according to an embodiment of the present disclosure may include two vibration generating devices which output sounds of different sound bands, thereby providing a display apparatus for outputting sounds of low-pitched, middle-pitched, and high-pitched sound bands. A vibration generating device for outputting a sound of the high-pitched sound band may be further provided at a periphery of a rear surface of a supporting member, thereby providing a display apparatus where a sound pressure of the high-pitched sound band is more enhanced.

FIGS. 13A to 13F illustrate a rear surface of a supporting member.

With reference to FIGS. 13A to 13F, a rear surface of a supporting member is illustrated, and a vibration generating device disposed at a forming portion will be described below.

Figure 13A:
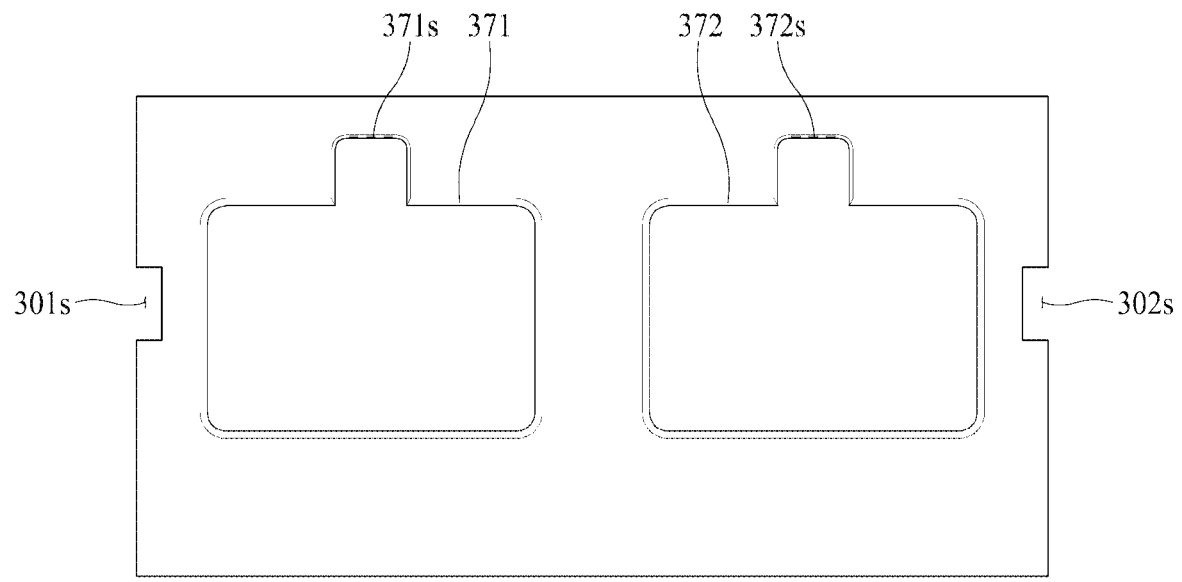
FIGS. 13A to 13F illustrate a rear surface of a supporting member.

With reference to FIG. 13A, a first forming portion 371 and a second forming portion 372 may be configured at a rear surface of a supporting member 300. The first forming portion 371 and the second forming portion 372 may correspond to a rear region of a display module 100. The first forming portion 371 may correspond to a left rear region among the rear region of the display module 100. For example, the first forming portion 371 may correspond to a first rear region among the rear region of the display module 100. The second forming portion 372 may correspond to a right rear region among the rear region of the display module 100. For example, the second forming portion 372 may correspond to a second rear region among the rear region of the display module 100. A first vibration generating module including two or more vibration generating devices for outputting sounds of different sound bands may be disposed at the first forming portion 371. For example, the first vibration generating module may include a first vibration generating device and a second vibration generating device. The first vibration generating module may output a sound of a low-middle-pitched sound band. The first vibration generating module may be configured so that a sound band thereof increases in a direction from a center of the display module 100 to a periphery of the display module 100. For example, the first vibration generating module may be configured to have different sound bands in a direction from the center of the display module 100 to the periphery of the display module 100 with respect to a widthwise direction of the display module 100. The first vibration generating module may be configured so that a sound band thereof increases in a direction from a center of the supporting member 300 to a periphery of the supporting member 300. For example, the first vibration generating module may include a first vibration generating device which is disposed on a rear surface of the display module 100 to have a low-pitched sound band, and a second vibration generating device which is disposed on the rear surface of the display module 100 to have a middle-pitched sound band. For example, the first vibration generating module may include a first vibration generating device which is disposed at the center of the supporting member 300 to have the low-pitched sound band, and a second vibration generating device which is disposed at the periphery of the supporting member 300 to have the middle-pitched sound band. For example, the first vibration generating module may be configured so that a sound band thereof increases in a direction from a right side to a left side with respect to a widthwise direction of the first forming portion 371. As another example, the first vibration generating module may output a sound of each of low-pitched, middle-pitched, and high-pitched sound bands. The first vibration generating module may be configured so that a sound band thereof increases in a direction from the center of the supporting member 300 to the periphery of the supporting member 300. For example, the first vibration generating module may include a first vibration generating device which is disposed on the rear surface of the display module 100 to have the low-pitched sound band, and a second vibration generating device which is disposed on the rear surface of the display module 100 to have the middle-pitched sound band. For example, the first vibration generating module may include a first vibration generating device, which is disposed at the center of the supporting member 300 to have the low-pitched sound band, and a second vibration generating device which is disposed at the periphery of the supporting member 300 to have a middle-high-pitched sound band. For example, the first vibration generating module may be configured so that a sound band thereof increases in a direction from a right side to a left side with respect to the widthwise direction of the first forming portion 371.

A second vibration generating module including two or more vibration generating devices for outputting sounds of different sound bands may be disposed at the second forming portion 372. The second vibration generating module may include a third vibration generating device and a fourth vibration generating device. For example, the second vibration generating module may output a sound of the low-middle-pitched sound band. The second vibration generating module may be configured so that a sound band thereof increases in a direction from the center of the supporting member 300 to the periphery of the supporting member 300. For example, the second vibration generating module may be configured to have different sound bands in a direction from the center of the display module 100 to the periphery of the display module 100 with respect to the widthwise direction of the display module 100. For example, the second vibration generating module may include a third vibration generating device which is disposed on the rear surface of the display module 100 to have the low-pitched sound band, and a fourth vibration generating device which is disposed on the rear surface of the display module 100 to have the middle-pitched sound band. For example, the second vibration generating module may include a third vibration generating device which is disposed at the center of the supporting member 300 to have the low-pitched sound band, and a fourth vibration generating device which is disposed at the periphery of the supporting member 300 to have the middle-pitched sound band. For example, the second vibration generating module may be configured so that a sound band thereof increases in a direction from a left side to a right side with respect to a widthwise direction of the second forming portion 372. As another example, the second vibration generating module may output a sound of each of low-pitched, middle-pitched, and high-pitched sound bands. The second vibration generating module may be configured so that a sound band thereof increases in a direction from the center of the supporting member 300 to the periphery of the supporting member 300. For example, the second vibration generating module may include a third vibration generating device which is disposed on the rear surface of the display module 100 to have the low-pitched sound band, and a fourth vibration generating device which is disposed on the rear surface of the display module 100 to have the middle-pitched sound band. For example, the second vibration generating module may include a third vibration generating device which is disposed at the center of the supporting member 300 to have the low-pitched sound band, and a fourth vibration generating device which is disposed at the periphery of the supporting member 300 to have the middle-high-pitched sound band. For example, the second vibration generating module may be configured so that a sound band thereof increases in a direction from a left side to a right side with respect to the widthwise direction of the second forming portion 372.

The first vibration generating module disposed at the first forming portion 371 may be configured to be asymmetrical with the second vibration generating module disposed at the second forming portion 372. For example, the first vibration generating module disposed at the first forming portion 371 may include a first vibration generating device which is disposed at the center of the supporting member 300 to have the low-pitched sound band, and a second vibration generating device which is disposed at the periphery of the supporting member 300 to have the middle-pitched sound band or the middle-high-pitched sound band. The second vibration generating module disposed at the second forming portion 372 may include a third vibration generating device which is disposed at the center of the supporting member 300 to have the low-pitched sound band, and a fourth vibration generating device which is disposed at the periphery of the supporting member 300 to have the middle-pitched sound band or the middle-high-pitched sound band. But embodiments of the present disclosure are not limited thereto, and the first vibration generating module disposed at the first forming portion 371 may be configured to be symmetrical with the second vibration generating module disposed at the second forming portion 372. For example, the first vibration generating module disposed at the first forming portion 371 may include a first vibration generating device which is disposed at the center of the supporting member 300 to have the low-pitched sound band, and a second vibration generating device which is disposed at the periphery of the supporting member 300 to have the middle-pitched sound band or the middle-high-pitched sound band. The second vibration generating module disposed at the second forming portion 372 may include a fourth vibration generating device which is disposed at the center of the supporting member 300 to have the middle-pitched sound band or the middle-high-pitched sound band, and a third vibration generating device which is disposed at the periphery of the supporting member 300 to have the low-pitched sound band and.

Therefore, according to an embodiment of the present disclosure, a vibration generating module including two or more vibration generating devices for outputting sounds of different sound bands may be modularized, thereby enhancing the degree of freedom in placing a vibration generating module.

According to an embodiment of the present disclosure, a vibration generating module including two or more vibration generating devices for outputting sounds of different sound bands may be provided at each of the first forming portion 371 and the second forming portion 372, and each of the first forming portion 371 and the second forming portion 372 may be a partition of a corresponding vibration generating module. A partition may separate each of a sound and a channel, thereby providing a clear sound. Also, a vibration generating module and a partition may be modularized and provided at each of the first forming portion 371 and the second forming portion 372, thereby enhancing the degree of freedom in placing a vibration generating module.

The display apparatus according to an embodiment of the present disclosure may further include a protrusion portion disposed at one side of the first forming portion 371 and a first hole 371s disposed at one side of the protrusion portion. The display apparatus according to an embodiment of the present disclosure may further include a protrusion portion disposed at one side of the second forming portion 372 and a second hole 372s disposed at one side of the protrusion portion. The first hole 371s and the second hole 372s may enhance a reflective characteristic of a sound between the supporting member 300 and the vibration generating module, thereby enhancing a sound of the high-pitched sound band. But embodiments of the present disclosure are not limited thereto, and a protrusion portion and a hole of a forming portion may be omitted.

With reference to FIG. 13A, the display apparatus according to an embodiment of the present disclosure may further include a first groove 301s disposed at a periphery of one side of the supporting member 300 and a second groove 302s disposed at a periphery of the other side of the supporting member 300. For example, the first groove 301s and the second groove 302s may be disposed at centers of the first forming portion 371 and the second forming portion 372. For example, the first groove 301s and the second groove 302s may be disposed at a center of the supporting member 300. For example, the first groove 301s and the second groove 302s may be disposed at a center of a rear surface of the supporting member 300. A fifth vibration generating device and a sixth vibration generating device may be further disposed at the first groove 301s and the second groove 302s. Accordingly, a sound of the high-pitched sound band may be more enhanced. Each of the first to sixth vibration generating devices may be implemented as the vibration generating device described above with reference to FIGS. 1 to 12.

Figure 13B:
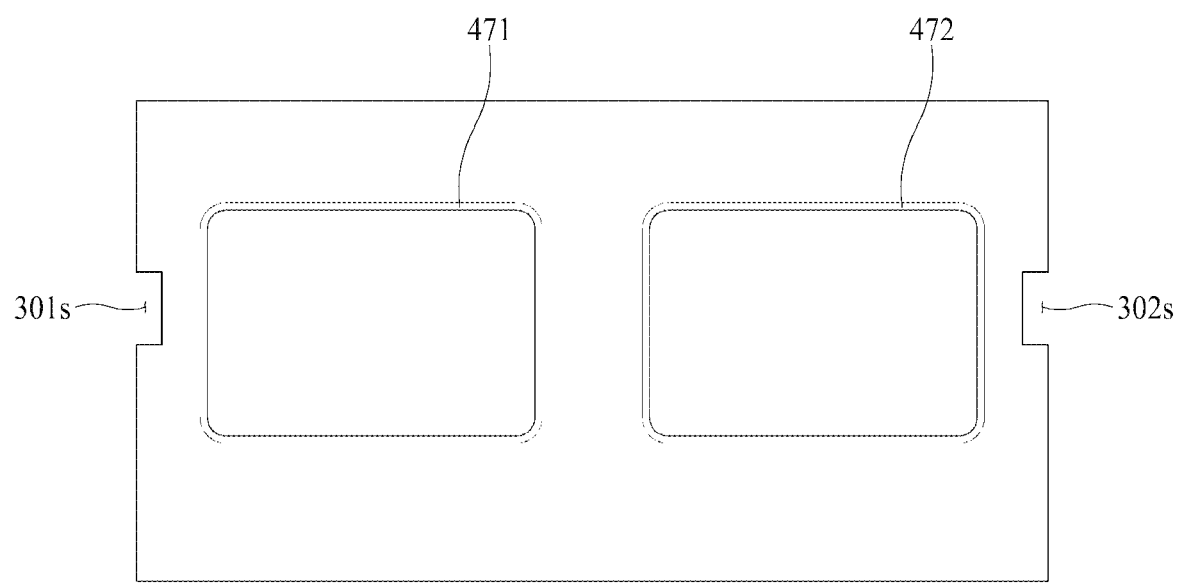

With reference to FIG. 13B, a first forming portion 471 and a second forming portion 472 may be configured at a rear surface of a supporting member 300. A first vibration generating module including two or more vibration generating devices for outputting sounds of different sound bands may be disposed at the first forming portion 471. A second vibration generating module including two or more vibration generating devices for outputting sounds of different sound bands may be disposed at the second forming portion 472. In the first forming portion 471 and the second forming portion 472, a first hole 371s and a second hole 372s may be omitted. As in FIG. 13A, in the first forming portion 471 and the second forming portion 472, a protrusion portion where the first hole 371s and a second hole 372s are disposed may be omitted. A volume of the first forming portion 471 including no protrusion portion may be greater than that of the first forming portion 371 including the protrusion portion. For example, a frequency corresponding to a volume of the first forming portion 471 or the second forming portion 472 may be 702 Hz. For example, a frequency corresponding to a volume of the first forming portion 471 or the second forming portion 472 illustrated in FIG. 13A may be 590 Hz. Therefore, a frequency in FIG. 13B where a protrusion is not provided may be higher than a frequency in FIG. 13A where a protrusion is provided. Therefore, a frequency may vary based on a size of a first forming portion or a second forming portion. Except for the first and second forming portions, the other elements are the same as those of FIG. 13A, and thus, their detailed descriptions are omitted.

Figure 13C:
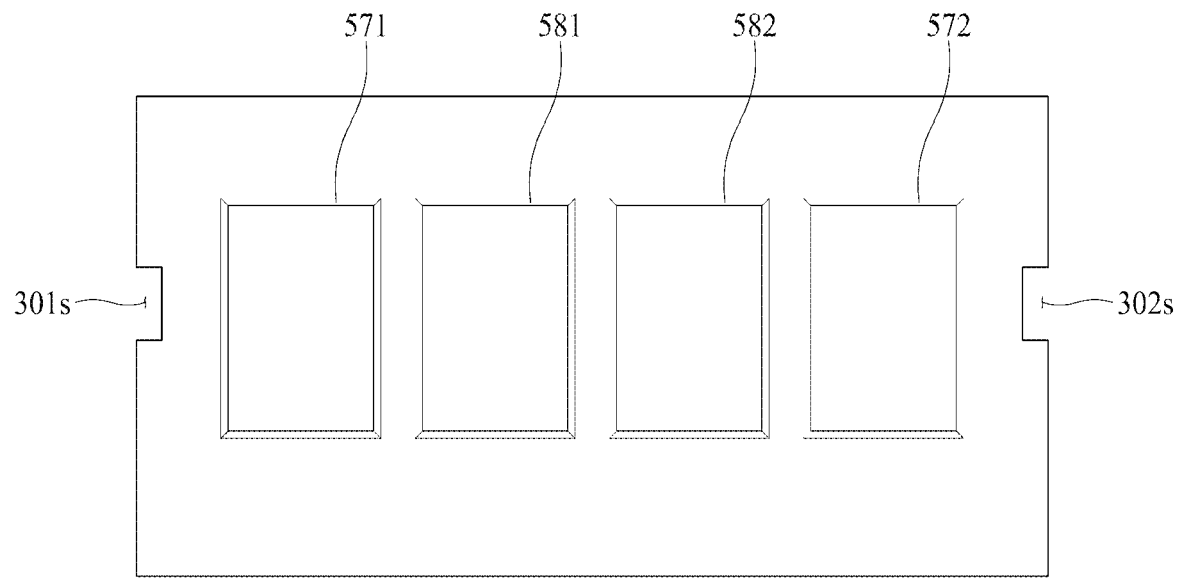

With reference to FIG. 13C, a first forming portion 571, a second forming portion 572, a third forming portion 581, and a fourth forming portion 582 may be configured at a rear surface of a supporting member 300. The first forming portion 571 and the third forming portion 581 may correspond to a left rear region among a rear region of a display module 100. For example, the first forming portion 571 and the third forming portion 581 may correspond to a first rear region among the rear region of the display module 100. The second forming portion 572 and the fourth forming portion 582 may correspond to a right rear region among the rear region of the display module 100. For example, the second forming portion 572 and the fourth forming portion 582 may correspond to a second rear region among the rear region of the display module 100. Vibration generating devices having different sound bands may be respectively disposed at the first to fourth forming portions 571, 572, 581, and 582. For example, a vibration generating device disposed at each of the first to fourth forming portions 571, 572, 581, and 582 may be configured to have different sound bands in a direction from a center of the display module 100 to a periphery of the display module 100 with respect to a widthwise direction of the display module 100. For example, a vibration generating device having the middle-pitched sound band or the middle-high-pitched sound band may be disposed at the first forming portion 571 and the second forming portion 572. For example, a vibration generating device having the low-pitched sound band may be disposed at the third forming portion 581 and the fourth forming portion 582. As another example, a vibration generating device having the middle-pitched sound band or the middle-high-pitched sound band may be disposed at the first forming portion 571 and the fourth forming portion 582. For example, a vibration generating device having the low-pitched sound band may be disposed at the second forming portion 572 and the third forming portion 581. The first to fourth forming portions 571, 572, 581, and 582 may be configured to have the same size, but embodiments of the present disclosure are not limited thereto.

According to an embodiment of the present disclosure, a vibration generating device may be provided at each of the first to fourth forming portions 571, 572, 581, and 582, and each of the first to fourth forming portions 571, 572, 581, and 582 may be a partition of a corresponding vibration generating device. A partition may separate each of a sound and a channel, thereby providing a clear sound. Also, a vibration generating device and a partition may be modularized and provided at each of the first to fourth forming portions 571, 572, 581, and 582, thereby enhancing the degree of freedom in placing a vibration generating device.

The display apparatus according to an embodiment of the present disclosure may further include a first groove 301s disposed at a periphery of one side of the supporting member 300 and a second groove 302s disposed at a periphery of the other side of the supporting member 300. For example, the first groove 301s and the second groove 302s may be disposed at centers of the first to fourth forming portions 571, 572, 581, and 582. For example, the first groove 301s and the second groove 302s may be disposed at a center of the supporting member 300. For example, the first groove 301s and the second groove 302s may be disposed at a center of a rear surface of the supporting member 300. A fifth vibration generating device and a sixth vibration generating device may be further disposed at the first groove 301s and the second groove 302s. Accordingly, a sound of the high-pitched sound band may be more enhanced.

As in FIG. 13, a hole may be further configured at each of the first to fourth forming portions 571, 572, 581, and 582. Accordingly, a sound of the high-pitched sound band may be more enhanced.

Figure 13D:
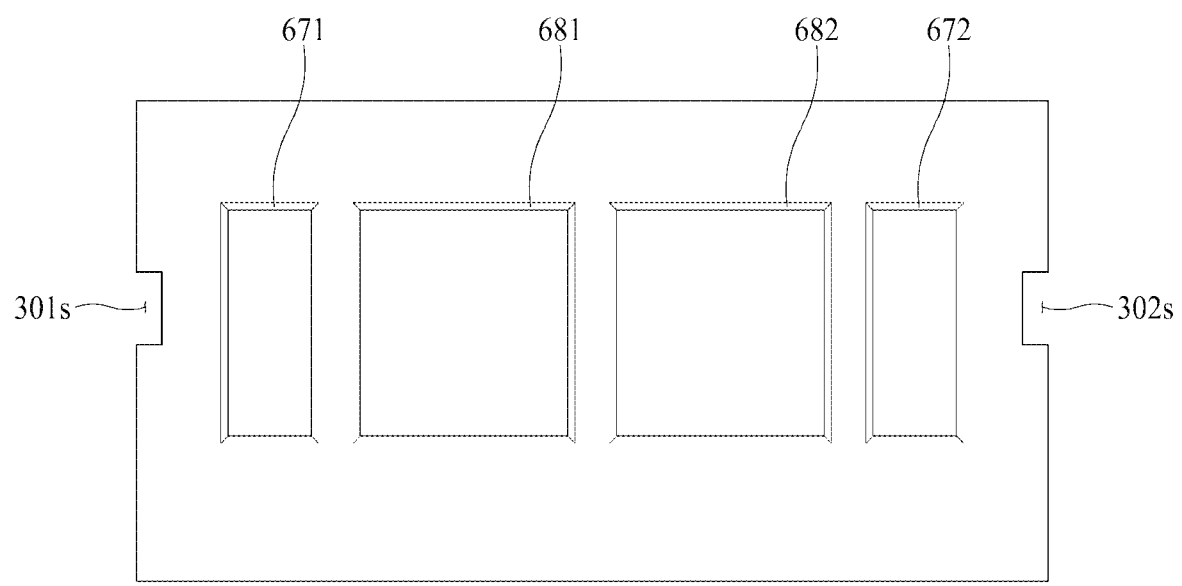

With reference to FIG. 13D, a first forming portion 671, a second forming portion 672, a third forming portion 681, and a fourth forming portion 682 may be configured at a rear surface of a supporting member 300. The first forming portion 671, the second forming portion 672, the third forming portion 681, and the fourth forming portion 682 may be provided at a rear region of a display module 100. For example, the first forming portion 671 and the third forming portion 681 may correspond to a left rear region among the rear region of a display module 100. For example, the first forming portion 671 and the third forming portion 681 may correspond to a first rear region among the rear region of the display module 100. The second forming portion 672 and the fourth forming portion 682 may correspond to a right rear region among the rear region of the display module 100. For example, the second forming portion 672 and the fourth forming portion 682 may correspond to a second rear region among the rear region of the display module 100. Vibration generating devices having different sound bands may be respectively configured at the first to fourth forming portions 671, 672, 681, and 682. For example, a vibration generating device disposed at each of the first to fourth forming portions 671, 672, 681, and 682 may be configured to have different sound bands in a direction from a center of the display module 100 to a periphery of the display module 100 with respect to a widthwise direction of the display module 100. For example, a vibration generating device having the middle-pitched sound band or the middle-high-pitched sound band may be disposed at the first forming portion 671 and the second forming portion 672. For example, a vibration generating device having the low-pitched sound band may be disposed at the third forming portion 681 and the fourth forming portion 682. As another example, a vibration generating device having the middle-pitched sound band or the middle-high-pitched sound band may be disposed at the first forming portion 671 and the fourth forming portion 682. For example, a vibration generating device having the low-pitched sound band may be disposed at the second forming portion 672 and the third forming portion 681.

According to an embodiment of the present disclosure, a vibration generating device may be provided at each of the first to fourth forming portions 671, 672, 681, and 682, and each of the first to fourth forming portions 671, 672, 681, and 682 may be a partition of a corresponding vibration generating device. A partition may separate each of a sound and a channel, thereby providing a clear sound. Also, a vibration generating device may be provided at each of the first to fourth forming portions 671, 672, 681, and 682, each of the first to fourth forming portions 671, 672, 681, and 682 may be configured as a partition, and a vibration generating device and a partition may be modularized and provided at each of the first to fourth forming portions 671, 672, 681, and 682, thereby enhancing the degree of freedom in placing a vibration generating device.

The first to fourth forming portions 671, 672, 681, and 682 may be configured to have the same size or different sizes. For example, a size of each of the third and fourth forming portions 681 and 682 where a vibration generating device having the low-pitched sound band is disposed may be set to be greater than that of each of the first and second forming portions 671 and 672 where a vibration generating device having the middle-pitched sound band or the middle-high-pitched sound band is disposed. But embodiments of the present disclosure are not limited thereto, and sizes of the first to fourth forming portions 671, 672, 681, and 682 may be the same. For example, when a size of each of the third and fourth forming portions 681 and 682, where a vibration generating device having the low-pitched sound band is disposed, is greater than that of each of the first and second forming portions 671 and 672 where a vibration generating device having the middle-pitched sound band or the middle-high-pitched sound band is disposed, a vibration area and an air volume may increase, thereby more enhancing a sound pressure of the low-pitched sound band.

The display apparatus according to an embodiment of the present disclosure may further include a first groove 301s disposed at a periphery of one side of the supporting member 300 and a second groove 302s disposed at a periphery of the other side of the supporting member 300. For example, the first groove 301s and the second groove 302s may be disposed at centers of the first to fourth forming portions 571, 572, 581, and 582. For example, the first groove 301s and the second groove 302s may be disposed at a center of the supporting member 300. A fifth vibration generating device and a sixth vibration generating device may be further disposed at the first groove 301s and the second groove 302s. Accordingly, a sound of the high-pitched sound band may be more enhanced.

Figure 13E:
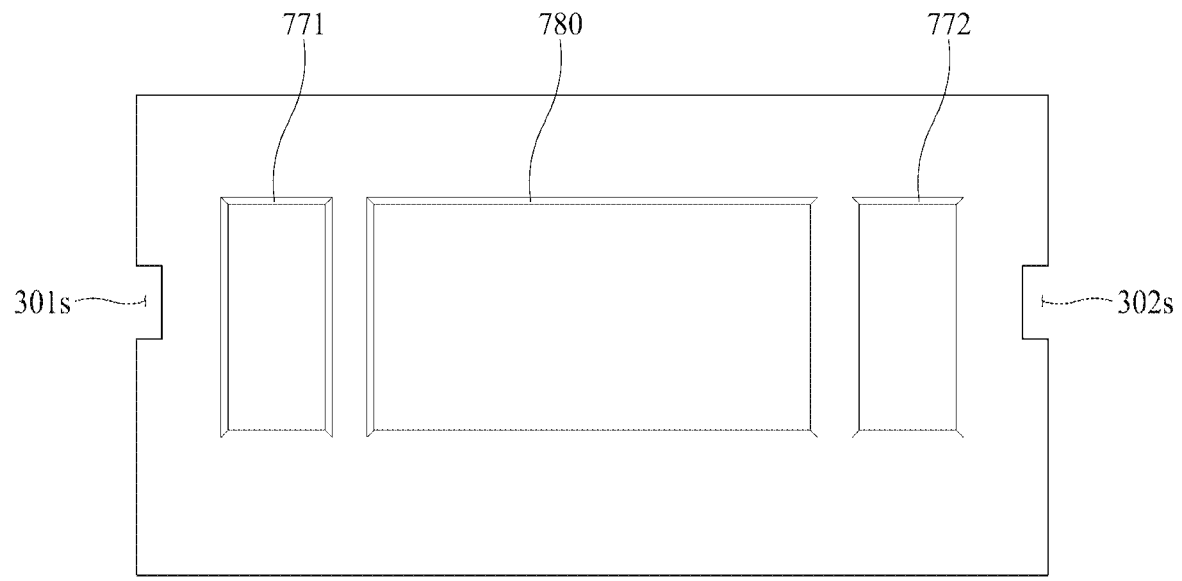

With reference to FIG. 13E, a first forming portion 771, a second forming portion 772, and a third forming portion 780 may be provided at a rear surface of a supporting member 300. The first forming portion 771, the second forming portion 772, and the third forming portion 780 may correspond to a rear region of a display module 100. For example, the first forming portion 771 may correspond to a left rear region among the rear region of the display module 100. For example, the first forming portion 771 may correspond to a first rear region among the rear region of the display module 100. The second forming portion 772 may correspond to a right rear region among the rear region of the display module 100. For example, the second forming portion 772 may correspond to a second rear region among the rear region of the display module 100. The third forming portion 780 may correspond to a center region among the rear region of the display module 100. Vibration generating devices having different sound bands may be respectively disposed at the first to third forming portions 771, 772, and 780. For example, a vibration generating device disposed at each of the first to third forming portions 771, 772, and 780 may be configured to have different sound bands in a direction from a center of the display module 100 to a periphery of the display module 100 with respect to a widthwise direction of the display module 100. For example, a vibration generating device having the middle-pitched sound band or the middle-high-pitched sound band may be disposed at the first forming portion 771 and the second forming portion 772. For example, a vibration generating device having the low-pitched sound band may be disposed at the third forming portion 780.

According to an embodiment of the present disclosure, a vibration generating device may be provided at each of the first to third forming portions 771, 772, and 780, and each of the first to third forming portions 771, 772, and 780 may be a partition of a corresponding vibration generating device. A partition may separate each of a sound and a channel, thereby providing a clear sound. Also, a vibration generating device and a partition may be modularized and provided at each of the first to third forming portions 771, 772, and 780, thereby enhancing the degree of freedom in placing a vibration generating device. For example, a vibration generating device may be provided at each of the first to third forming portions 771, 772, and 780, each of the first to third forming portions 771, 772, and 780 may be configured as a partition, and a vibration generating device and a partition may be modularized and provided at each of the first to third forming portions 771, 772, and 780, thereby enhancing the degree of freedom in placing a vibration generating device.

The first to third forming portions 771, 772, and 780 may be configured to have the same size or different sizes. For example, a size of the third forming portion 780 where a vibration generating device having the low-pitched sound band is disposed may be set to be greater than that of each of the first and second forming portion 771 and 772 where a vibration generating device having the middle-pitched sound band or the middle-high-pitched sound band is disposed. However, the present disclosure is not limited thereto, and sizes of the first to third forming portions 771, 772, and 780 may be the same. For example, when a size of the third forming portion 780, where a vibration generating device having the low-pitched sound band is disposed, is greater than that of each of the first and second forming portion 771 and 772 where a vibration generating device having the middle-pitched sound band or the middle-high-pitched sound band is disposed, a sound pressure of the low-pitched sound band may be more enhanced.

The display apparatus according to an embodiment of the present disclosure may further include a first groove 301s disposed at a periphery of one side of the supporting member 300 and a second groove 302s disposed at a periphery of the other side of the supporting member 300. For example, the first groove 301s and the second groove 302s may be disposed at centers of the first to third forming portions 771, 772, and 780. For example, the first groove 301s and the second groove 302s may be disposed at a center of the supporting member 300. A fifth vibration generating device and a sixth vibration generating device may be further disposed at the first groove 301s and the second groove 302s. Accordingly, a sound of the high-pitched sound band may be more enhanced.

Figure 13F:
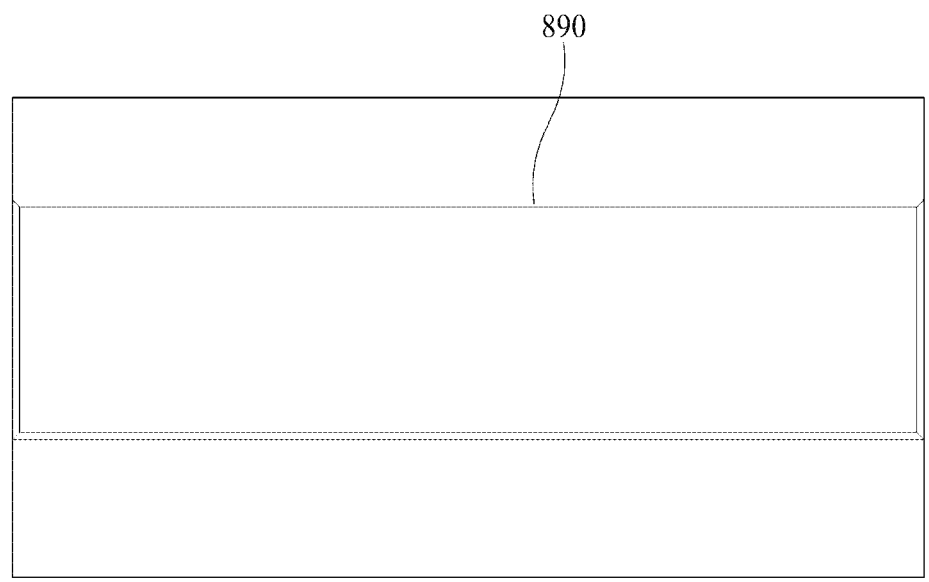

With reference to FIG. 13F, a first forming portion 890 may be configured in a rear surface of a supporting member 300. The first forming portion 890 may correspond to a rear region of a display module 100. A vibration generating module having different sound bands may be configured in the first forming portion 890. For example, a vibration generating module including a vibration generating device having the middle-pitched sound band or the middle-high-pitched sound band and a vibration generating device having the low-pitched sound band may be disposed at the first forming portion 890. As another example, a vibration generating module including a vibration generating device having the middle-pitched sound band, a vibration generating device having the high-pitched sound band, and a vibration generating device having the low-pitched sound band may be disposed at the first forming portion 890.

For example, a vibration generating module may be configured so that a sound band thereof increases in a direction from a right side of the supporting member 300 to a left side of the supporting member 300. The vibration generating module may include a vibration generating module including a vibration generating device which is disposed at the right side of the supporting member 300 to have the low-pitched sound band, and a vibration generating device which is disposed at the left side of the supporting member 300 to have the middle-pitched sound band or the middle-high-pitched sound band. As another example, a vibration generating module may include a vibration generating device disposed at the right side of the supporting member 300 to have the low-pitched sound band, a vibration generating device disposed at the left side of the supporting member 300 to have the high-pitched sound band, and a vibration generating device having the middle-pitched sound band disposed between the vibration generating device having the low-pitched sound band and the vibration generating device having the high-pitched sound band.

As another example, a vibration generating module may be configured so that a sound band thereof increases in a direction from the left side of the supporting member 300 to the right side of the supporting member 300. The vibration generating module may include a vibration generating module including a vibration generating device which is disposed at the left side of the supporting member 300 to have the low-pitched sound band, and a vibration generating device which is disposed at the right side of the supporting member 300 to have the middle-pitched sound band or the middle-high-pitched sound band. As another example, a vibration generating module may include a vibration generating device disposed at the left side of the supporting member 300 to have the low-pitched sound band, a vibration generating device disposed at the right side of the supporting member 300 to have the high-pitched sound band, and a vibration generating device having the middle-pitched sound band disposed between the vibration generating device having the low-pitched sound band and the vibration generating device having the high-pitched sound band.

According to an embodiment of the present disclosure, a vibration generating module including two or more vibration generating devices having different sound bands may be provided at the first forming portion 890, and the first forming portion 890 may be a partition of a corresponding vibration generating module. A partition may separate each of a sound and a channel, thereby providing a clear sound. Also, a vibration generating module and a partition may be modularized and provided at the first forming portion 890, thereby enhancing the degree of freedom in placing a vibration generating module.

Also, as in FIGS. 13A to 13E, the display apparatus according to an embodiment of the present disclosure may further include a first groove disposed at a periphery of one side of a supporting member 300 and a second groove disposed at a periphery of the other side of the supporting member 300. For example, the first groove and the second groove may be disposed at a center of the first forming portion 890. For example, the first groove and the second groove may be disposed at a center of the supporting member 300. For example, the first groove and the second groove may be disposed at a center of a rear surface of the supporting member 300. A fifth vibration generating device and a sixth vibration generating device may be further disposed at the first groove and the second groove. Accordingly, a sound of the high-pitched sound band may be more enhanced.

Moreover, in FIGS. 13C to 13F, the display apparatus according to an embodiment of the present disclosure may further include a protrusion portion provided at one side of a forming portion and a hole disposed at one side of the protrusion portion.

Therefore, a vibration generating module including two or more vibration generating devices for outputting sounds of different sound bands may be modularized and provided at the first forming portion 890, thereby enhancing the degree of freedom in placing a vibration generating module disposed on a rear surface of a display module.

Figure 14:
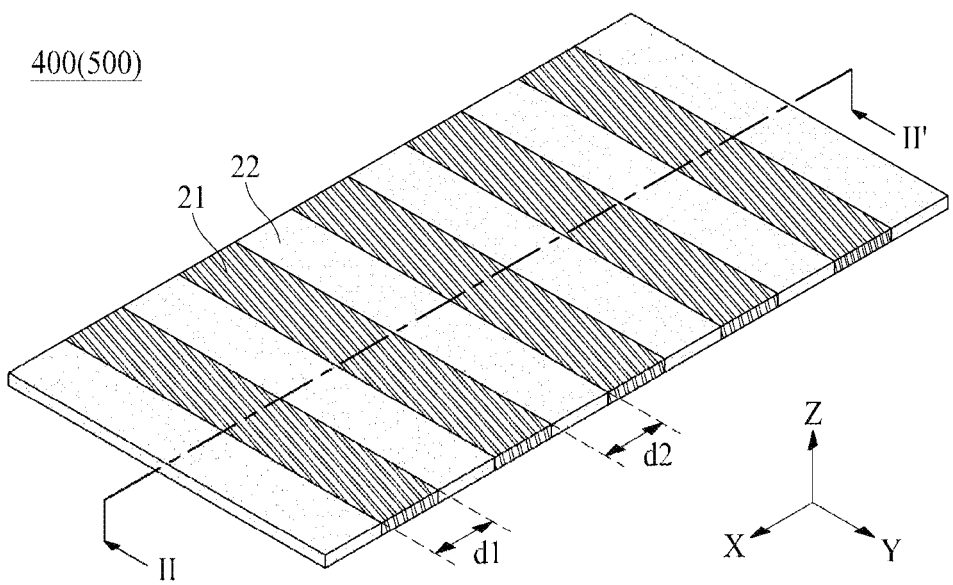
FIG. 14 illustrates a vibration generating module according to an embodiment of the present disclosure.
Figure 15:
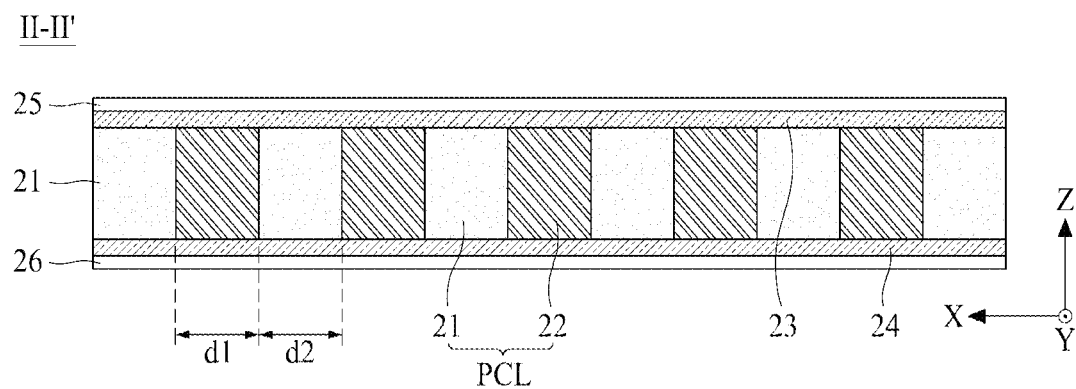
FIG. 15 is a cross-sectional view taken along line II-II' illustrated in FIG. 14.

FIG. 14 illustrates a vibration generating module according to an embodiment of the present disclosure. FIG. 15 is a cross-sectional view taken along line II-II' illustrated in FIG. 14.

With reference to FIGS. 14 and 15, first and second vibration generating modules 400 and 500 according to an embodiment of the present disclosure may each include a piezoelectric composite layer PCL, a first electrode 23, and a second electrode 24.

The piezoelectric composite layer PCL may include a plurality of first portions 21 and a plurality of second portions 22 each disposed between two adjacent first portions of the plurality of first portions 21.

The first and second vibration generating modules 400 and 500 according to an embodiment of the present disclosure may each include a plurality of first portions 21 and a plurality of second portions 22. For example, the plurality of first portions 21 may have a piezoelectric characteristic, and the plurality of second portions 22 may complement an impact resistance of the first portions 21 and may have flexibility.

Each of the plurality of first portions 21 according to an embodiment of the present disclosure may be configured to include an inorganic material portion. The inorganic material portion may include an electroactive material. The electroactive material may have a characteristic in which as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage.

Each of the plurality of first portions 21 according to an embodiment of the present disclosure may include an inorganic material or a piezoelectric material, which vibrates based on a piezoelectric effect (or a piezoelectric characteristic) caused by an electric field. For example, each of the plurality of first portions 21 may be referred to as an electroactive portion, an inorganic material portion, a piezoelectric material portion, or a vibration portion, but embodiments of the present disclosure are not limited thereto.

Each of the plurality of first portions 21 according to an embodiment of the present disclosure may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". Here, A may include a divalent metal element, and B may include a tetravalent metal element. For example, in the chemical formula "$ABO_3$", A and B may be cations, and O may be anions. For example, the chemical formula "$ABO_3$" may include one of $PbTiO_3$, $PbZrO_3$, $BaTiO_3$, and $SrTiO_3$, but embodiments of the present disclosure are not limited thereto.

In a case where the perovskite crystalline structure includes a center ion (for example, $PbTiO_3$), a position of a Ti ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal (e.g., quadrilateral), orthorhombic, or rhombohedral structure corresponding to an unsymmetric structure, and thus, a piezoelectric effect may be generated. In a tetragonal (e.g., quadrilateral), orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

For example, the inorganic material portion included in each of the plurality of first portions 21 may include one or more materials of lead (Pb), zirconium (Zr), titanium (Ti), zinc (Zn), nickel (Ni), and niobium (Nb), but embodiments of the present disclosure are not limited thereto.

As another example, the inorganic material portion included in each of the plurality of first portions 21 may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but embodiments of the present disclosure are not limited thereto. Also, the inorganic material portion may include at least one of $CaTiO_3$, $BaTiO_3$, and $SrTiO_3$ each without Pb, but embodiments of the present disclosure are not limited thereto.

Each of the plurality of second portions 22 according to an embodiment of the present disclosure may include an organic material portion and may be configured to fill a region between inorganic material portions which are the first portions 21. A plurality of organic material portions may each be disposed between two adjacent inorganic material portions of a plurality of inorganic material portions and may absorb an impact applied to the inorganic material portion (or the first portion), and thus, may release a stress concentrating on the inorganic material portion to enhance the total durability of the first and second vibration generating modules 400 and 500 and to provide flexibility to a vibration generating device 50. The first and second vibration generating modules 400 and 500 may have flexibility, and thus, may be bent in a shape which matches a shape of a display panel 110.

Each of the plurality of second portions 22 may be disposed between two adjacent first portions of the plurality of first portions 21. The plurality of first portions 21 and the plurality of second portions 22 may be disposed (or arranged) on the same plane (or the same layer) in parallel. Each of the plurality of second portions 22 may be configured to fill a gap between two adjacent first portions of the plurality of first portions 21 and may be connected to or attached on a first portion 21 adjacent thereto. Therefore, in the first and second vibration generating modules 400 and 500, vibration energy based on a link of a unit lattice of the first portion 21 may be increased by the second portion 22, and thus, a vibration may increase, thereby securing a piezoelectric characteristic and flexibility. Also, in the first and second vibration generating modules 400 and 500, with respect to one side thereof, the second portions 22 and the first portions 21 may be alternately arranged on the same plane in a lengthwise direction X, and thus, a large-area composite film (or an organic/inorganic composite film) having a single-layer structure may be configured. Also, the large-area composite film may have a thin thickness, and thus, a thickness of a display apparatus may not increase. The first and second vibration generating modules 400 and 500 may be implemented as one film and may be slimmed, thereby decreasing or preventing an increase in a driving voltage. Also, the first and second vibration generating modules 400 and 500 according to an embodiment of the present disclosure may include an inorganic material portion and an organic material portion and may be implemented as a thin film type, and thus, may be integrated into or equipped in the display apparatus without interference caused by a mechanical element and/or another element configuring the display apparatus. Accordingly, the first and second vibration generating modules 400 and 500 may be integrated or embedded into a display apparatus according to an embodiment of the present disclosure.

Each of the plurality of second portions 22 may include a polygonal pattern. Each of the plurality of second portions 22 may be disposed between two adjacent first portions of the plurality of first portions 21. The plurality of first portions 21 and the plurality of second portions 22 may be disposed (or arranged) on the same plane (or the same layer) in parallel. Each of the plurality of second portions 22 may be configured to fill a gap between two adjacent first portions of the plurality of first portions 21 and may be connected to or attached on a second portion 22 adjacent thereto. For example, each of the plurality of second portions 22 may include a line pattern having a second width d2 and may be disposed in parallel with a corresponding first portion 21 between two adjacent second portions 22. Each of the plurality of second portions 22 may have the same size (for example, the same width, area, or volume) within a process error range (or an allowable error) occurring in a manufacturing process.

A size of each second portion 22 may be equal to or different from that of each first portion 21. For example, a size of each second portion 22 and a size of each first portion 21 may be set based on a requirement condition including the vibration characteristic and/or flexibility of the first and second vibration generating modules 400 and 500.

Each of the plurality of second portions 22 according to an embodiment of the present disclosure may have modulus and viscoelasticity which are lower than those of each first portion 21, and thus, may enhance the reliability of each first portion 21 vulnerable to an impact due to a fragile characteristic. For example, when the first and second vibration generating modules 400 and 500 configured to vibrate the display panel has an impact resistance and high stiffness, the first and second vibration generating modules 400 and 500 may have a maximum vibration characteristic. In order for the first and second vibration generating modules 400 and 500 to have an impact resistance and high stiffness, the plurality of second portions 22 may each include a material having a relatively high damping factor (tan δ) and relatively high stiffness. For example, the plurality of second portions 22 may each include a material having a damping factor (tan δ) of about 0.1 [Gpa] to about 1 [Gpa] and relatively high stiffness of about 0 [Gpa] to about 10 [Gpa]. Also, a damping factor (tan δ) and a stiff characteristic may be described based on a correlation between a loss coefficient and modulus, and in this case, the plurality of second portions 22 may each include a material having a loss coefficient of about 0.01 to about 1 and modulus of about 1 [Gpa] to about 10 [Gpa].

The plurality of second portions 22 may include an organic material or an organic polymer which has a flexible characteristic in comparison with the inorganic material portion which is the first portion 21. For example, the plurality of second portions 22 may include an organic material, an organic polymer, an organic piezoelectric material, or an organic non-piezoelectric material. For example, the plurality of second portions 22 may be referred to as an adhesive portion, an elastic portion, a bending portion, a damping portion, or a flexible portion each having flexibility, but embodiments of the present disclosure are not limited thereto.

The organic material portion according to an embodiment of the present disclosure may include at least one of an organic piezoelectric material and an organic non-piezoelectric material.

The organic material portion including the organic piezoelectric material may absorb an impact applied to the inorganic material portion (or the first portion), and thus, may enhance the total durability of the first and second vibration generating modules 400 and 500 and may provide a piezoelectric characteristic corresponding to a certain level or more. The organic piezoelectric material according to an embodiment of the present disclosure may be an organic material having an electroactive material. For example, the organic piezoelectric material may include at least one of polyvinylidene fluoride (PVDF), β-Polyvinylidene fluoride (β-PVDF), and polyvinylidene-trifluoroethylene (PVDF-TrFE), but embodiments of the present disclosure are not limited thereto.

The organic material portion including the organic non-piezoelectric material may include a curable resin composition and an adhesive, and thus, may absorb an impact applied to the inorganic material portion (or the first portion), thereby enhancing the total durability of the first and second vibration generating modules 400 and 500. The organic non-piezoelectric material according to an embodiment of the present disclosure may include at least one of an epoxy-based polymer, an acryl-based polymer, and a silicon-based polymer, but embodiments of the present disclosure are not limited thereto.

For example, the organic material portion including the organic non-piezoelectric material may include an adhesion promoter for adhesiveness between epoxy resin and an inorganic material portion, for a high stiffness characteristic needed for the first and second vibration generating modules 400 and 500. For example, the adhesion enhancer may be phosphate or the like. The organic material portion may be cured by at least one curing process of a thermal curing process and a photo-curing process. In a process of curing the organic material portion, solvent free type epoxy resin may be used for preventing the thickness uniformity of the first and second vibration generating modules 400 and 500 from being reduced by contraction of the organic material portion caused by volatilization of a solvent.

Moreover, the organic material portion including the organic non-piezoelectric material may further include a reinforcing agent, for a damping characteristic in addition to high stiffness of the first and second vibration generating modules 400 and 500. For example, the reinforcing agent may be methylmethacrylate-butadiene-styrene (MBS) having a core shell type, and a content thereof may be about 5 wt % to about 40 wt %. The reinforcing agent may be an elastic body having the core cell type and may have a high coupling force to epoxy resin such as an acryl-based polymer, and thus, may enhance an impact resistance or a damping characteristic of the vibration generating device 500.

Therefore, the first portions 21 including an inorganic material and having a piezoelectric characteristic and the second portions 22 including an organic material and having flexibility may be alternately and repeatedly arranged to be connected, and thus, the piezoelectric composite layer PCL may have a thin film type. Accordingly, the piezoelectric composite layer PCL may be bent based on a shape of the display panel 110 and may have a size based on the display panel 110 or may have a size for realizing a vibration characteristic or a sound characteristic which is each set based on a vibration of the display panel 110. For example, a size of each first portion 21 and a size of each second portion 22 may be set based on a piezoelectric characteristic and flexibility. For example, in a display apparatus requiring a piezoelectric characteristic rather than flexibility, a size of each first portion 21 may be adjusted to be greater than that of each second portion 22. As another example, in a display apparatus requiring flexibility rather than a piezoelectric characteristic, a size of each second portion 22 may be adjusted to be greater than that of each first portion 21. As a result, the piezoelectric composite layer PCL may be adjusted based on a characteristic needed for a display apparatus, and thus, it may be easy to design the piezoelectric composite layer PCL.

The first electrode 23 may be disposed on a first surface (or a front surface) of the piezoelectric composite layer PCL. The first electrode 23 according to an embodiment of the present disclosure may include a transparent conductive material, a semitransparent conductive material, or an opaque conductive material. For example, examples of the transparent conductive material or the semitransparent conductive material may include indium tin oxide (ITO) or indium zinc oxide (IZO), but embodiments of the present disclosure are not limited thereto. Examples of the opaque conductive material may include aluminum (Al), copper (Cu), gold (Au), silver (Ag), molybdenum (Mo), and Mg or an alloy thereof, but embodiments of the present disclosure are not limited thereto.

The second electrode 24 may be disposed on a second surface (or a rear surface or a backside surface), which is opposite to the first surface, of the piezoelectric composite layer PCL. The second electrode 24 according to an embodiment of the present disclosure may include a transparent conductive material, a semitransparent conductive material, or an opaque conductive material. For example, the second electrode 24 may include the same material as that of the first electrode 23, but embodiments of the present disclosure are not limited thereto.

Each of the first and second vibration generating modules 400 and 500 according to an embodiment of the present disclosure may further include a first protection layer 25 and a second protection layer 26.

The first protection layer 25 may be disposed on the first electrode 23 and may protect the first electrode 23 and the first surface of the piezoelectric composite layer PCL. For example, the first protection layer 25 may be a polyimide (PI) film or a polyethyleneterephthalate (PET) film, but embodiments of the present disclosure are not limited thereto.

The second protection layer 26 may be disposed on the second electrode 24 and may protect the second electrode 24 and the second surface of the piezoelectric composite layer PCL. For example, the second protection layer 26 may be a PI film or a PET film, but embodiments of the present disclosure are not limited thereto.

Each of the plurality of first portions 21 may have a first width d1 parallel to the first direction X and a length parallel to a second direction Y. Each of the plurality of second portions 22 may have a second width d2 equal to the first width d1 and a length parallel to the second direction Y. For example, the first portion 21 and the second portion 22 may include a line type or a stripe type, which has the same size, but embodiments of the present disclosure are not limited thereto.

Therefore, according to an embodiment of the present disclosure, the piezoelectric composite layer PCL may have a single thin film type because the first portions 21 and the second portions 22 having the same size are alternately and repeatedly arranged (or connected) on the same plane, may vertically vibrate based on the first portion 21 having a vibration characteristic and may be bent in a curve shape by the second portion 22 having flexibility. The piezoelectric composite layer PCL according to another embodiment of the present disclosure may extend by a desired size or length based on the side coupling (or connection) of the first portion 21 and the second portion 22. For example, the vibration generating module according to an embodiment of the present disclosure may be a piezoelectric composite where the first portion 21 and the second portion 22 are provided. As another example, the first portion 21 and the second portion 22 may be provided at the vibration generating module according to an embodiment of the present disclosure, and the vibration generating module according to an embodiment of the present disclosure may include the first electrode 23 and the second electrode 24. As another example, the first portion 21 and the second portion 22 may be provided at the vibration generating module according to an embodiment of the present disclosure, and the vibration generating module according to an embodiment of the present disclosure may include the first electrode 23, the second electrode 24, the first passivation layer 25, and the second passivation layer 26.

Therefore, in the first and second vibration generating modules 400 and 500 according to an embodiment of the present disclosure, an inorganic material portion (a first portion) and an organic material portion (a second portion) may be disposed on the same layer, and an impact transferred to the inorganic material portion may be absorbed by the organic material portion, thereby preventing the inorganic material portion from being damaged by an impact applied from the outside to the display apparatus and minimizing or preventing vibration performance (or sound performance) from being reduced by the damage.

Moreover, the first and second vibration generating modules 400 and 500 of the display apparatus according to an embodiment of the present disclosure may include piezoelectric ceramic having a perovskite crystalline structure, and thus, may vibrate (or mechanical displacement) in response to an electrical signal applied from the outside. For example, when an alternating current (AC) voltage is applied to the inorganic material portion (the first portion), the inorganic material portion may alternately contract and expand based on an inverse piezoelectric effect, and thus, the vibration generating device 500 may vibrate based on a bending phenomenon where a bending direction is alternately changed, thereby vibrating the display panel 110 based on the vibration to provide a sound or a haptic feedback to a user.

Therefore, the first and second vibration generating modules 400 and 500 according to an embodiment of the present disclosure may vibrate according to an electrical signal to vibrate the display panel 110. For example, the first and second vibration generating modules 400 and 500 may be a sound generating device which vibrates according to a voice signal synchronized with an image displayed by the display panel 110 to vibrate the display panel 110, thereby generating a sound. As another example, the first and second vibration generating modules 400 and 500 may be a haptic device which is disposed on the display panel 110 and may vibrate according to a haptic feedback signal (or a tactile feedback signal) synchronized with a user touch applied to a touch panel (or a touch sensor layer) embedded into the display panel 100 to vibrate the display panel 110. For example, the first and second vibration generating modules 400 and 500 may be a haptic device which vibrates the display panel 110 to output a feedback based on an action of a user. Accordingly, the display panel 110 may vibrate based on a vibration of each of the first and second vibration generating modules 400 and 500 to provide a user (or a viewer) with at least one of a sound and a haptic feedback.

Figure 16A:
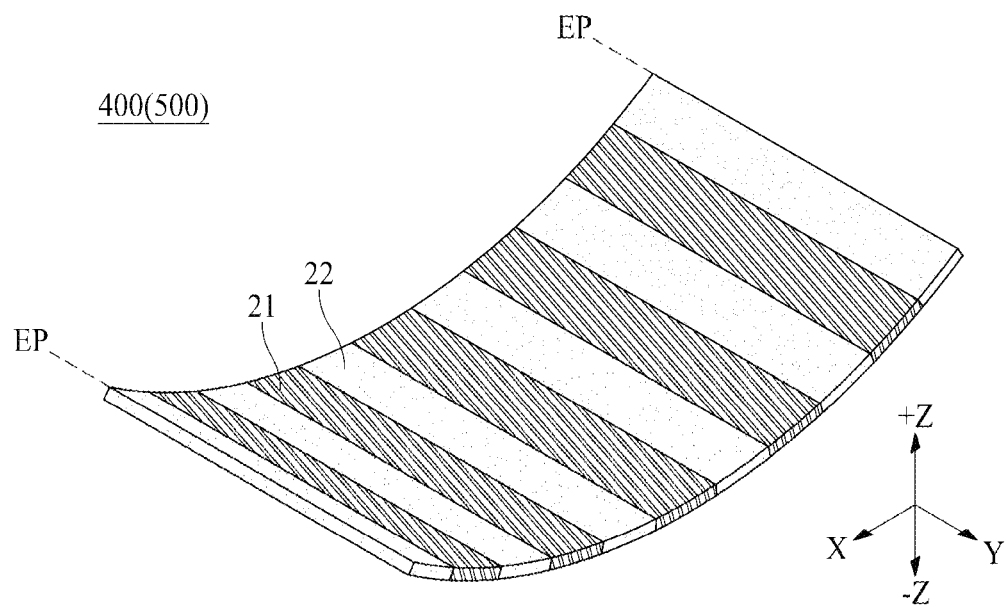
FIG. 16A illustrates a state where both sides of the vibration generating module of FIG. 14 are upward folded.
Figure 16B:
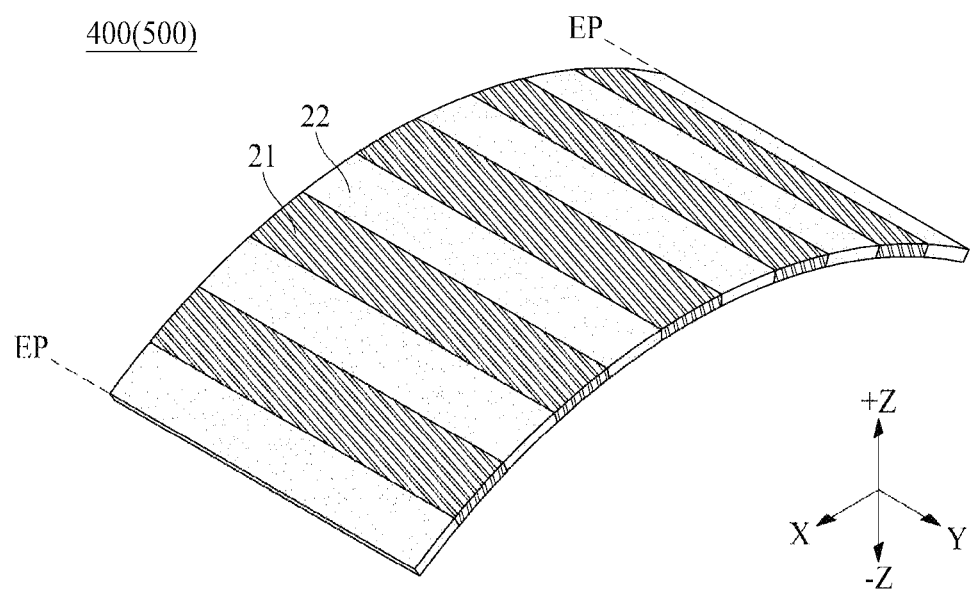
FIG. 16B illustrates a state where the both sides of the vibration generating module of FIG. 14 are downward folded.

FIG. 16A illustrates a state where both sides of the vibration generating module of FIG. 14 are upward folded. FIG. 16B illustrates a state where the both sides of the vibration generating module of FIG. 14 are downward folded.

With reference to FIGS. 16A and 16B, a piezoelectric composite including a piezoelectric composite layer PCL according to an embodiment of the present embodiment may vibrate with an electric field based on a signal applied to each of the plurality of first portions 21, and thus, both sides EP of the piezoelectric composite layer PCL in a first lengthwise direction X may be folded in an upward direction +Z or folded in a downward direction −Z. For example, each of the plurality of second portions 22 filled or disposed between two adjacent first portions of the plurality of first portions 21 may have flexibility, and thus, even when the both sides EP of the piezoelectric composite layer PCL are bent in the upward direction +Z or the downward direction −Z, the inorganic material portion which is each first portion 210 may not be damaged or may not be reduced in performance. Therefore, a display apparatus including first and second vibration generating modules 400 and 500 including the piezoelectric composite according to an embodiment of the present disclosure may be used as a flexible display apparatus, and for example, may be used as a curved display apparatus bent at a certain curvature radius, but embodiments of the present disclosure are not limited thereto, and may be used as a rollable display apparatus wound in a spiral form and unwound, a bendable display apparatus, or a wearable display apparatus wound around a wrist. The bendable display apparatus may be a periphery bending display apparatus, a bezel bending display apparatus, or an active bending display apparatus, but embodiments of the present disclosure are not limited thereto.

Figure 17:
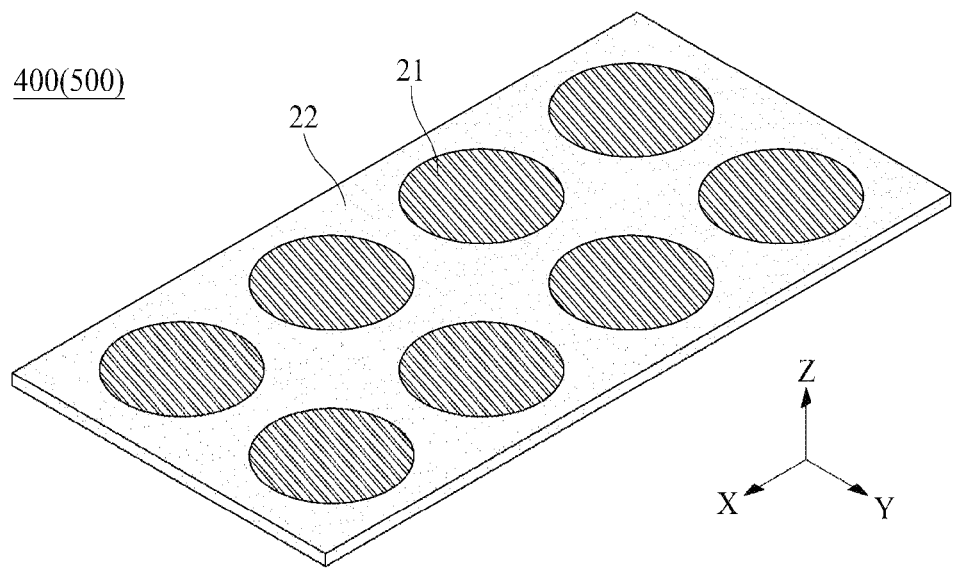
FIG. 17 illustrates a vibration generating module according to another embodiment of the present disclosure.

FIG. 17 illustrates a vibration generating module according to another embodiment of the present disclosure.

With reference to FIG. 17, a piezoelectric composite layer PCL according to another embodiment of the present disclosure may have a circular shape. For example, the piezoelectric composite layer PCL may include a plurality of first portions 21 spaced apart from one another and a second portion 22 surrounding each of the plurality of first portions 21.

Each of the plurality of first portions 21 may have a circular plate shape. Each of the plurality of first portions 21 may include an inorganic material portion having a vibration characteristic described above, and thus, its repetitive description is omitted.

The second portion 22 may be disposed or filled between two adjacent first portions of the plurality of first portions 21 and may surround a side surface of each of the plurality of first portions 21. The second portion 22 may include an organic material portion having flexibility as described above, and thus, its repetitive description is omitted. The second portion 22 may provide flexibility between two adjacent first portions of the plurality of first portions 21, and thus, a shape of the piezoelectric composite layer PCL or first and second vibration generating modules 400 and 500 may be changed to various shapes such as a two-dimensional (2D) or three-dimensional (3D) shape, based on deformation occurring between two adjacent first portions of the plurality of first portions 21.

Each of the plurality of first portions 21 may have various shapes in addition to a circular plate shape. For example, each of the plurality of first portions 21 may have an elliptical shape, a polygonal shape, or a donut shape, but embodiments of the present disclosure are not limited thereto.

Each of the plurality of first portions 21 may have a dotted shape including a fine circular shape, a fine elliptical shape, a fine polygonal shape, or a fine donut shape, and a shape of a display apparatus including the first and second vibration generating modules 400 and 500 including the plurality of first portions 21 may be changed to various shapes, based on flexibility of the second portion 22 disposed between two adjacent first portions of the plurality of first portions 21. For example, a shape of a display panel of a display apparatus including the first and second vibration generating modules 400 and 500 illustrated in FIGS. 12 to 14 may be changed to a 2D shape which is concave or convex, based on the first portions 210 (or an inorganic material portion) having a line shape, and thus, a shape of a display panel of a display apparatus including the first and second vibration generating modules 400 and 500 illustrated in FIG. 15 may be changed to various shapes such as a 3D shape as well as a 2D shape, based on the first portions 21 (or an inorganic material portion) having a dotted shape. Accordingly, the first and second vibration generating modules 400 and 500 including the piezoelectric composite layer PCL according to another embodiment of the present disclosure may be enhanced in degree of freedom in design based on a shape of a display apparatus and may be applied to a flexible display apparatus having a shape capable of being changed to various shapes such as a 2D shape or a 3D shape.

Figure 18:
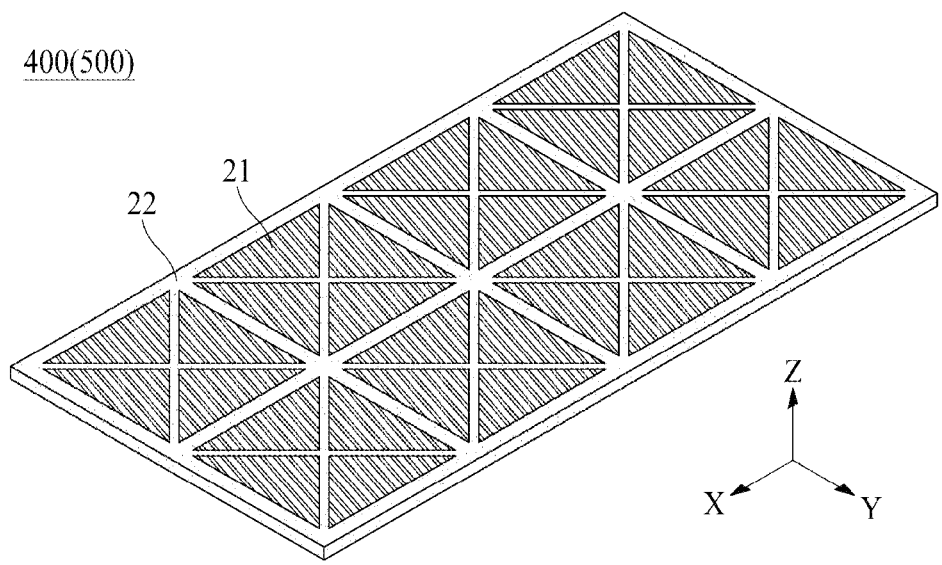
FIG. 18 illustrates a vibration generating module according to another embodiment of the present disclosure.
Figure 19:
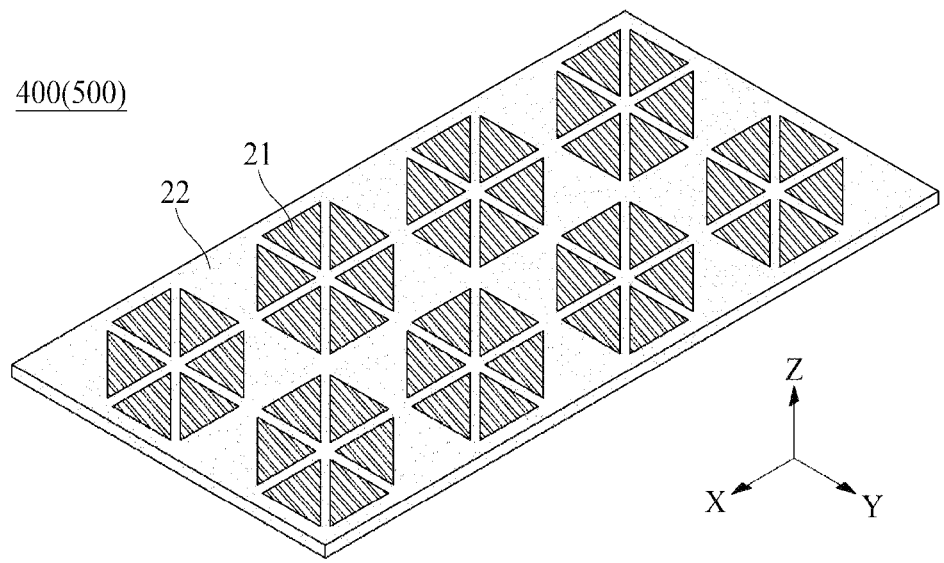
FIG. 19 illustrates a vibration generating module according to another embodiment of the present disclosure.

FIG. 18 illustrates a vibration generating module according to another embodiment of the present disclosure. FIG. 19 illustrates a vibration generating module according to another embodiment of the present disclosure.

With reference to FIG. 18, a piezoelectric composite layer PCL according to another embodiment of the present disclosure may have a triangular shape. For example, the piezoelectric composite layer PCL may include a plurality of first portions 21 spaced apart from one another and a second portion 22 surrounding each of the plurality of first portions 21.

Each of the plurality of first portions 21 may have a triangular shape. For example, each of the plurality of first portions 21 may have a triangular plate shape. Each of the plurality of first portions 21 may include an inorganic material portion having a vibration characteristic as described above, and thus, its repetitive description is omitted.

For example, four adjacent first portions 21 of the plurality of first portions 21 may be disposed adjacent to one another to form a tetragonal shape (or a square or a quadrilateral shape). Vertexes of the four adjacent first portions 21 forming a tetragonal (e.g., quadrilateral) shape may be disposed adjacent to one another in a tetragonal center portion.

As another example, as illustrated in FIG. 19, six adjacent first portions 21 of the plurality of first portions 21 may be disposed adjacent to one another to form a hexagonal shape (or a regularly hexagonal shape). Vertexes of the six adjacent first portions 21 forming a hexagonal shape may be disposed adjacent to one another in a hexagonal center portion. Therefore, 2N (where N is a natural number equal to or more than two) adjacent first portions 21 of the plurality of first portions 21 may be disposed adjacent to one another to form a 2N-angular shape.

The second portion 22 may be disposed or filled between two adjacent first portions of the plurality of first portions 21 and may surround a side surface of each of the plurality of first portions 21. The second portion 22 may include an organic material portion having flexibility as described above, and thus, its repetitive description is omitted. The second portion 22 may provide flexibility between two adjacent first portions of the plurality of first portions 21, and thus, a shape of the piezoelectric composite layer PCL or first and second vibration generating modules 400 and 500 may be changed to various shapes such as a 3D shape as well as a 2D shape, based on deformation occurring between two adjacent first portions of the plurality of first portions 21.

Therefore, a display panel of a display apparatus including the first and second vibration generating modules 400 and 500 including the piezoelectric composite layer PCL according to another embodiment of the present disclosure may have a shape which is changed based on various 3D-shape changes of the first and second vibration generating modules 400 and 500. Also, the plurality of first portions 21 having a triangular shape may have a fine pattern corresponding to various shapes, and a display panel of a display apparatus including the first and second vibration generating modules 400 and 500 including the first portions 21 may have various shapes which are changed based on flexibility of the second portion 22 disposed between two adjacent first portions of the plurality of first portions 21. Also, a display apparatus including the piezoelectric composite layer PCL according to another embodiment of the present disclosure may use a flexible display apparatus which is the same as a display apparatus including the first and second vibration generating modules 400 and 500 illustrated in FIG. 14.

Figure 22A:
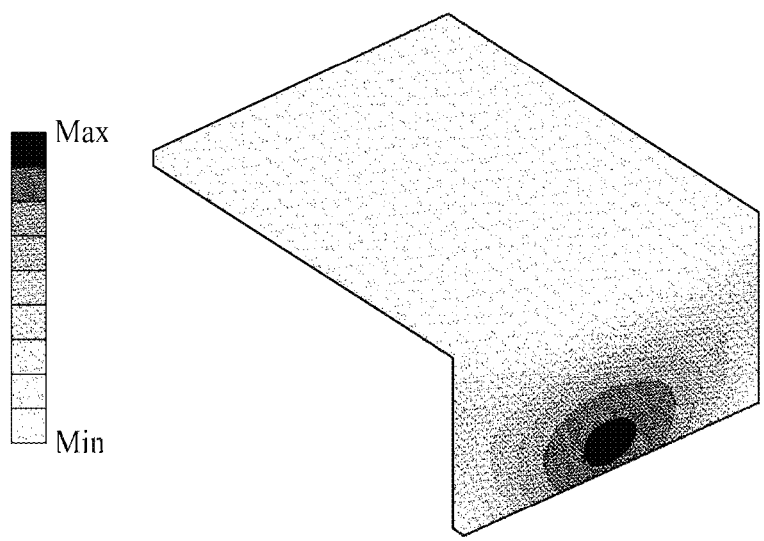
FIGS. 22A and 22B illustrate a sound velocity of a vibration generating device according to another embodiment of the present disclosure.
Figure 22B:
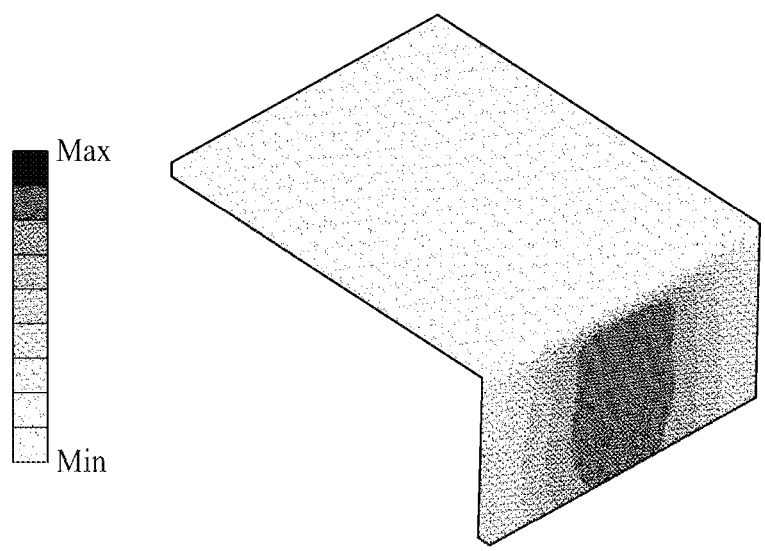
Figure 23:
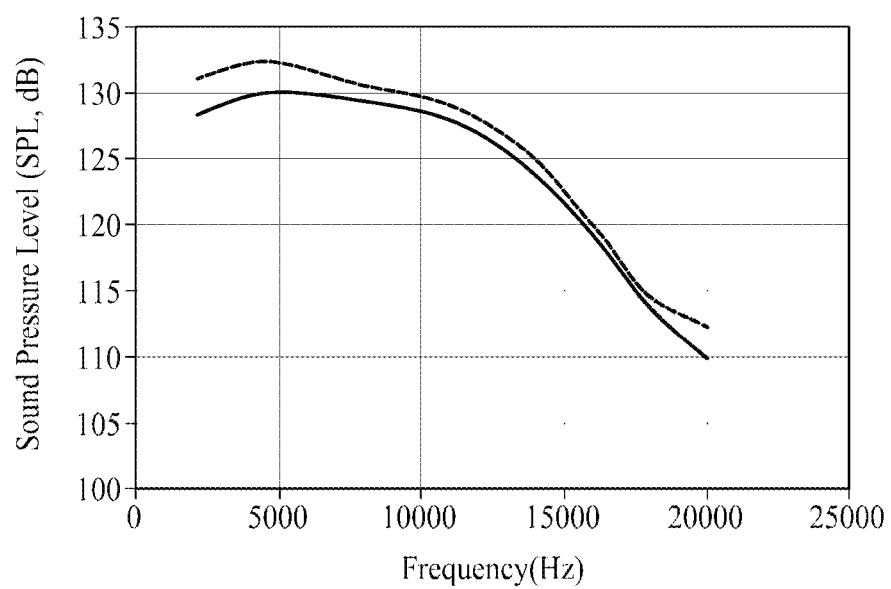
FIG. 23 illustrates a sound output characteristic of a vibration generating module according to another embodiment of the present disclosure.

FIGS. 20A to 20D illustrate a position at which a vibration generating device according to another embodiment of the present disclosure is disposed. FIG. 21 illustrates a sound pressure level of a vibration generating device according to another embodiment of the present disclosure. FIGS. 22A and 22B illustrate a sound velocity of a vibration generating device according to another embodiment of the present disclosure. FIG. 23 illustrates a sound output characteristic of a vibration generating module according to another embodiment of the present disclosure.

Figure 20A:
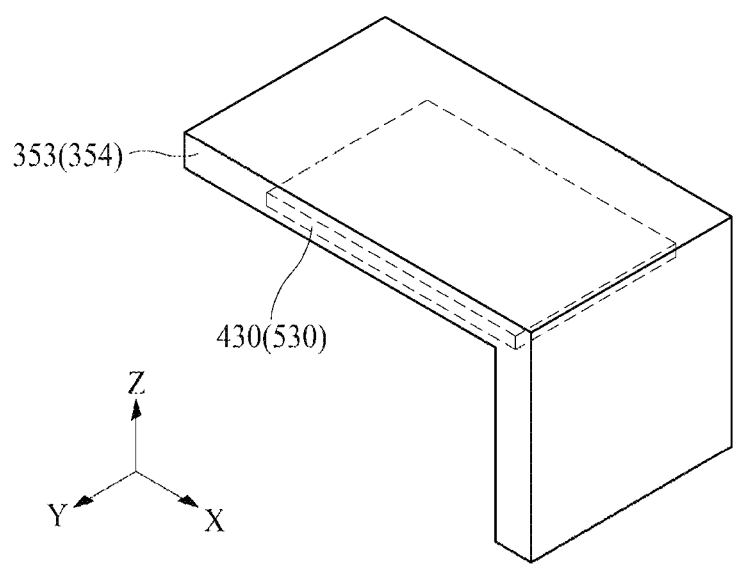
FIGS. 20A to 20D illustrate a position at which a vibration generating device according to another embodiment of the present disclosure is disposed.
Figure 20B:
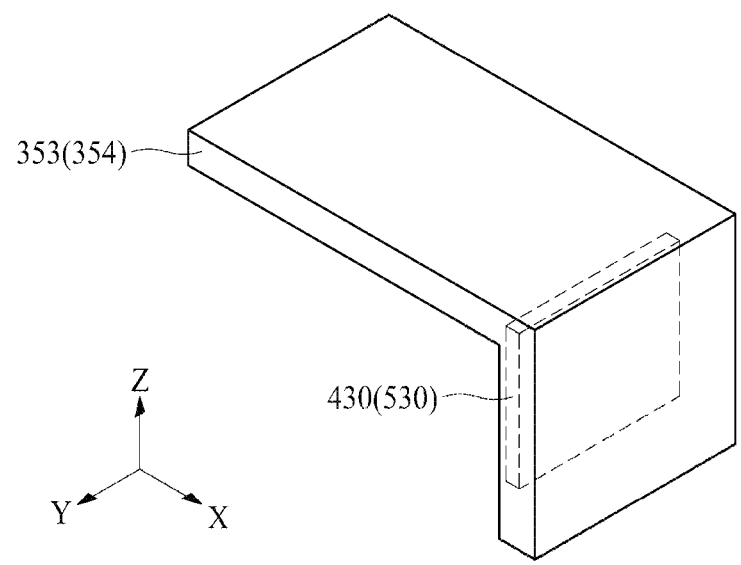
Figure 20C:
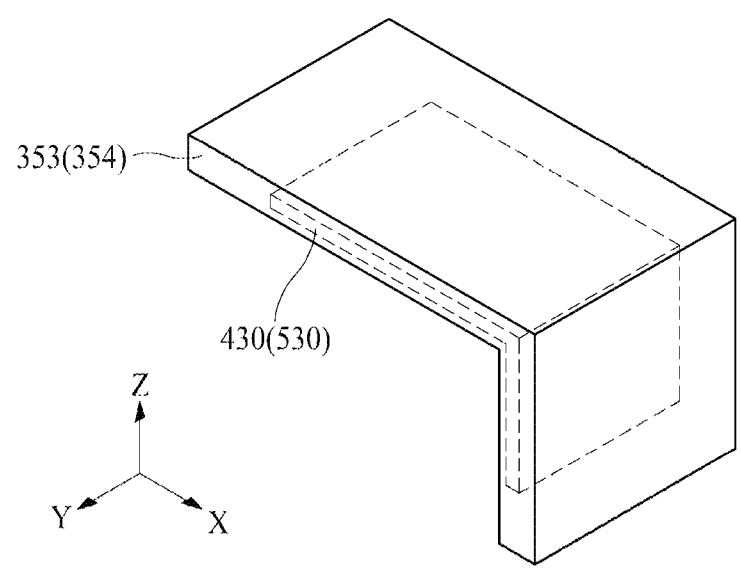
Figure 20D:
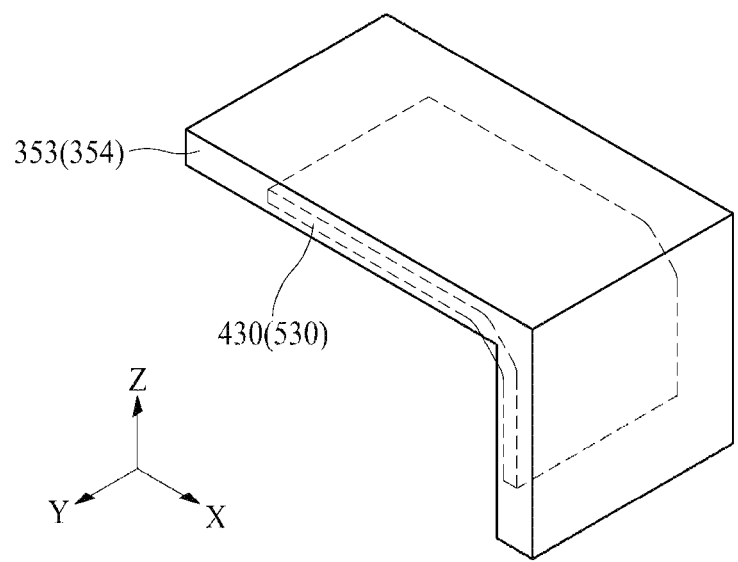
Figure 21:
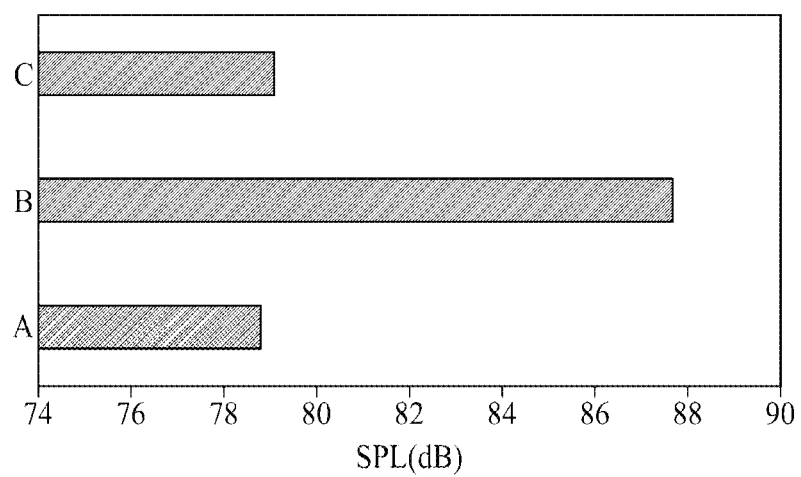
FIG. 21 illustrates a sound pressure level of a vibration generating device according to another embodiment of the present disclosure.

FIGS. 20A to 23 illustrate an embodiment where the vibration generating device illustrated in FIG. 10 is disposed at a supporting member. FIGS. 20A to 20D illustrate an example where a plurality of vibration generating devices 430 and 530 are disposed on a plurality of plates 353 and 354. FIG. 20A illustrates an example where a plurality of vibration generating devices 430 and 530 are disposed on rear surfaces of a plurality of plates 353 and 354. FIG. 20B illustrates an example where a plurality of vibration generating devices 430 and 530 are disposed on side surfaces of a plurality of plates 353 and 354. FIG. 20C illustrates an example where a plurality of vibration generating devices 430 and 530 are disposed on rear surfaces and side surfaces of a plurality of plates 353 and 354, and the vibration generating devices 430 and 530 are disposed on a side surface to have a taper. A case where a vibration generating device is disposed to have a taper is a case where a vibration generating device is disposed to have a total reflection condition. FIG. 20D illustrates an example where a plurality of vibration generating devices 430 and 530 are disposed on rear surfaces and side surfaces of a plurality of plates 353 and 354, and the vibration generating devices 430 and 530 are disposed to be flat on a side surface. A case where a vibration generating device is disposed to be flat is a case where a vibration generating device is disposed not to have a total reflection condition. In FIGS. 20A to 20D, an embodiment where a vibration generating device is disposed on a plate will be described, but a case where a vibration generating device is disposed on a supporting member may be expected to obtain the same result. A rear surface of a plate or a rear surface of a supporting member may be a rear surface with respect to a display module.

FIG. 21 illustrates a sound pressure level of FIGS. 20A to 20C. A sound pressure level has been measured by a free field microphone under a condition where a center of a sound radiation position is a center of a measurement position. A frequency has measured using B&K Pulse LAN-XI apparatus. It may be seen that a sound pressure level of A which is a vibration generating module of FIG. 20A is about 78.8 dB. It may be seen that a sound pressure level of B which is a vibration generating module of FIG. 20B is about 87.7 dB. It may be seen that a sound pressure level of C which is a vibration generating module of FIG. 20C is about 79.1 dB. Therefore, it may be seen that a sound pressure level increases in a case where a vibration generating module is on a side surface of a supporting member or a plate as in FIG. 20B. However, the inventors have recognized that a space of a side surface of a display module is limited, and due to this, it is difficult to place a vibration generating device in the space of the side surface. Therefore, the inventors have performed an experiment for checking a sound pressure level when a vibration generating module includes a side surface of a supporting member and is disposed on a rear surface of the supporting member.

FIG. 22A is a diagram showing a sound characteristic of FIG. 20D, and FIG. 22B is a diagram showing a sound velocity of FIG. 20C. The sound velocity has been measured using an intensity probe under a condition where a front center of a sound radiation position is a center of a measurement position. A voltage of 7.7 Vrms has been applied as a sine signal. An analysis apparatus has used B&K Pulse LAN-XI FFT analyzer.

In FIGS. 22A and 22B, an acoustic velocity increases in a direction from a minimum value (Min.) to a maximum value (Max.). With reference to FIG. 22A, when a vibration generating device is disposed to be flat on a plate or a side surface of a supporting member, it may be seen that a maximum value (Max.) of an acoustic velocity is 514.01 mm/s and total radiation is performed to form a circular shape with respect to the maximum value. With reference to FIG. 22B, when a vibration generating device is disposed to be flat on a plate or a rear surface and a side surface of a supporting member so as to have a taper, it may be seen that a maximum value (Max.) of an acoustic velocity is 710.83 mm/s, the maximum value is widely distributed, and a sound output characteristic is enhanced. For example, when a vibration generating device is disposed to have a taper and to satisfy total reflection, a sound may be reflected between a rear surface and a side surface of a supporting member. Accordingly, when a vibration generating device is disposed on a plate or a side surface of a supporting member to have a taper, it may be seen that an acoustic direction has directionality with respect to a radiation position.

In FIG. 23, a solid line represents a sound output characteristic of FIG. 20C, and a dotted line represents a sound output characteristic of FIG. 20D. A sound output characteristic has been measured at intervals of 10 cm at a front surface of a sound radiation position, and a voltage of 7.7 Vrms has been applied as a sine signal. Measurement has been performed using LAN-XI FFT analyzer, and a sound pressure level radiated from air between a supporting member and a display module has been measured. With reference to FIG. 23, comparing with FIG. 20D, when a vibration generating device is disposed on a plate or a rear surface and a side surface of a supporting member and is disposed to have a taper at a side surface, it may be seen that a sound pressure level increases in 5 kHz to 20 kHz.

With reference to FIGS. 20A to 23, it may be seen that a sound pressure level increases when a vibration generating device is disposed on a plate or a side surface of a supporting member. A space of a side surface of a display module is limited, and thus, it may be seen that a sound pressure level increases when a vibration generating device includes a side surface and a rear surface of a supporting member and is disposed to have a taper based on a sound pressure level.

Figure 24A:
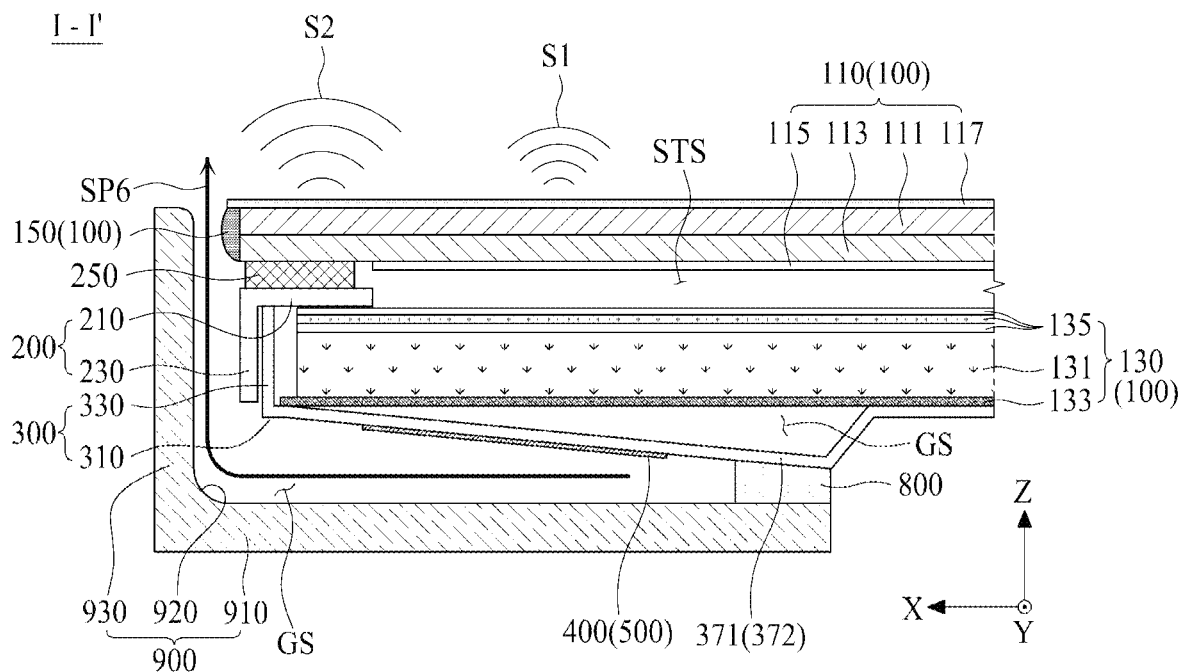
FIGS. 24A and 24B are other cross-sectional views taken along line I-I' illustrated in FIG. 1, according to another embodiment of the present disclosure.
Figure 24B:
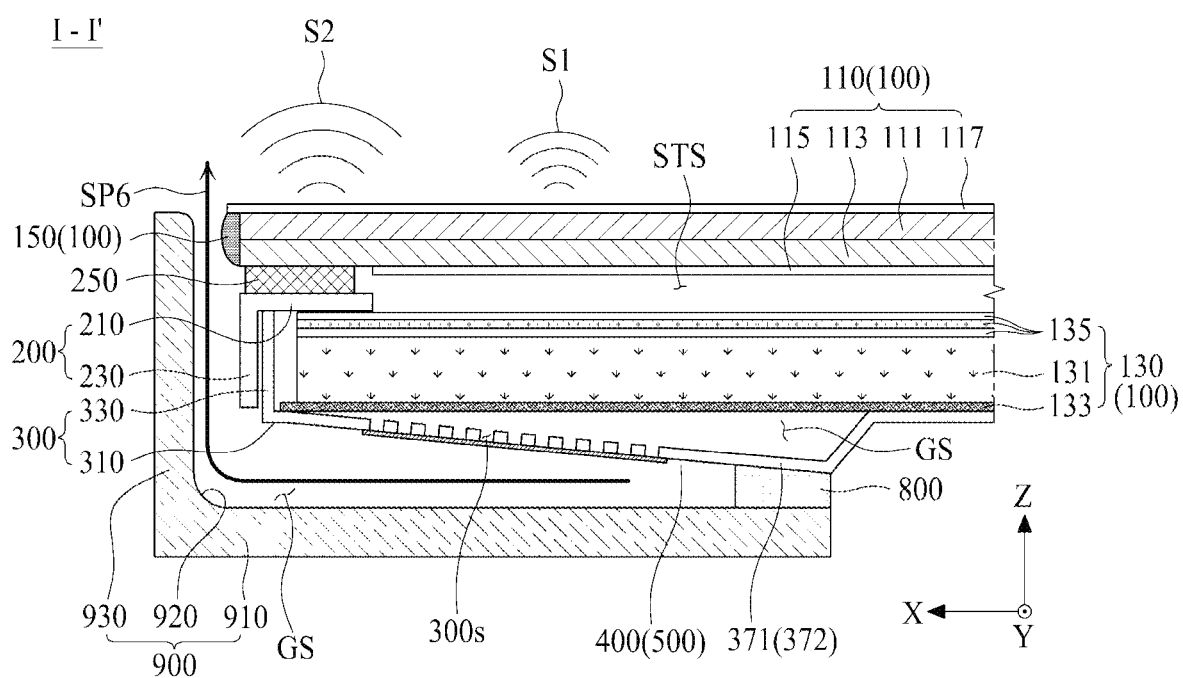

FIGS. 24A and 24B are other cross-sectional views taken along line I-I' illustrated in FIG. 1, according to another embodiment of the present disclosure.

With reference to FIGS. 24A and 24B, a display apparatus according to another embodiment of the present disclosure may include a display module 100, a panel supporting part 200, a supporting member 300, first and second vibration generating modules 400 and 500, and a structure 900.

The supporting member 300 according to an embodiment of the present disclosure may be disposed to be inclined with respect to the display module 100. The first and second vibration generating modules 400 and 500 may be disposed on a rear surface of the supporting member 300. The first and second vibration generating modules 400 and 500 may be disposed at first and second forming portions 371 and 372 of the supporting member 300. For example, an inclined degree of the supporting member 300 may vary from one side of the supporting member 300 to the other side of the supporting member 300. For example, when a side at which a second coupling member 800 is disposed is one side of the supporting member 300, an inclined degree of the supporting member 300 may increase from the other side of the supporting member 300 to the one side of the supporting member 300. The second coupling member 800 may be disposed between the supporting member 300 and the structure 900. The second coupling member 800 may include a single-sided tape, a single-sided adhesive pad, a single-sided adhesive gap pad, a single-sided adhesive foam pad, a double-sided tape, a double-sided adhesive pad, a double-sided adhesive gap pad, a double-sided adhesive foam pad, or a bond, but embodiments of the present disclosure are not limited thereto.

The structure 900 according to an embodiment of the present disclosure may be disposed at one side of the display module 100. For example, the structure 900 may be disposed at the one side of the display module 100, and thus, a sound of each of the first and second vibration generating modules 400 and 500 may be reflected by the structure 900 and may be outputted in a forward direction of the display module 100. For example, the structure 900 may be a sound guide structure which guides the sound of each of the first and second vibration generating modules 400 and 500 so as to be outputted in the forward direction or a lateral direction of the display module 100. Accordingly, the sound of each of the first and second vibration generating modules 400 and 500 may be reflected by a side surface of the structure 900 and may be outputted to a front surface of the display module 100, thereby providing a display apparatus for outputting a sound of the high-pitched sound band.

For example, the structure 900 may include a bottom portion 910, a sound guide portion 920, and a side portion 930. The bottom portion 910 may be disposed at the rear surface of the supporting member 300. The side portion 930 may be spaced apart from one side surface of the display module 100 and may be connected to the bottom portion 910. The sound guide portion 920 may be disposed between the bottom portion 910 and the side portion 930 and may be a corner portion between an inner surface of the side portion 930 and the bottom portion 910. For example, the sound guide portion 920 may reflect a sound of each of the first and second vibration generating modules 400 and 500 to allow the reflected sound to be outputted in a forward direction of the display module 100. Therefore, the sound of each of the first and second vibration generating modules 400 and 500 may be structuralized to be reflected by the structure 900 and output in the forward direction of the display module 100. For example, the sound guide portion 920 may be implemented in a curve shape or a corner-rounded shape. For example, when the sound guide portion 920 has a curve shape or a corner-rounded shape, the reflection of a sound traveling in a gap space GS (or a sound outputting space) between the first and second vibration generating modules 400 and 500 and the supporting member 300 may be more enhanced. For example, a path of the sound generated by the first vibration generating module 400 may be a sixth sound path SP6. For example, the sixth sound path SP6 may be the forward direction and a lateral direction of the display module 100. For example, the sixth sound path SP6 may be a lateral direction and a forward direction (or a thickness direction of a display module) in which light travels, in the gap space GS (or the sound outputting space) between the first and second vibration generating modules 400 and 500 and the supporting member 300. For example, the sixth sound path SP6 may be a lateral direction and a forward direction (or a thickness direction of a display module) in which light is reflected, in the gap space GS (or the sound outputting space) between the first and second vibration generating modules 400 and 500 and the supporting member 300.

For example, the sound of each of the first and second vibration generating modules 400 and 500 may be reflected between the first and second vibration generating modules 400 and 500 and a rear surface of the supporting member 300 and may be outputted in the forward direction of the display module 100. For example, the sound of each of the first and second vibration generating modules 400 and 500 may be reflected by a side surface of the structure 900 and may be outputted in the forward direction of the display module 100. For example, inclined first and second vibration generating modules 400 and 500 may be a sound guide structure which guides the sound of each of the first and second vibration generating modules 400 and 500 to be outputted in the forward direction or the lateral direction of the display module 100. For example, inclined first and second vibration generating modules 400 and 500 and/or structure 900 may be a sound guide structure which guides the sound of each of the first and second vibration generating modules 400 and 500 to be outputted in the forward direction or the lateral direction of the display module 100. Accordingly, an area where a sound between the first and second vibration generating modules 400 and 500 and the supporting member 300 is reflected by the inclined first and second vibration generating modules 400 and 500 may increase, and a sound may be reflected by the side surface of the structure 900 and may be outputted in the forward direction of the display module 100, thereby more enhancing a sound characteristic of the high-pitched sound band.

With reference to FIG. 24B, a supporting member 300 may include at least one hole 300s, and the at least one hole 300s may vary toward a center portion of the supporting member 300. The supporting member 300 including the at least one hole 300s may be formed through press forming or press molding, but embodiments of the present disclosure are not limited thereto.

For example, the at least one hole 300s may be implemented so that a sound output is enhanced in a side surface of a display module 100. For example, the at least one hole 300s may have a height which is progressively reduced in a direction from one side thereof to the other side thereof opposite to the one side. For example, the at least one hole 300s may vary toward the center of the supporting member 300. For example, the at least one hole 300s may vary in a direction from one side of the display module 100 to the other side of the display module 100. For example, the at least one hole 300s overlapping first and second vibration generating modules 400 and 500 may vary in a direction from the one side of the display module 100 to the other side of the display module 100. For example, a size of the at least one hole 300s overlapping the first and second vibration generating modules 400 and 500 may vary in a direction from the one side of the display module 100 to the other side of the display module 100.

For example, the at least one hole 300s may enhance a reflective characteristic of a sound between the supporting member 300 and the first and second vibration generating modules 400 and 500, thereby enhancing a sound of the high-pitched sound band. For example, the supporting member 300 including the at least one hole 300s may be a sound guide structure which guides a sound of each of the first and second vibration generating modules 400 and 500 to be outputted in a forward direction or a lateral direction of the display module 100. For example, the structure 900 and/or the supporting member 300 including the at least one hole 300s may be a sound guide structure which guides the sound of each of the first and second vibration generating modules 400 and 500 to be outputted in the forward direction or the lateral direction of the display module 100. Therefore, inclined first and second vibration generating modules 400 and 500 may increase an area where a sound between the supporting member 300 and the first and second vibration generating modules 400 and 500 is reflected, and the sound may be reflected by the side surface of the structure 900 and may be outputted in the forward direction of the display module 100, thereby providing for more enhancing a sound characteristic of the high-pitched sound band and outputting sounds of the low-pitched, middle-pitched, and high-pitched sound bands.

Figure 25A:
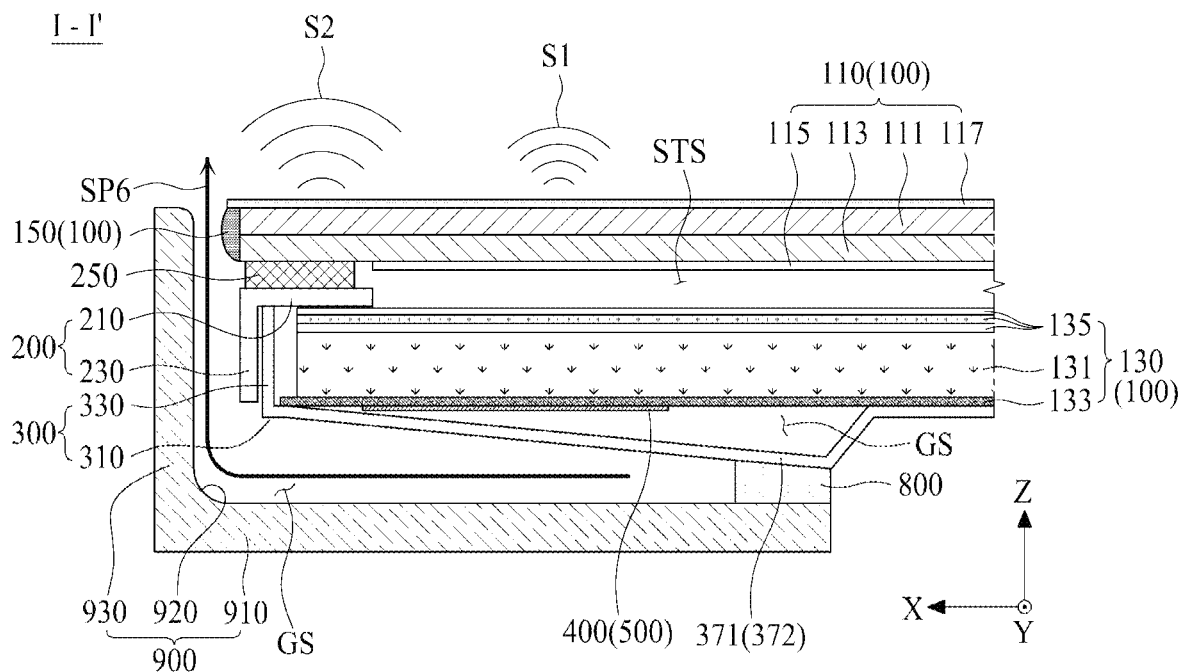
FIGS. 25A and 25B are other cross-sectional views taken along line I-I' illustrated in FIG. 1, according to another embodiment of the present disclosure.
Figure 25B:
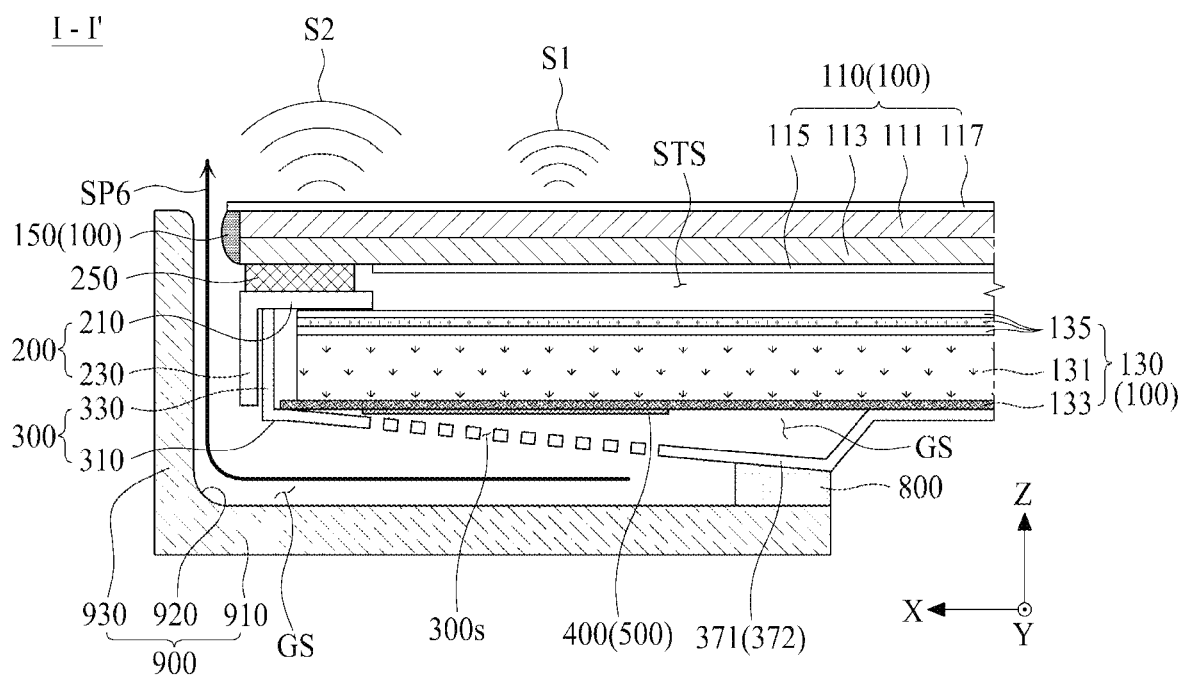

FIGS. 25A and 25B are other cross-sectional views taken along line I-I' illustrated in FIG. 1, according to another embodiment of the present disclosure. Except for that first and second vibration generating modules are on a reflective sheet, FIGS. 25A and 25B are the same as the illustrations of FIGS. 24A and 24B, and thus, their detailed descriptions are omitted or will be briefly described.

With reference to FIGS. 25A and 25B, a display apparatus according to another embodiment of the present disclosure may include a display module 100, a panel supporting part 200, a supporting member 300, first and second vibration generating modules 400 and 500, and a structure 900.

The supporting member 300 according to an embodiment of the present disclosure may be disposed to be inclined with respect to the display module 100. The first and second vibration generating modules 400 and 500 may be disposed on a reflective sheet 133.

For example, a sound of each of the first and second vibration generating modules 400 and 500 may be reflected between the first and second vibration generating modules 400 and 500 and a rear surface of the supporting member 300 and may be outputted in a forward direction of the display module 100. For example, the sound of each of the first and second vibration generating modules 400 and 500 may be reflected by a side surface of the structure 900 and may be outputted in the forward direction of the display module 100. For example, inclined first and second vibration generating modules 400 and 500 may be a sound guide structure which guides the sound of each of the first and second vibration generating modules 400 and 500 to be outputted in the forward direction or the lateral direction of the display module 100. For example, inclined first and second vibration generating modules 400 and 500 and/or structure 900 may be a sound guide structure which guides the sound of each of the first and second vibration generating modules 400 and 500 to be outputted in the forward direction and/or the lateral direction of the display module 100. Accordingly, an inclined supporting member 300 and the supporting member 300 including the at least one hole 300s may increase an area where a sound between the first and second vibration generating modules 400 and 500 is reflected, and a sound may be reflected by the side surface of the structure 900 and may be outputted in the forward direction of the display module 100, thereby providing a display apparatus for more enhancing a sound characteristic of the high-pitched sound band and outputting sounds of the low-pitched, middle-pitched, and high-pitched sound bands.

With reference to FIG. 25B, the at least one hole 300s may enhance a reflective characteristic of a sound between the supporting member 300 and the first and second vibration generating modules 400 and 500, thereby enhancing a sound of the high-pitched sound band. For example, the supporting member 300 including the at least one hole 300s may be a sound guide structure which guides a sound of each of the first and second vibration generating modules 400 and 500 to be outputted in a forward direction or a lateral direction of the display module 100. For example, the structure 900 and/or the supporting member 300 including the at least one hole 300s may be a sound guide structure which guides the sound of each of the first and second vibration generating modules 400 and 500 to be outputted in the forward direction or the lateral direction of the display module 100. Therefore, an inclined supporting member 300 and the supporting member 300 including the at least one hole 300s may increase an area where a sound between the first and second vibration generating modules 400 and 500 is reflected, and a sound may be reflected by the side surface of the structure 900 and may be outputted in the forward direction of the display module 100, thereby providing a display apparatus for more enhancing a sound characteristic of the high-pitched sound band and outputting sounds of the low-pitched, middle-pitched, and high-pitched sound bands.

Figure 26A:
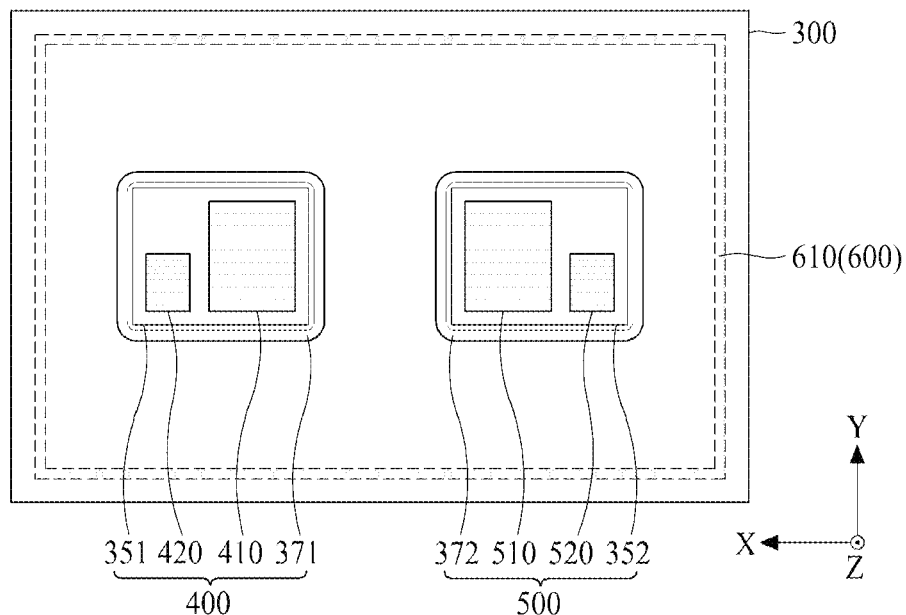
FIGS. 26A to 26C illustrate a vibration generating module and a partition, according to an embodiment of the present disclosure.
Figure 26B:
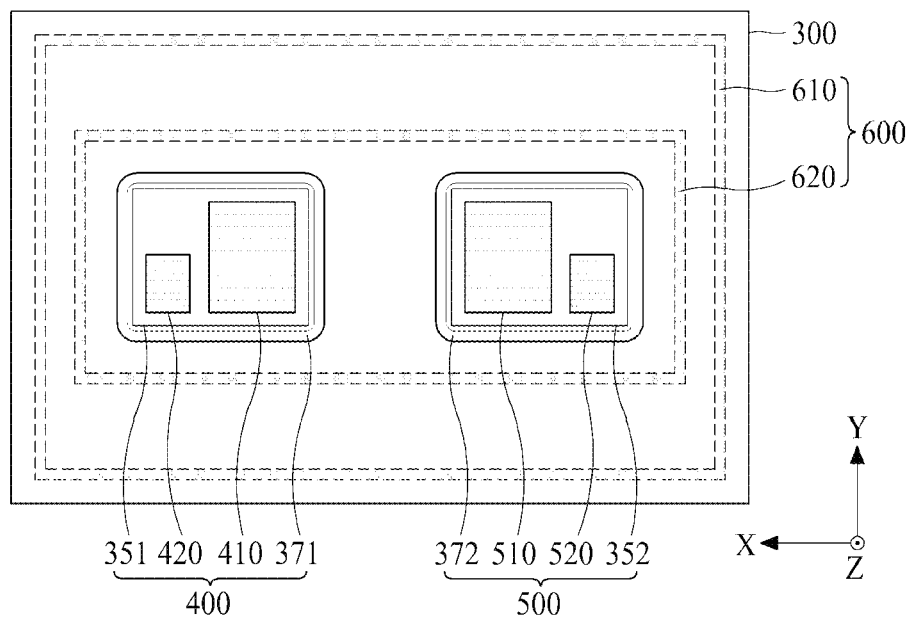
Figure 26C:
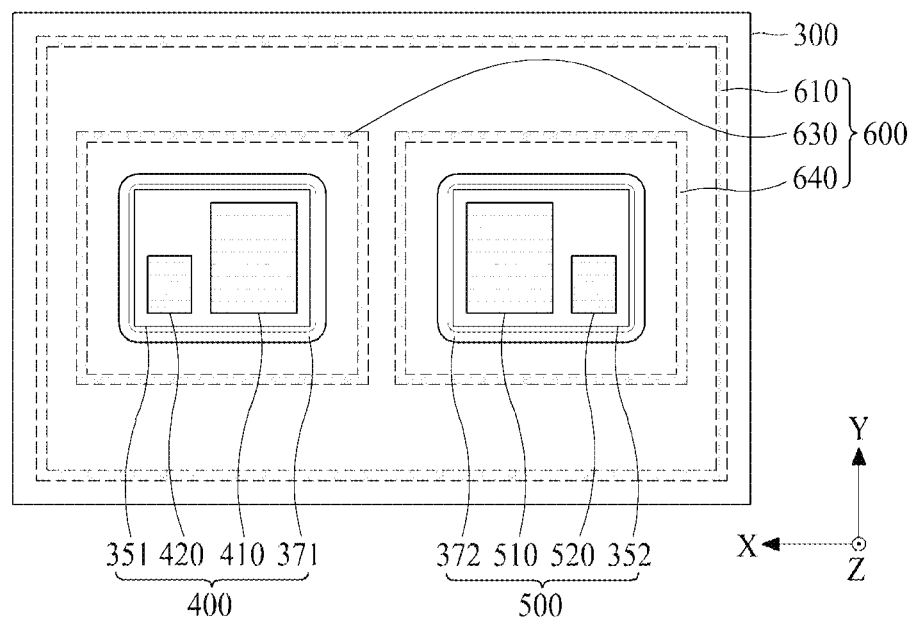

FIGS. 26A to 26C illustrate a vibration generating module and a partition, according to an embodiment of the present disclosure.

With reference to FIGS. 26A to 26C, a partition 600 may be disposed between a supporting member 300 and a display panel 110. The partition 600 may be an air gap or a space, where a sound is generated when the display panel 110 is vibrated by the first and second vibration generating modules 400 and 500. An air gap or a space for generating a sound or transferring a sound may be referred to as a partition. The partition 600 may separate a sound or a channel and may prevent or decrease an unclear sound caused by interference of a sound. The partition 600 may be referred to as an enclosure or a baffle, but embodiments of the present disclosure are not limited thereto.

With reference to FIG. 26A, a first partition 610 may be configured between a supporting member 300 and a display panel 110. For example, the first partition 610 may be disposed along a front periphery of the supporting member 300 and a rear periphery of the display panel 110. The first partition 610 may be an air gap or a space, where a sound is generated when the display panel 110 is vibrated by first and second vibration generating modules 400 and 500. For example, the air gap may be referred to as a vibration space, a sound pressure space, a sound box, a sound part, a resonance box, or a resonance part, but embodiments of the present disclosure are not limited thereto. The first partition 610 may include a material having an elastic force which enables compression to be made to a certain degree. For example, the first partition 610 may include polyurethane, polyolefin, polyethylene, and/or the like, but embodiments of the present disclosure are not limited thereto. For example, the first partition 610 may include a single-sided tape, a single-sided adhesive pad, a single-sided adhesive gap pad, a single-sided adhesive foam pad, a double-sided tape, a double-sided adhesive pad, a double-sided adhesive gap pad, a double-sided adhesive foam pad, or a bond, but embodiments of the present disclosure are not limited thereto. As another example, a first forming portion 371 may be a partition of the first vibration generating module 400, and a second forming portion 372 may be a partition of the second vibration generating module 500.

With reference to FIG. 26B, a first partition 610 may be configured between a supporting member 300 and a display panel 110. A second partition 620 may be further configured to surround all (or a whole) of first and second vibration generating modules 400 and 500. The second partition 620 may decrease a reflected wave of each of the first and second vibration generating modules 400 and 500, and thus, a sound may be more enhanced. The second partition 620 may include the same material as that of the first partition 610, but embodiments of the present disclosure are not limited thereto.

With reference to FIG. 26C, a first partition 610 may be configured between a supporting member 300 and a display panel 110. A third partition 630 may be further configured to surround a first vibration generating module 400. A fourth partition 640 may be further configured to surround a second vibration generating module 500. The third partition 630 may be disposed between the display panel 110 and the supporting member 300 to surround the first vibration generating module 400. For example, the third partition 630 may have a shape which is the same as or different from that of a first forming portion 371. For example, when the first forming portion 371 has a square shape, the third forming portion 630 may have a square shape. As another example, the third partition 630 may have a shape which is the same as or different from that of the first vibration generating module 400.

The third partition 630 may limit or define a vibration region or a vibration area of the display panel 110 using the first vibration generating module 400. For example, as a size of the third partition 630 increases, a vibration region of a rear region of the display panel 110 may increase, and thus, a low-pitched sound band and a middle-pitched sound band of a left sound or a sound of each of the low-pitched, middle-pitched, and high-pitched sound bands may be enhanced.

The fourth partition 640 may be disposed between the display panel 110 and the supporting member 300 and may surround the second vibration generating module 500. For example, the fourth partition 640 may have the same shape of the third partition 630, for symmetricity between a left sound and a right sound of a rear surface of the display panel 110.

The fourth partition 640 may limit or define a vibration region or a vibration area of the display panel 110 using the second vibration generating module 500. For example, as a size of the fourth partition 640 increases, the vibration region of the rear region of the display panel 110 may increase, and thus, a low-pitched sound band and a middle-pitched sound band of a right sound or a sound of each of the low-pitched, middle-pitched, and high-pitched sound bands may be enhanced. The third and fourth partitions 630 and 640 may include the same material, but embodiments of the present disclosure are not limited thereto.

Therefore, the third and fourth partitions 630 and 640 may limit vibration regions or vibration areas of the first and second vibration generating modules 400 and 500, and thus, the left-right symmetricity of the left sound and the right sound generated based on a vibration of the display panel 110 may be enhanced, and a sound pressure characteristic of each of the left sound and the right sound may be optimized. As another example, when the third and fourth partitions 630 and 640 are disposed, the first partition 610 may be omitted.

With reference to FIGS. 26A to 26C, a piezoelectric composite configuring the first and second vibration generating modules 400 and 500 may be disposed in a widthwise direction of a display panel or a supporting member. When a vibration characteristic of a vibration generating module corresponds to a long-axis direction with respect to the vibration generating module, a vibration may be smoothly generated. For example, when a piezoelectric composite is disposed to perpendicularly intersect with a long-axis direction of a vibration generating module (or a lengthwise direction of a rear cover), a vibration characteristic of the vibration generating module may be enhanced. But embodiments of the present disclosure are not limited thereto, and the piezoelectric composite may be disposed in a lengthwise direction of the display panel or the supporting member.

Figure 27A:
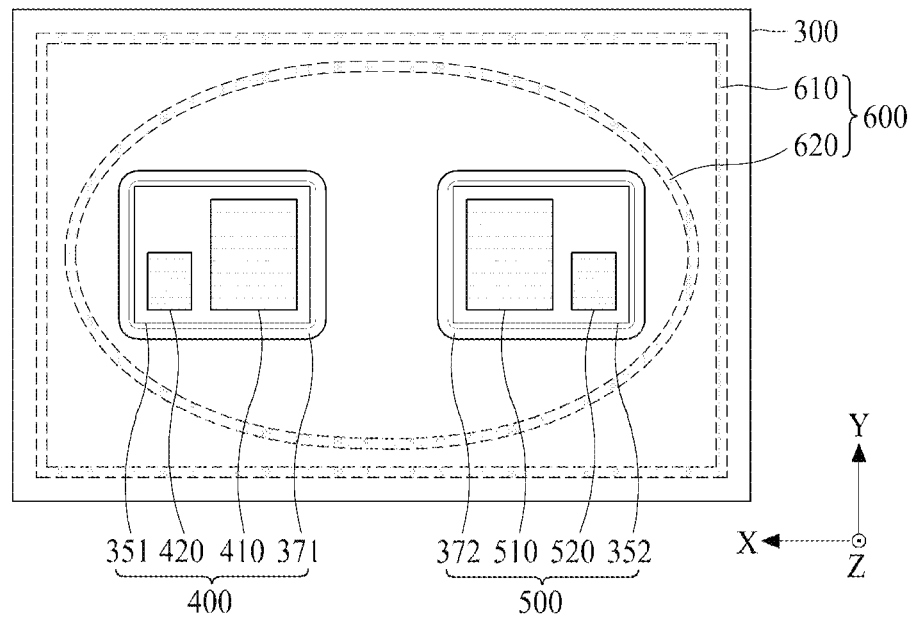
FIGS. 27A and 27B illustrate a vibration generating module and a partition, according to another embodiment of the present disclosure.
Figure 27B:
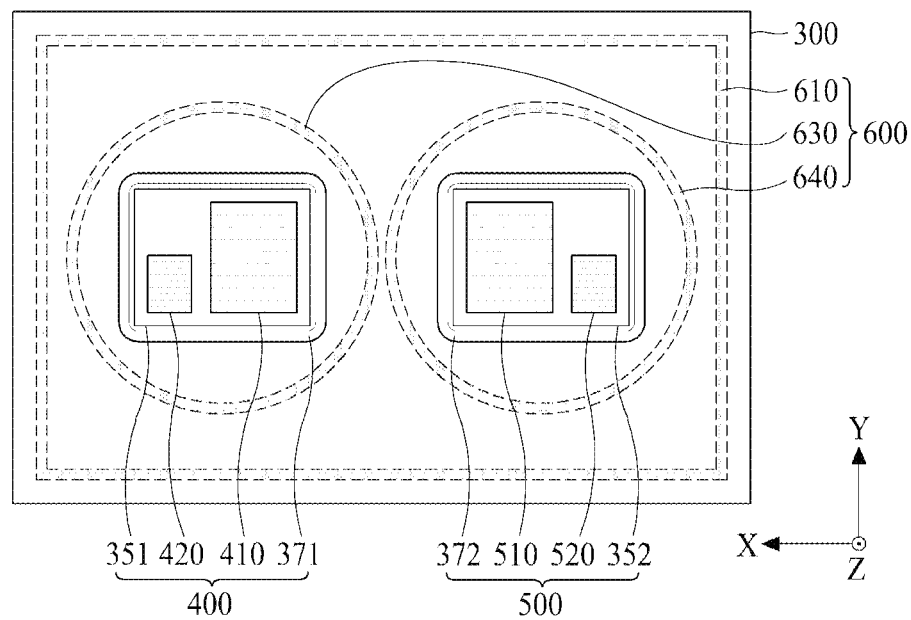

FIGS. 27A and 27B illustrate a vibration generating module and a partition, according to another embodiment of the present disclosure.

With reference to FIG. 27A, a partition 600 may include a first partition 610 and a second partition 620. The second partition 620 may be configured in a circular shape. The second partition 620 may surround all (or a whole) of first and second vibration generating modules 400 and 500. The second partition 620 may include the same material as that of the first partition 610, but embodiments of the present disclosure are not limited thereto.

With reference to FIG. 27B, a third partition 630 may be configured to surround a first vibration generating module 400. A fourth partition 640 may be configured to surround a second vibration generating module 500. The third partition 630 may be disposed between a display panel 110 and a supporting member 300 and may have a circular shape which surrounds the first vibration generating module 400. The fourth partition 640 may be disposed between the display panel 110 and the supporting member 300 and may have a circular shape which surrounds the second vibration generating module 500. Descriptions of the other elements are the same as the descriptions of FIG. 26C, and thus, their repetitive descriptions are omitted.

The display apparatus according to an embodiment of the present disclosure may be applied to various applications which output a sound based on a vibration of a display module without a separate speaker. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the vibration generating module according to the present disclosure may be applied to organic light emitting lighting apparatuses or inorganic light emitting lighting apparatuses. When the vibration generating module of the present disclosure is applied to a lighting apparatuses, the vibration generating module may act as lighting and a speaker. Also, when the display apparatus of the present disclosure is applied to a mobile device, the vibration generating module may act as a speaker or a receiver, but embodiments of the present disclosure are not limited thereto.

A display apparatus according to an embodiment of the present disclosure will be described below.

A display apparatus according to an embodiment of the present disclosure may include a display module including a display panel configured to display an image, a supporting member on a rear surface of the display module, and a first vibration generating module configured to include two or more vibration generating devices on the rear surface of the display module to output sounds of different sound bands.

According to some embodiments of the present disclosure, the display apparatus may further include a panel supporting part configured to support a rear periphery region of the display panel and supported by or accommodated into the supporting member, wherein the panel supporting part may include a supporting portion coupled or connected to the rear periphery region of the display panel and a side portion connected to the supporting portion surrounding side surfaces of the supporting member.

According to some embodiments of the present disclosure, the first vibration generating module may include a first vibration generating device and a second vibration generating device, the first vibration generating device is configured to output a sound of a low-pitched sound band, and the second vibration generating device is configured to output a sound of a middle-pitched sound band or a middle-high-pitched sound band.

According to some embodiments of the present disclosure, each of the first and second vibration generating devices may be configured to include a piezoelectric composite layer, a first electrode, and a second electrode.

According to some embodiments of the present disclosure, the piezoelectric composite layer may include a plurality of first portions and a plurality of second portions each disposed between two adjacent first portions of the plurality of first portions.

According to some embodiments of the present disclosure, the piezoelectric composite layer may have a circular or triangular shape.

According to some embodiments of the present disclosure, the display apparatus may further include a first forming portion configured at the supporting member, the first forming portion may be configured to include the first vibration generating device and the second vibration generating device.

According to some embodiments of the present disclosure, the display apparatus may further include a first forming portion configured at the supporting member and a first plate configured at the first forming portion, the first vibration generating device and the second vibration generating device may be disposed on the first plate.

According to some embodiments of the present disclosure, the display apparatus may further include a first forming portion configured at the supporting member and a hole configured at one side of the first forming portion.

According to some embodiments of the present disclosure, the display apparatus may further include a first groove and a second groove configured at peripheries of one side and the other side of the supporting member and a fifth vibration generating device and a sixth vibration generating device configured at the first groove and the second groove.

According to some embodiments of the present disclosure, the display apparatus may further include a third plate between the supporting member and the fifth vibration generating device and a fourth plate between the supporting member and the sixth vibration generating device.

According to some embodiments of the present disclosure, the display apparatus may further include a reflective sheet on a rear surface of the display panel, the first vibration generating module may be configured on a rear surface of the reflective sheet corresponding to the rear surface of the display module.

According to some embodiments of the present disclosure, the display apparatus may further include a second vibration generating module including a third vibration generating device and a fourth vibration generating device to output sounds of different sound bands, the rear surface of the display module includes a first rear region and a second rear region, the first vibration generating device and the second vibration generating device are configured in the first rear region, and the third vibration generating device and the fourth vibration generating device are configured in the second rear region.

According to some embodiments of the present disclosure, the first vibration generating device and the second vibration generating device may be configured to be asymmetrical or symmetrical with the third vibration generating device and the fourth vibration generating device with respect to a widthwise direction of the display module.

According to some embodiments of the present disclosure, the first vibration generating device and the third vibration generating device may be configured at a center of the display module, and the second vibration generating device and the fourth vibration generating device may be configured at a periphery of the display module.

According to some embodiments of the present disclosure, the third vibration generating device may be configured to output a sound of a low-pitched sound band, and the fourth vibration generating device may be configured to output a sound of a middle-pitched sound band or a sound of a middle-high-pitched sound band.

According to some embodiments of the present disclosure, the display apparatus may further include a first forming portion and a second forming portion configured at the supporting member and a first plate and a second plate configured on the first forming portion and the second forming portion, the first vibration generating device and the second vibration generating device are configured on the first plate, and the third vibration generating device and the fourth vibration generating device are configured on the second plate.

According to some embodiments of the present disclosure, the display apparatus may further include a hole configured at one side of each of the first forming portion and the second forming portion.

According to some embodiments of the present disclosure, the display apparatus may further include a first forming portion and a second forming portion configured at the supporting member, the first vibration generating device and the second vibration generating device may be configured on the first forming portion, and the third vibration generating device and the fourth vibration generating device may be configured on the second forming portion.

According to some embodiments of the present disclosure, the display apparatus may further include a first forming portion, a second forming portion, and a third forming portion configured at the supporting member, the second vibration generating device may be configured on the first forming portion, the fourth vibration generating device may be configured on the second forming portion, and the first vibration generating device or the third vibration generating device may be configured on the third forming portion.

According to some embodiments of the present disclosure, the display apparatus may further include a first forming portion, a second forming portion, a third forming portion, and a fourth forming portion configured at the supporting member, the first vibration generating device may be configured on the first forming portion, the second vibration generating device may be configured on the second forming portion, the third vibration generating device may be configured on the third forming portion, and the fourth vibration generating device may be configured on the fourth forming portion.

According to some embodiments of the present disclosure, the first to fourth vibration generating devices may be configured between the supporting member and the display panel.

According to some embodiments of the present disclosure, the display apparatus may further include a fifth vibration generating device configured at a periphery of a rear surface of the supporting member corresponding to the first rear region and a sixth vibration generating device configured at a periphery of the rear surface of the supporting member corresponding to the second rear region.

According to some embodiments of the present disclosure, the fifth vibration generating device and the sixth vibration generating device may be configured to output a sound of a high-pitched sound band.

According to some embodiments of the present disclosure, the display apparatus may further include a third plate configured between the supporting member and the fifth vibration generating device and a fourth plate configured between the supporting member and the sixth vibration generating device.

According to some embodiments of the present disclosure, each of the first to sixth vibration generating devices may be configured to include a piezoelectric composite.

According to some embodiments of the present disclosure, the display apparatus may further include a reflective sheet configured on a rear surface of the display panel, the first vibration generating device and the second vibration generating device may be configured on a rear surface of the reflective sheet corresponding to the first rear region of the display module, and the third vibration generating device and the fourth vibration generating device may be configured on a rear surface of the reflective sheet corresponding to the second rear region of the display module.

According to some embodiments of the present disclosure, the display apparatus may further include a first groove configured at a periphery of one side of the supporting member, a second groove configured at a periphery of the other side of the supporting member, a fifth vibration generating device configured in the first groove, and a sixth vibration generating device configured in the second groove.

According to some embodiments of the present disclosure, the display apparatus may further include a partition surrounding the vibration generating module.

A display apparatus according to an embodiment of the present disclosure includes a display module including a display panel configured to display an image, a supporting member configured on a rear surface of the display module, and two or more vibration generating devices configured on the rear surface of the display module to have different sound bands from a center of the display module to a periphery of the display module with respect to a widthwise direction of the display module.

According to some embodiments of the present disclosure, the display apparatus may further include a panel supporting part configured to support a rear periphery region of the display panel and supported by or accommodated into the supporting member, wherein the panel supporting part may include a supporting portion coupled or connected to the rear periphery region of the display panel and a side portion connected to the supporting portion surrounding side surfaces of the supporting member.

According to some embodiments of the present disclosure, the two or more vibration generating devices may further include a plate, and the two or more vibration generating devices are configured on the plate.

According to some embodiments of the present disclosure, the supporting member may further include a first forming portion, the two or more vibration generating devices may be configured at the first forming portion, and the two or more vibration generating devices may be configured to output a sound of a low-middle-pitched sound band or a sound of each of low-pitched, middle-pitched, and high-pitched sound bands.

According to some embodiments of the present disclosure, the supporting member may further include a first forming portion and a second forming portion, a first vibration generating device and a second vibration generating device of the two or more vibration generating devices may be configured in the first forming portion, a third vibration generating device and a fourth vibration generating device of the two or more vibration generating devices may be configured in the second forming portion, the first vibration generating device and the third vibration generating device may be configured at a center of the display module to output a sound of a low-pitched sound band, and the second vibration generating device and the fourth vibration generating device may be configured adjacent to the first vibration generating device and the third vibration generating device to output a sound of a middle-pitched sound band or a middle-high-pitched sound band.

According to some embodiments of the present disclosure, the first vibration generating device and the second vibration generating device may be configured to be asymmetrical or symmetrical with the third vibration generating device and the fourth vibration generating device with respect to a widthwise direction of the display module.

According to some embodiments of the present disclosure, the supporting member may further include a first forming portion, a second forming portion, and a third forming portion, a first vibration generating device of the two or more vibration generating devices may be configured at the first forming portion, a second vibration generating device of the two or more vibration generating devices may be configured at the second forming portion, a third vibration generating device of the two or more vibration generating devices may be configured at the third forming portion, the first vibration generating device and the second vibration generating device may be configured to output a sound of a middle-pitched sound band or a sound of a middle-high-pitched sound band, and the third vibration generating device may be configured at a center of the display module to output a sound of a low-pitched sound band.

According to some embodiments of the present disclosure, the supporting member may further include a first forming portion, a second forming portion, a third forming portion, and a fourth forming portion, a first vibration generating device of the two or more vibration generating devices may be configured at the first forming portion, a second vibration generating device of the two or more vibration generating devices may be configured at the second forming portion, a third vibration generating device of the two or more vibration generating devices may be configured at the third forming portion, a fourth vibration generating device of the two or more vibration generating devices may be configured at the fourth forming portion, the first vibration generating device and the third vibration generating device may be configured at a center of the display module to output a sound of a low-pitched sound band, and the second vibration generating device and the fourth vibration generating device may be configured to output a sound of a middle-pitched sound band or a sound of a middle-high-pitched sound band.

According to some embodiments of the present disclosure, the supporting member may be disposed to be inclined with respect to the display module.

According to some embodiments of the present disclosure, the supporting member may be disposed to be inclined with respect to the display module, and the supporting member may further include a plurality of holes varying in a direction from one side of the supporting member to the other side of the supporting member.

According to some embodiments of the present disclosure, each of the two or more vibration generating devices may be configured to include a piezoelectric composite layer.

According to some embodiments of the present disclosure, the piezoelectric composite layer may include a plurality of first portions and a plurality of second portions each disposed between two adjacent first portions of the plurality of first portions.

According to some embodiments of the present disclosure, the piezoelectric composite layer may have a circular or triangular shape.

According to some embodiments of the present disclosure, the display apparatus may further include at least one groove configured at peripheries of one side and the other side of the supporting member and a fifth vibration generating device and a sixth vibration generating device respectively configured at the at least one groove.

According to some embodiments of the present disclosure, the fifth vibration generating device and the sixth vibration generating device may be configured to output a sound of a high-pitched sound band.

According to some embodiments of the present disclosure, the display apparatus may further include a vibration generating device configured at a side surface of the supporting member or configured at the side surface and a rear surface of the supporting member.

According to some embodiments of the present disclosure, the vibration generating device may be configured to output a sound of a high-pitched sound band.

According to some embodiments of the present disclosure, the display apparatus may further include a vibration generating device configured at a side surface of the supporting member or configured at the side surface and a rear surface of the supporting member to have a taper.

According to some embodiments of the present disclosure, the display apparatus may further include a reflective sheet configured at a rear surface of the display panel, the vibration generating module may be configured at a rear surface of the reflective sheet.

According to some embodiments of the present disclosure, the display apparatus may further include a partition surrounding the two or more vibration generating devices.

It will be apparent to those skilled in the art that various modifications and variations can be made in the display apparatus of the present disclosure without departing from the spirit or scope of the disclosures. Thus, it is intended that the present disclosure covers the modifications and variations of this disclosure provided they come within the scope of the appended claims and their equivalents.

What is claimed is:
1. A display apparatus, comprising:
a display module including a display panel configured to display an image;
a supporting member on a rear surface of the display module, the supporting member including:
a rear portion directly contacting the rear surface of the display module; and
a first forming portion connected to the rear portion and spaced apart from the rear surface of the display module with a first space between the rear surface of the display module and the first forming portion of the supporting member; and
a first vibration generating module entirely in the first space or entirely on the first forming portion of the supporting member, the first vibration generating module including two or more vibration generating devices to generate sound waves of different sound bands in the first space without directly vibrating the display panel,
wherein the display module further includes a sound transfer space between a rear surface of the display panel and the rear surface of the display module to transfer the sound waves generated by the first vibration generating module from the first space to the display panel and output sounds of the different sound bands through the display panel,
wherein the first forming portion includes a slanted side surface connected to the rear portion of the supporting member at an obtuse angle at each side of an outer periphery of the first space to entirely surround the first vibration generating module in the plan view, the slanted side surface extending from the rear portion of the supporting member away from the rear surface of the display module, and
wherein the two or more vibration generating devices include piezoelectric materials, have different sizes, and are disposed in a same plane entirely in the first space surrounded by the slanted side surface of the forming portion or entirely on the slanted side surface of the forming portion.

2. The display apparatus of claim 1, further comprising:
a panel supporting part configured to support a rear periphery region of the display panel and supported by or accommodated into the supporting member,
wherein the panel supporting part includes a supporting portion coupled or connected to the rear periphery region of the display panel and a side portion connected to the supporting portion surrounding side surfaces of the supporting member.

3. The display apparatus of claim 1, wherein:
the two or more vibration generating devices comprise a first vibration generating device and a second vibration generating device,
the first vibration generating device is configured to output a sound of a low-pitched sound band, and
the second vibration generating device is configured to output a sound of a middle-pitched sound band or a middle-high-pitched sound band.

4. The display apparatus of claim 3, wherein each of the first and second vibration generating devices includes a piezoelectric layer including the piezoelectric materials, a first electrode, and a second electrode.

5. The display apparatus of claim 4, wherein the piezoelectric layer includes a plurality of first portions and a plurality of second portions each disposed between two adjacent first portions of the plurality of first portions.

6. The display apparatus of claim 4, wherein the piezoelectric layer has a circular or triangular shape.

7. The display apparatus of claim 3,
wherein the first forming portion accommodates the first vibration generating device and the second vibration generating device.

8. The display apparatus of claim 3, wherein the first vibration module further comprises:
a first plate supported on the first forming portion of the supporting member or the rear surface of the display module,
wherein the first vibration generating device and the second vibration generating device are disposed on the first plate and are spaced apart from the rear surface of the display module and from a rear part of the first forming portion of the supporting member covering a rear surface of the first plate.

9. The display apparatus of claim 3, further comprising a second vibration generating module including a third vibration generating device and a fourth vibration generating device to output sounds of different sound bands,
wherein:
the rear surface of the display module comprises a first rear region and a second rear region,
the first vibration generating device and the second vibration generating device are configured at the first rear region, and
the third vibration generating device and the fourth vibration generating device are configured at the second rear region.

10. The display apparatus of claim 9, wherein the first vibration generating device and the second vibration generating device are configured to be asymmetrical or symmetrical with the third vibration generating device and the fourth vibration generating device with respect to a widthwise direction of the display module.

11. The display apparatus of claim 9, wherein:
the first vibration generating device and the third vibration generating device are configured at a center of the display module, and
the second vibration generating device and the fourth vibration generating device are configured at a periphery of the display module.

12. The display apparatus of claim 9, wherein:
the third vibration generating device is configured to output a sound of a low-pitched sound band, and
the fourth vibration generating device is configured to output a sound of a middle-pitched sound band or a sound of a middle-high-pitched sound band.

13. The display apparatus of claim 9, wherein:
the supporting member further includes a second forming portion spaced apart from the rear surface of the display module to form a second space between the rear surface of the display module and the second forming portion;
the display apparatus further includes a first plate and a second plate on the first forming portion and the second forming portion, respectively;
the first vibration generating device and the second vibration generating device are configured on the first plate; and
the third vibration generating device and the fourth vibration generating device are configured on the second plate.

14. The display apparatus of claim 13, wherein the first forming portion and the second forming portion include a hole at one side of the first forming portion and the second forming portion, respectively.

15. The display apparatus of claim 9, wherein:
the supporting member further includes a second forming portion spaced apart from the rear surface of the display module to form a second space between the rear surface of the display module and the second forming portion,
the first vibration generating device and the second vibration generating device are on the first forming portion, and
the third vibration generating device and the fourth vibration generating device are on the second forming portion.

16. The display apparatus of claim 9, further comprising a second forming portion and a third forming portion configured at the supporting member,
wherein:
the second vibration generating device is configured on the first forming portion,
the fourth vibration generating device is configured on the second forming portion, and
the first vibration generating device or the third vibration generating device is configured on the third forming portion.

17. The display apparatus of claim 9, further comprising a second forming portion, a third forming portion, and a fourth forming portion configured at the supporting member,
wherein:
the first vibration generating device is configured on the first forming portion,
the second vibration generating device is configured on the second forming portion,
the third vibration generating device is configured on the third forming portion, and
the fourth vibration generating device is configured on the fourth forming portion.

18. The display apparatus of claim 9, wherein the first to fourth vibration generating devices are disposed between the supporting member and the rear surface of the display module.

19. The display apparatus of claim 9, further comprising:
a fifth vibration generating device configured at a periphery of a rear surface of the supporting member corresponding to the first rear region; and
a sixth vibration generating device configured at a periphery of the rear surface of the supporting member corresponding to the second rear region.

20. The display apparatus of claim 19, wherein the fifth vibration generating device and the sixth vibration generating device are configured to output a sound of a high-pitched sound band.

21. The display apparatus of claim 19, further comprising:
a third plate configured between the supporting member and the fifth vibration generating device; and
a fourth plate configured between the supporting member and the sixth vibration generating device.

22. The display apparatus of claim 19, wherein each of the first to sixth vibration generating devices includes a piezoelectric layer including the piezoelectric materials.

23. The display apparatus of claim 9, wherein the display module further includes a reflective sheet at the rear surface of the display module,
wherein the first vibration generating device and the second vibration generating device are on a rear surface of the reflective sheet corresponding to the first rear region of the display module, and
wherein the third vibration generating device and the fourth vibration generating device are on the rear surface of the reflective sheet corresponding to the second rear region of the display module.

24. The display apparatus of claim 9, further comprising:
a first groove configured at a periphery of one side of the supporting member;
a second groove configured at a periphery of the other side of the supporting member;
a fifth vibration generating device configured in the first groove; and
a sixth vibration generating device configured in the second groove.

25. The display apparatus of claim 1,
wherein the first forming portion includes a hole at one side of the first forming portion.

26. The display apparatus of claim 25, wherein the hole is connected to a space between a periphery of the supporting member and the two or more vibration generating devices.

27. The display apparatus of claim 1, wherein the display module further includes a reflective sheet at the rear surface of the display module, and
wherein the first vibration generating module is on a rear surface of the reflective sheet corresponding to the rear surface of the display module and is spaced apart from the first forming portion of the supporting member.

28. The display apparatus of claim 1, further comprising a partition surrounding the first vibration generating module.

29. The display apparatus of claim 1, wherein:
the display module further comprises a backlight between the display panel and the supporting member;
the backlight is configured to be vibrated by a vibration of the first vibration generating module; and
the display panel is configured to be vibrated by the sound waves transferred through the sound transfer space according to a vibration of the backlight and to output the sounds of different sound bands.

30. The display apparatus of claim 29, wherein:
the backlight comprises a reflective sheet; and
the first vibration generating module is between the reflective sheet and a bottom surface of the first forming portion and is spaced apart from the reflective sheet and the bottom surface of the first forming portion.

31. The display apparatus of claim 1, wherein:
the first vibration generating module further includes a first plate in the first space and spaced apart from the rear surface of the display module and from a rear part of the first forming portion covering the rear surface of the first vibration generating module, and
the two or more vibration generating devices are disposed on the first plate.

32. A display apparatus, comprising:
a display module including a display panel configured to display an image;
a supporting member on a rear surface of the display module; and
a first vibration generating module on the supporting member or between the supporting member and the rear surface of the display module, the first vibration generating module including at least first and second vibration generating devices to generate sound waves of different sound bands;
a plate at a periphery of the supporting member, a surface of the plate and a side surface of the display module facing each other and being spaced apart from each other, the side surface of the display module not being parallel with the rear surface of the display module; and
a third vibration generating device on the surface of the plate and configured to vibrate to generate a sound wave of a different sound band from the sound waves of different sound bands generated by the first vibration generating module,
wherein the third vibration generating device includes a surface facing and spaced apart from the rear surface of the display module and another surface facing and spaced apart from the side surface of the display module.

33. The display apparatus of claim 32, wherein:
the plate further includes another surface facing and spaced apart from the rear surface of the display module.

34. The display apparatus of claim 32, wherein:
the first, second, and third sound generating devices are positioned in a widthwise direction from a middle of the display module to a periphery of the display module, and
the third sound generating device is configured to generate a sound of a higher sound band than the second sound generating device, and the second sound generating device is configured to generate a sound of a higher sound band than the first sound generating device.

35. The display apparatus of claim 32, wherein each of the first, second, and third sound generating devices includes a piezoelectric layer.

36. The display apparatus of claim 32, wherein the supporting member includes a groove at the periphery to accommodate the plate and the third sound generating device.

37. A display apparatus, comprising:
a display module including a display panel configured to display an image;
a supporting member on a rear surface of the display module, the supporting member including:
a rear portion directly contacting the rear surface of the display module; and
a first forming portion connected to the rear portion and spaced apart from the rear surface of the display module with a first space between the rear surface of the display module and the first forming portion of the supporting member; and
two or more vibration generating devices entirely in the first space or entirely on the first forming portion of the supporting member to generate sound waves in the first space, without directly vibrating the display panel, for outputting sounds of different sound bands from a center of the display module to a periphery of the display module with respect to a widthwise direction of the display module,
wherein the display module includes a sound transfer space between a rear surface of the display panel and the rear surface of the display module to transfer the sound waves from the first space to the display panel and output the sounds of different sound bands through the display panel,
wherein the first forming portion includes a slanted side surface connected to the rear portion of the supporting member at an obtuse angle at each side of an outer periphery of the first space to entirely surround the two or more vibration generating devices in the plan view, the slanted side surface extending from the rear portion of the supporting member away from the rear surface of the display module, and
wherein the two or more vibration generating devices include piezoelectric materials, have different sizes, and are disposed in a same plane entirely in the first space surrounded by the slanted side surface of the forming portion or entirely on the slanted side surface of the forming portion.

38. The display apparatus of claim 37, further comprising:
a panel supporting part configured to support a rear periphery region of the display panel and supported by or accommodated into the supporting member,
wherein the panel supporting part includes a supporting portion coupled or connected to the rear periphery region of the display panel and a side portion connected to the supporting portion surrounding side surfaces of the supporting member.

39. The display apparatus of claim 37, further comprising:
a plate supported on the rear surface of the display module or on the first forming portion of the supporting member,
wherein the two or more vibration generating devices are configured on the plate and are spaced apart from the rear surface of the display module and from a part of the first forming portion of the supporting member covering a rear surface of the plate.

40. The display apparatus of claim 37, wherein:
the two or more vibration generating devices are configured at the first forming portion, and
the two or more vibration generating devices are configured to output a sound of a low-middle-pitched sound band or a sound of each of low-pitched, middle-pitched, and high-pitched sound bands.

41. The display apparatus of claim 37, wherein:
the supporting member further comprises a second forming portion spaced apart from the rear surface of the display module,
a first vibration generating device and a second vibration generating device of the two or more vibration generating devices are configured at the first forming portion,
a third vibration generating device and a fourth vibration generating device of the two or more vibration generating devices are configured at the second forming portion, the first vibration generating device and the third vibration generating device are configured at a center of the display module to output a sound of a low-pitched sound band, and
the second vibration generating device and the fourth vibration generating device are configured adjacent to the first vibration generating device and the third vibration generating device to output a sound of a middle-pitched sound band or a middle-high-pitched sound band.

42. The display apparatus of claim 41, wherein the first vibration generating device and the second vibration generating device are configured to be asymmetrical or symmetrical with the third vibration generating device and the fourth vibration generating device with respect to a widthwise direction of the display module.

43. The display apparatus of claim 37, wherein:
the supporting member further comprises a second forming portion and a third forming portion, each spaced apart from the rear surface of the display module,
a first vibration generating device of the two or more vibration generating devices is configured at the first forming portion,
a second vibration generating device of the two or more vibration generating devices is configured at the second forming portion,
a third vibration generating device of the two or more vibration generating devices is configured at the third forming portion,
the first vibration generating device and the second vibration generating device are configured to output a sound of a middle-pitched sound band or a sound of a middle-high-pitched sound band, and
the third vibration generating device is configured at a center of the display module to output a sound of a low-pitched sound band.

44. The display apparatus of claim 37, wherein:
the supporting member further comprises a second forming portion, a third forming portion, and a fourth forming portion, each spaced apart from the rear surface of the display module,
a first vibration generating device of the two or more vibration generating devices is configured at the first forming portion,
a second vibration generating device of the two or more vibration generating devices is configured at the second forming portion,
a third vibration generating device of the two or more vibration generating devices is configured at the third forming portion,
a fourth vibration generating device of the two or more vibration generating devices is configured at the fourth forming portion,
the first vibration generating device and the third vibration generating device are configured at a center of the display module to output a sound of a low-pitched sound band, and
the second vibration generating device and the fourth vibration generating device are configured to output a sound of a middle-pitched sound band or a sound of a middle-high-pitched sound band.

45. The display apparatus of claim 37, wherein the supporting member is disposed to be inclined with respect to the display module.

46. The display apparatus of claim 37, wherein:
the supporting member is disposed to be inclined with respect to the display module, and
the supporting member further comprises a plurality of holes varying in a direction from one side of the supporting member to the other side of the supporting member.

47. The display apparatus of claim 37, wherein each of the two or more vibration generating devices is configured to include a piezoelectric layer including the piezoelectric materials.

48. The display apparatus of claim 47, wherein the piezoelectric layer includes a plurality of first portions and a plurality of second portions each disposed between two adjacent first portions of the plurality of first portions.

49. The display apparatus of claim 47, wherein the piezoelectric layer has a circular or triangular shape.

50. The display apparatus of claim 37, further comprising:
at least one groove configured at peripheries of one side and the other side of the supporting member; and
a fifth vibration generating device and a sixth vibration generating device respectively configured at the at least one groove.

51. The display apparatus of claim 50, wherein the fifth vibration generating device and the sixth vibration generating device are configured to output a sound of a high-pitched sound band.

52. The display apparatus of claim 37, further comprising a vibration generating device at a side surface of the supporting member or at the side surface and a rear surface of the supporting member.

53. The display apparatus of claim 52, wherein the vibration generating device is configured to output a sound of a high-pitched sound band.

54. The display apparatus of claim 37, further comprising a vibration generating device at a side surface of the supporting member or at the side surface and a rear surface of the supporting member to have a taper.

55. The display apparatus of claim 37, further comprising a reflective sheet configured at a rear surface of the display panel,
wherein the two or more vibration generating devices are at a rear surface of the reflective sheet.

56. The display apparatus of claim 37, further comprising a partition surrounding the two or more vibration generating devices.

* * * * *